US009961558B2

United States Patent
Chen et al.

(10) Patent No.: US 9,961,558 B2
(45) Date of Patent: *May 1, 2018

(54) PRIORITIZATION OF DIFFERENT OPERATORS IN SHARED SPECTRUM

(71) Applicant: QUALCOMM Incorporated, San Diego, CA (US)

(72) Inventors: Wanshi Chen, San Diego, CA (US); Tao Luo, San Diego, CA (US); Yongbin Wei, La Jolla, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/193,561

(22) Filed: Jun. 27, 2016

(65) Prior Publication Data

US 2016/0309336 A1 Oct. 20, 2016

Related U.S. Application Data

(63) Continuation of application No. 14/489,239, filed on Sep. 17, 2014, now Pat. No. 9,420,472.

(Continued)

(51) Int. Cl.
*H04W 4/00* (2009.01)
*H04W 16/14* (2009.01)
(Continued)

(52) U.S. Cl.
CPC ....... *H04W 16/14* (2013.01); *H04W 74/0808* (2013.01); *H04W 84/12* (2013.01); *H04W 88/02* (2013.01); *H04W 88/08* (2013.01)

(58) Field of Classification Search
CPC . H04W 16/14; H04W 84/12; H04W 74/0808; H04W 88/08; H04W 88/02
See application file for complete search history.

(56) References Cited

U.S. PATENT DOCUMENTS 7,623,494 B2 * 11/2009 Zhu ..................... H04W 72/085
370/333
8,995,592 B2 * 3/2015 Dao ....................... H04J 11/004
375/316

(Continued)

FOREIGN PATENT DOCUMENTS

JP 2013132071 A 7/2013
WO WO-2012078565 A1 6/2012
(Continued)

OTHER PUBLICATIONS

ISA/EPO, International Search Report and Written Opinion of the International Searching Authority, Int'l App. No. PCT/US2014/056224, Mar. 26, 2015, European Patent Office, Rijswijk, NL, 9 pgs.

(Continued)

*Primary Examiner* — Robert Wilson
(74) *Attorney, Agent, or Firm* — Liem T. Do

(57) ABSTRACT

Methods, systems, apparatuses, and devices are described for wireless communications. In one method, an opportunity may be identified for a first operator to perform a clear channel assessment (CCA) for a shared spectrum. The opportunity may be based on a priority of the first operator with respect to at least one other operator associated with the shared spectrum. The CCA may be performed for the shared spectrum during the identified opportunity to determine whether the shared spectrum is available for a transmission during a transmission interval.

30 Claims, 29 Drawing Sheets

Related U.S. Application Data

(60) Provisional application No. 61/883,850, filed on Sep. 27, 2013.

(51) Int. Cl.
*H04W 84/12* (2009.01)
*H04W 74/08* (2009.01)
*H04W 88/02* (2009.01)
*H04W 88/08* (2009.01)

(56) References Cited

U.S. PATENT DOCUMENTS

| | | | |
|---|---|---|---|
| 9,338,673 B2 * | 5/2016 | Cheng | H04W 24/02 |
| 9,420,472 B2 * | 8/2016 | Chen | H04W 16/14 |
| 2013/0107116 A1 | 5/2013 | Charbit et al. | |
| 2013/0165134 A1 | 6/2013 | Touag et al. | |
| 2013/0201848 A1 * | 8/2013 | Kazmi | H04W 24/00 370/252 |
| 2014/0162666 A1 | 6/2014 | Ratasuk et al. | |
| 2014/0177485 A1 * | 6/2014 | Wang | H04L 1/00 370/280 |
| 2014/0269246 A1 * | 9/2014 | Yoo | H04J 3/10 370/201 |
| 2015/0043523 A1 * | 2/2015 | Luo | H04W 16/14 370/330 |
| 2015/0049715 A1 | 2/2015 | Yerramalli et al. | |
| 2015/0056931 A1 | 2/2015 | Yerramalli et al. | |
| 2015/0098349 A1 | 4/2015 | Wei et al. | |
| 2015/0098412 A1 | 4/2015 | Yerramalli et al. | |
| 2015/0098437 A1 | 4/2015 | Chen et al. | |
| 2015/0103777 A1 | 4/2015 | Chen et al. | |
| 2015/0148053 A1 | 5/2015 | Patel et al. | |
| 2015/0156638 A1 | 6/2015 | Yerramalli et al. | |
| 2015/0295694 A1 * | 10/2015 | Li | H04L 1/0026 370/329 |
| 2015/0341921 A1 | 11/2015 | Chen et al. | |
| 2016/0255519 A1 * | 9/2016 | Cheng | H04W 24/02 370/329 |

FOREIGN PATENT DOCUMENTS

| | | |
|---|---|---|
| WO | WO-2012109195 A2 | 8/2012 |
| WO | WO-2013046655 A1 | 4/2013 |

OTHER PUBLICATIONS

Ramachandran et al., "Clear Channel Assessment in Energy-Constrained Wideband Wireless Networks", IEEE Wireless Communications, Jun. 2007, pp. 70-78, vol. 14, Iss. 3, Institute of Electrical and Electronics Engineers.

* cited by examiner

PRIORITIZATION OF DIFFERENT OPERATORS IN SHARED SPECTRUM

CROSS REFERENCES

The present application for Patent is a continuation of U.S. patent application Ser. No. 14/489,239 by Chen, et al., entitled "Prioritization of Different Operators in Shared Spectrum" filed Sep. 17, 2014 and granted as U.S. Pat. No. 9,420,472, which claims priority to U.S. Provisional Patent Application No. 61/883,850 by Chen et al., entitled "Prioritization of Different Operators in Shared Spectrum," filed Sep. 27, 2013, assigned to the assignee hereof, each of which is expressly and entirely incorporated by reference herein.

BACKGROUND

Wireless communications networks are widely deployed to provide various communication services such as voice, video, packet data, messaging, broadcast, and the like. These wireless networks may be multiple-access networks capable of supporting multiple users by sharing the available network resources.

A wireless communications network may include a number of access points. The access points of a cellular network may include a number of base stations, such as NodeBs (NBs) or evolved NodeBs (eNBs). The access points of a wireless local area network (WLAN) may include a number of WLAN access points, such as WiFi nodes. Each access point may support communication for a number of user equipments (UEs) and may often communicate with multiple UEs at the same time. Similarly, each UE may communicate with a number of access points, and may sometimes communicate with multiple access points and/or access points employing different access technologies. An access point may communicate with a UE via downlink and uplink. The downlink (or forward link) refers to the communication link from the access point to the UE, and the uplink (or reverse link) refers to the communication link from the UE to the access point.

As cellular networks become more congested, operators are beginning to look at ways to increase capacity. One approach may include the use of WLAN spectrum to offload some of the traffic and/or signaling of a cellular network. WLANs (or WiFi networks) are attractive because, unlike cellular networks that operate in a licensed spectrum, WiFi networks generally operate in an unlicensed spectrum.

When devices that communicate using different protocols (e.g., cellular and WLAN protocols) share a spectrum, a contention-based protocol may be used to determine what device(s) are able to transmit in different transmission intervals of the shared spectrum.

SUMMARY

The described features generally relate to one or more improved methods, systems, apparatuses, and/or devices for wireless communications. More particularly, the described features relate to prioritizing the access that different operators (e.g., different mobile network operators (MNOs)) have to a shared spectrum. A need for prioritization may arise for various reasons. For example, different operators may pay different rates for accessing a shared spectrum, depending on the quality of service each operator desires. Or, for example, one operator may rent a percentage of their shared spectrum access rights to another operator, and may desire a mechanism to enforce the use percentage.

According to at least a first set of illustrative embodiments, a method for wireless communications is described. In one configuration, an opportunity may be identified for a first operator to perform a clear channel assessment (CCA) for a shared spectrum. The opportunity may be based on a priority of the first operator with respect to at least one other operator associated with the shared spectrum. The CCA may be performed for the shared spectrum during the identified opportunity to determine whether the shared spectrum is available for a transmission during a transmission interval.

In certain examples, the transmission interval may include a frame or a subframe, wherein the first operator and the at least one other operator are synchronized with respect to a frame timing or a subframe timing, and wherein the first operator and the at least one other operator utilize a same frame structure or subframe structure for the shared spectrum.

In certain examples, the transmission interval comprises a frame or a subframe, wherein the first operator and the at least one other operator are synchronized with respect to a frame timing or a subframe timing, and wherein the first operator and the at least one other operator utilize two or more different frame structures or subframe structures for the shared spectrum.

In certain examples, identifying an opportunity for the first operator to perform the CCA for the shared spectrum may include identifying a CCA opportunity for the first operator from a subset of CCA slots in a subframe, the subset of CCA slots based on the priority of the first operator with respect to the at least one other operator. The CCA opportunity for the first operator may be earlier in the subframe than a CCA opportunity for the at least one other operator when the priority of the first operator is higher than a priority of the at least one other operator.

In certain examples, the priority of the first operator with respect to the at least one other operator may include a restriction on the at least one other operator from performing a CCA during the subframe.

In certain examples, it may be determined, based on the priority of the first operator with respect to the at least one other operator, that a CCA opportunity identified for the first operator to perform a CCA for a transmission interval of the shared spectrum is invalid for performing the CCA by the first operator.

In certain examples, identifying the opportunity for the first operator to perform the CCA for the shared spectrum may include identifying a number of CCA slots for the first operator from among a subset of CCA slots in a subframe, the number of CCA slots based on the priority of the first operator with respect to the at least one other operator. The number of CCA slots allotted to the first operator in the subframe may be greater than a number of CCA slots allotted to the at least one other operator in the subframe if the priority of the first operator is higher than a priority of the at least one other operator. The number of CCA slots for the first operator in the subframe may be further based on whether a transmission interval for which a CCA is performed is an even numbered transmission interval or an odd numbered transmission interval.

In certain examples, it may be determined, based on the priority of the first operator with respect to the at least one other operator, that the first operator is restricted from transmitting over the shared spectrum for at least one transmission interval.

In certain examples, it may be determined that a frame structure of the first operator restricts the first operator from transmitting over the shared spectrum for at least one transmission interval. The frame structure of the first operator may include a silence period that is longer than a silence period for the at least one other operator when the priority of the first operator is lower than a priority of the at least one other operator.

In certain examples, the opportunity for the first operator to perform the CCA for the shared spectrum may be identified from among two or more CCA slots occupying two or more time periods.

In certain examples, the opportunity for the first operator to perform the CCA for the shared spectrum may be identified from among two or more CCA slots occupying two or more frequency tones.

In certain examples, the priority of the first operator with respect to the at least one other operator may be specific to a particular spectrum assigned to a carrier. In cases where one or more operators transmit on multiple carriers, the prioritization may be performed separately or jointly across the two or more carriers.

In certain examples, the shared spectrum may include an unlicensed spectrum.

In certain examples, the opportunity for the first operator to perform the CCA for the shared spectrum may be an opportunity for the first operator to perform a CCA for a first carrier of the shared spectrum. In such examples, a second opportunity may be identified for the first operator to perform a CCA for a second carrier of the shared spectrum, the second opportunity based on the priority of the first operator with respect to the at least one other operator. The CCA may be performed for the second carrier of the shared spectrum during the identified second opportunity to determine whether the second carrier of the shared spectrum is available for a transmission during the transmission interval.

In certain examples, the opportunity for the first operator to perform the CCA for the shared spectrum may be an opportunity for the first operator to perform a CCA for a first carrier of the shared spectrum, and the priority of the first operator with respect to the at least one other operator associated with the shared spectrum may be a first priority. In such examples, a second opportunity may be identified for the first operator to perform a CCA for a second carrier of the shared spectrum, the second opportunity based on a second priority of the first operator with respect to the at least one other operator associated with the shared spectrum, wherein the second priority is different from the first priority. The CCA may be performed for the second carrier of the shared spectrum during the identified second opportunity to determine whether the second carrier of the shared spectrum is available for a transmission during the transmission interval.

In certain examples, the CCA may be performed by a base station or a user equipment (UE). In certain examples, the CCA may be performed on a downlink and/or an uplink. In certain examples, the priority of the first operator with respect to the at least one other operator may be specific to one of a downlink or an uplink. Alternatively, the priority of the first operator with respect to the at least one other operator may apply to both a downlink and an uplink.

According to at least a second set of illustrative embodiments, an apparatus for wireless communications is described. The apparatus may include means for identifying an opportunity for a first operator to perform a clear channel assessment (CCA) for a shared spectrum, the opportunity based on a priority of the first operator with respect to at least one other operator associated with the shared spectrum, and means for performing the CCA for the shared spectrum during the identified opportunity to determine whether the shared spectrum is available for a transmission during a transmission interval.

In certain examples, the apparatus for wireless communications may implement one or more of the examples described above with respect to the first set of illustrative embodiments. In particular, the apparatus for wireless communications may include means for implementing one or more aspects of the method described above with respect to the first set of illustrative embodiments.

According to at least a third set of illustrative embodiments, an apparatus for wireless communications is described. The apparatus may include a processor and memory in electronic communication with the processor. The processor may be configured to identify an opportunity for a first operator to perform a clear channel assessment (CCA) for a shared spectrum, the opportunity based on a priority of the first operator with respect to at least one other operator associated with the shared spectrum, and perform the CCA for the shared spectrum during the identified opportunity to determine whether the shared spectrum is available for a transmission during a transmission interval.

In certain examples, the apparatus for wireless communications may implement one or more of the examples described above with respect to the first or second set of illustrative embodiments. In particular, the processor may be configured to implement one or more aspects of the method described above with respect to the first set of illustrative embodiments.

According to a fourth set of illustrative embodiments, a non-transitory computer-readable medium for storing instructions executable by a processor is described. The computer-readable medium may include instructions to identify an opportunity for a first operator to perform a clear channel assessment (CCA) for a shared spectrum, the opportunity based on a priority of the first operator with respect to at least one other operator associated with the shared spectrum, and instructions to perform the CCA for the shared spectrum during the identified opportunity to determine whether the shared spectrum is available for a transmission during a transmission interval.

In certain examples, the computer-readable medium may implement one or more of the examples described above with respect to the first, second, or third set of illustrative embodiments. In particular, the instructions may be executable by the processor to implement one or more aspects of the method described above with respect to the first set of illustrative embodiments.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
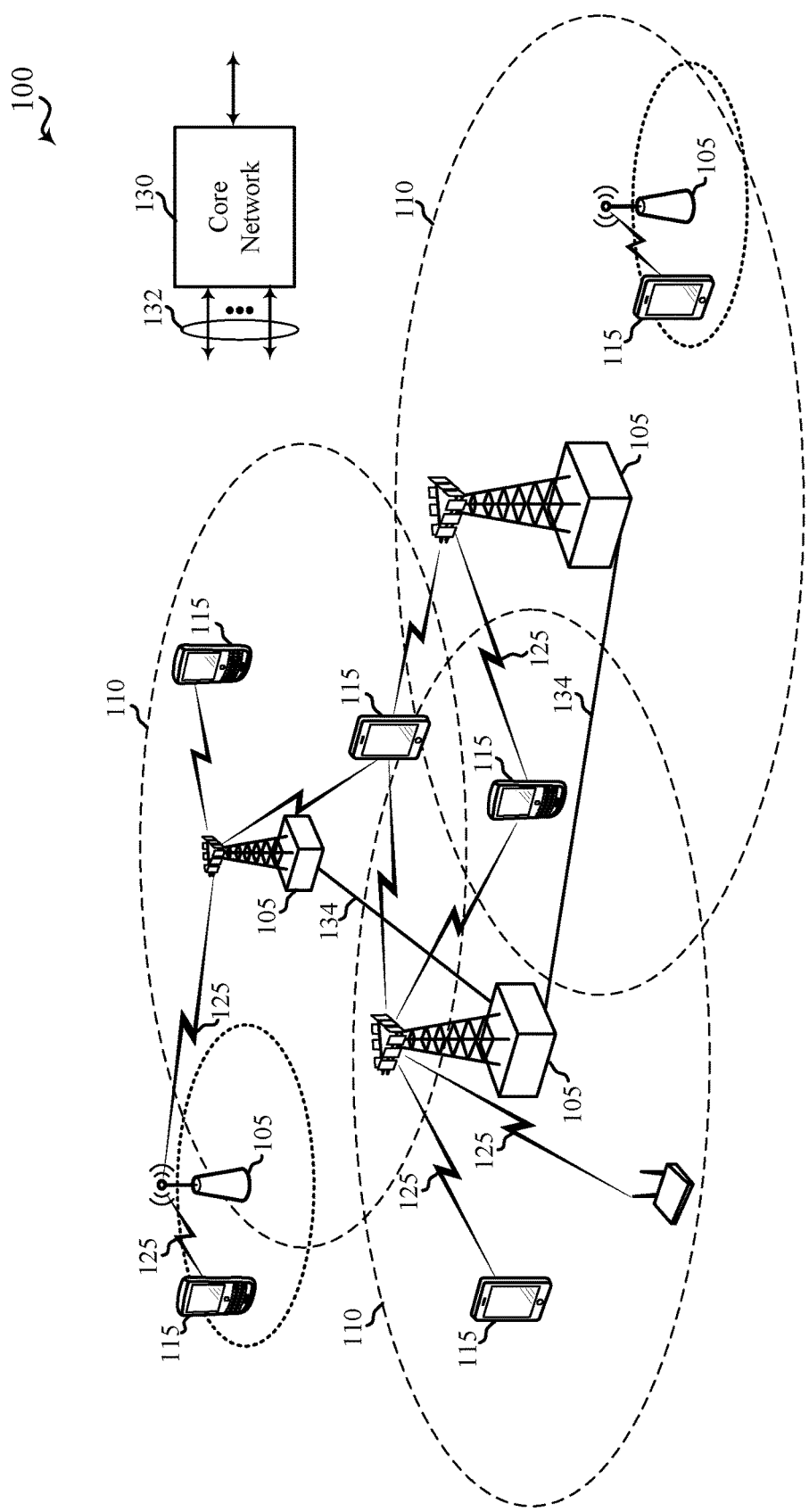
FIG. 1 shows a block diagram of a wireless communications system.

Methods, systems, apparatuses, and devices are described in which different operators (e.g., different MNOs) contend for access to a shared spectrum. When contending for access to the shared spectrum, each of a plurality of devices (e.g., eNBs) may perform a CCA for each of a number of transmission intervals of the shared spectrum, to determine whether the shared spectrum is available for transmissions during the transmission intervals. When a device successfully performs a CCA for a transmission interval, the device may transmit a signal over the shared spectrum to alert other devices that it has reserved the shared spectrum for the transmission interval.

When the devices performing a CCA are operated or serviced by different operators, the devices operated by different operators may perform the CCA in different CCA slots. The CCA slot used by the devices of a particular operator may in some cases be pseudo-randomly identified such that the devices of each operator are provided equal access to the shared spectrum. However, it may be useful, in some cases, to prioritize the access provided the devices of different operators.

In some cases, the methods, systems, apparatuses, and devices described herein may provide operators of cellular networks (e.g., operators of Long Term Evolution (LTE) or LTE-Advanced (LTE-A) communications networks) with prioritized access to a shared unlicensed spectrum (e.g., a WLAN spectrum typically used for WiFi communications). In other cases, the methods, systems, apparatus, and devices described herein may provide operators of cellular networks with prioritized access to a shared licensed spectrum. The techniques disclosed herein may apply to LTE/LTE-A communications transmitted over an unlicensed spectrum.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100. The wireless communications system 100 includes a plurality of base stations (e.g., access points, eNBs, or WLAN access points) 105, a number of user equipments (UEs) 115, and a core network 130. Some of the base stations 105 may communicate with the UEs 115 under the control of a base station controller (not shown), which may be part of the core network 130 or certain base stations 105 (e.g., access points or eNBs) in various embodiments. Some of the base stations 105 may communicate control information and/or user data with the core network 130 through backhaul 132. In some embodiments, some of the base stations 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communications link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the UEs 115 via one or more access point antennas. Each of the base stations 105 may provide communication coverage for a respective coverage area 110. In some embodiments, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a WiFi node or some other suitable terminology. The coverage area 110 for a base station may be divided into sectors making up only a portion of the coverage area (not shown). The wireless communications system 100 may include base stations 105 of different types (e.g., macro, micro, and/or pico base stations). The base stations 105 may also utilize different radio technologies, such as cellular and/or WLAN radio access technologies. The base stations 105 may be associated with the same or different access networks or operator deployments. The coverage areas of different base stations 105, including the coverage areas of the same or different types of base stations 105, utilizing the same or different radio technologies, and/or belonging to the same or different access networks, may overlap.

In some embodiments, the wireless communications system 100 may include an LTE/LTE-A communications system (or network), which LTE/LTE-A communications system may support one or more modes of operation or deployment scenarios for LTE/LTE-A in an unlicensed spectrum. In other embodiments, the wireless communications system 100 may support wireless communications using an unlicensed spectrum and an access technology different from LTE/LTE-A in an unlicensed spectrum, or a licensed spectrum and an access technology different from LTE/LTE-A. In LTE/LTE-A communications systems, the term evolved NodeB or eNB may be generally used to describe of the base stations 105. The wireless communications system 100 may be a Heterogeneous LTE/LTE-A or LTE/LTE-A in an unlicensed spectrum network in which different types of eNBs provide coverage for various geographical regions. For example, each base station 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., S1, etc.). The base stations 105 may also communicate with one another, e.g., directly or indirectly via backhaul links 134 (e.g., X2, etc.) and/or via backhaul 132 (e.g., through core network 130). The wireless communications system 100 may support synchronous or asynchronous operation. For synchronous operation, the base stations may have similar frame and/or gating timing, and transmissions from different base stations may be approximately aligned in time. For asynchronous operation, the base stations may have different frame and/or gating timing, and transmissions from different base stations may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different access networks, such as cellular or other WWAN access networks, or WLAN access networks.

The communications links 125 shown in wireless communications system 100 may include uplinks for carrying uplink (UL) transmissions (e.g., from a UE 115 to a base station 105) and/or downlinks for carrying downlink (DL) transmissions (e.g., from a base station 105 to a UE 115). The UL transmissions may also be called reverse link transmissions, while the DL transmissions may also be called forward link transmissions. The downlink transmissions may be made using a licensed spectrum, an unlicensed spectrum, or both. Similarly, the uplink transmissions may be made using a licensed spectrum, an unlicensed spectrum, or both.

In some embodiments of the wireless communications system 100, various deployment scenarios for LTE/LTE-A in an unlicensed spectrum may be supported, including a supplemental downlink mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., an eNB) and a UE may take place in an unlicensed spectrum. Base stations 105 as well as UEs 115 may support one or more of these or similar modes of operation. OFDMA communications signals may be used in the communications links 125 for LTE downlink transmissions in an unlicensed and/or a licensed spectrum, while SC-FDMA communications signals may be used in the communications links 125 for LTE uplink transmissions in an unlicensed and/or a licensed spectrum.

Figure 2A:
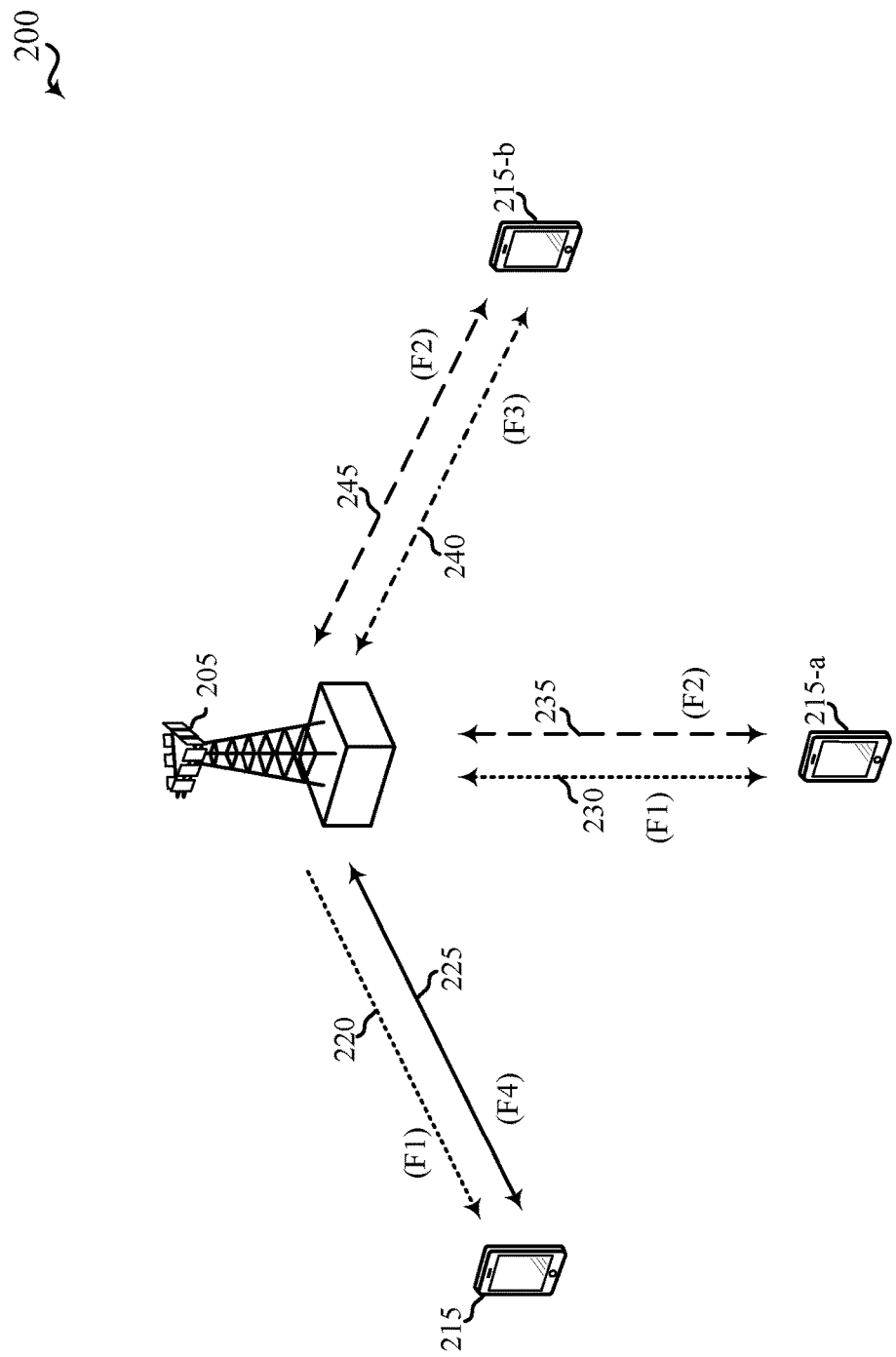
FIG. 2A shows a diagram that illustrates examples of deployment scenarios for using long term evolution (LTE) in an unlicensed spectrum according to various embodiments.

Turning next to FIG. 2A, a wireless communications system 200 illustrates examples of a supplemental downlink mode and a carrier aggregation mode for an LTE network that supports LTE/LTE-A in an unlicensed spectrum. The wireless communications system 200 may be an example of portions of the wireless communications system 100 of FIG. 1. Moreover, the base station 205 may be an example of the base stations 105 of FIG. 1, while the UEs 215, 215-a, and 215-b may be examples of the UEs 115 of FIG. 1.

In the example of a supplemental downlink mode in the wireless communications system 200, the base station 205 may transmit OFDMA communications signals to a UE 215 using a downlink 220. The downlink 220 may be associated with a frequency F1 in an unlicensed spectrum. The base station 205 may transmit OFDMA communications signals to the same UE 215 using a bidirectional link 225 and may receive SC-FDMA communications signals from that UE 215 using the bidirectional link 225. The bidirectional link 225 may be associated with a frequency F4 in a licensed spectrum. The downlink 220 in the unlicensed spectrum and the bidirectional link 225 in the licensed spectrum may operate concurrently. The downlink 220 may provide a downlink capacity offload for the base station 205. In some embodiments, the downlink 220 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in the wireless communications system 200, the base station 205 may transmit OFDMA communications signals to a UE 215-a using a bidirectional link 230 and may receive SC-FDMA communications signals from the same UE 215-a using the bidirectional link 230. The bidirectional link 230 may be associated with the frequency F1 in the unlicensed spectrum. The base station 205 may also transmit OFDMA communications signals to the same UE 215-a using a bidirectional link 235 and may receive SC-FDMA communications signals from the same UE 215-a using the bidirectional link 235. The bidirectional link 235 may be associated with a frequency F2 in a licensed spectrum. The bidirectional link 230 may provide a downlink and uplink capacity offload for the base station 205. Like the supplemental downlink described above, this scenario may occur with any service provider (e.g., MNO) that uses a licensed spectrum and needs to relieve some of the traffic and/or signaling congestion.

In another example of a carrier aggregation mode in the wireless communications system 200, the base station 205 may transmit OFDMA communications signals to a UE 215-b using a bidirectional link 240 and may receive SC-FDMA communications signals from the same UE 215-b using the bidirectional link 240. The bidirectional link 240 may be associated with a frequency F3 in an unlicensed spectrum. The base station 205 may also transmit OFDMA communications signals to the same UE 215-b using a bidirectional link 245 and may receive SC-FDMA communications signals from the same UE 215-b using the bidirectional link 245. The bidirectional link 245 may be associated with the frequency F2 in the licensed spectrum. The bidirectional link 240 may provide a downlink and uplink capacity offload for the base station 205. This example and those provided above are presented for illustrative purposes and there may be other similar modes of operation or deployment scenarios that combine LTE in a licensed spectrum and LTE in an unlicensed spectrum for capacity offload.

As described above, the typical service provider that may benefit from the capacity offload offered by using LTE in an unlicensed band is a traditional MNO with LTE spectrum. For these service providers, an operational configuration may include a bootstrapped mode (e.g., supplemental downlink, carrier aggregation) that uses an LTE primary component carrier (PCC) on a licensed spectrum and a secondary component carrier (SCC) on an unlicensed spectrum.

In the carrier aggregation mode, data and control may generally be communicated in a licensed spectrum (e.g., bidirectional links 225, 235, and 245) while data may generally be communicated in an unlicensed spectrum (e.g., bidirectional links 230 and 240). The carrier aggregation mechanisms supported when using the unlicensed spectrum may fall under a hybrid frequency division duplexing-time division duplexing (FDD-TDD) carrier aggregation or a TDD-TDD carrier aggregation with different symmetry across component carriers.

Figure 2B:
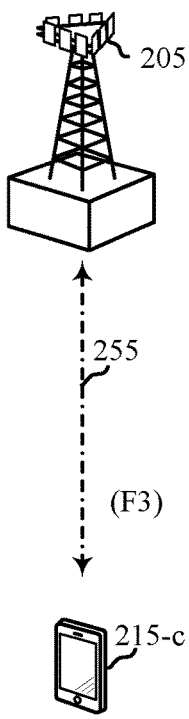
FIG. 2B shows a diagram that illustrates an example of a standalone mode using LTE in an unlicensed spectrum according to various embodiments.

FIG. 2B shows a wireless communications system 250 that illustrates an example of a standalone mode for LTE in an unlicensed spectrum. The wireless communications system 250 may be an example of portions of the wireless communications system 100 of FIG. 1. Moreover, the base station 205 may be an example of the base stations 105 and/or 205 described with reference to FIGS. 1 and/or 2A, while the UE 215-c may be an example of the UEs 115 and/or 215 of FIGS. 1 and/or 2A.

In the example of a standalone mode in the wireless communications system 250, the base station 205 may transmit OFDMA communications signals to the UE 215-c using a bidirectional link 255 and may receive SC-FDMA communications signals from the UE 215-c using the bidirectional link 255. The bidirectional link 255 may be associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event host, hotel, enterprise, or large corporation that does not have a licensed spectrum.

In some embodiments, a transmitting device such as a base station 105 and/or 205 described with reference to FIGS. 1, 2A, and/or 2B, or a UE 115 and/or 215 described with reference to FIGS. 1, 2A, and/or 2B, may use a gating interval to gain access to a channel of the shared spectrum (e.g., to a channel of the licensed or unlicensed spectrum).

The gating interval may define an application of a contention-based protocol, such as a Listen Before Talk (LBT) protocol based on the LBT protocol specified in ETSI (EN 301 893). When using a gating interval that defines the application of an LBT protocol, the gating interval may indicate when a transmitting device needs to perform a Clear Channel Assessment (CCA). The outcome of the CCA indicates to the transmitting device whether a channel of the shared spectrum is available or in use. When the CCA indicates that the channel is available (e.g., "clear" for use), the gating interval may allow the transmitting device to use the channel—typically for a predefined transmission interval. When the CCA indicates that the channel is not available (e.g., in use or reserved), the gating interval may prevent the transmitting device from using the channel during the transmission interval.

In some cases, it may be useful for a transmitting device to generate a gating interval on a periodic basis and synchronize at least one boundary of the gating interval with at least one boundary of a periodic frame structure. For example, it may be useful to generate a periodic gating interval for a cellular downlink in a shared spectrum, and to synchronize at least one boundary of the periodic gating interval with at least one boundary of a periodic frame structure (e.g., LTE/LTE-A radio frame) associated with the cellular downlink. Examples of such synchronization are shown in FIG. 3.

Figure 3:
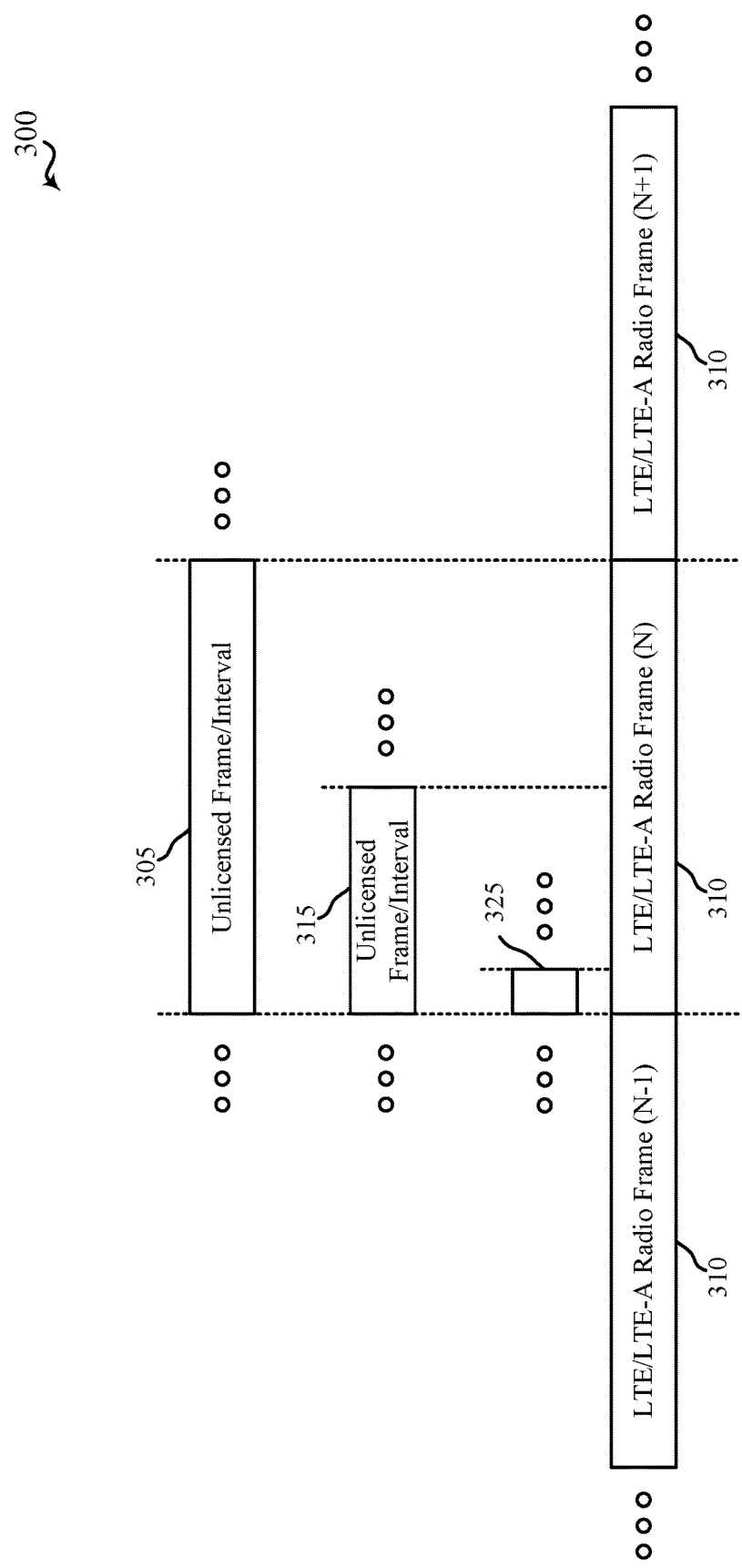
FIG. 3 shows various examples of unlicensed frames/intervals and their relationships to a periodic frame structure including, for example, LTE/LTE-A radio frames.

FIG. 3 illustrates examples 300 of an unlicensed frame/interval 305, 315, and/or 325 for a cellular downlink in an unlicensed spectrum. The unlicensed frame/interval 305, 315, and/or 325 may be used as a periodic gating interval by a base station that supports transmissions over the unlicensed spectrum. Examples of such a base station may be the base stations 105 and/or 205 described with reference to FIGS. 1, 2A, and/or 2B. The unlicensed frame/interval 305, 315, and/or 325 may be used with the wireless communications system 100, 200, and/or 250 described with reference to FIGS. 1, 2A, and/or 2B.

By way of example, the duration of the unlicensed frame/interval 305 is shown to be equal to (or approximately equal to) a duration of an LTE/LTE-A radio frame 310 of a periodic frame structure associated with a cellular downlink. In some embodiments, "approximately equal" means the duration of the unlicensed frame/interval 305 is within a cyclic prefix (CP) duration of the duration of the periodic frame structure.

At least one boundary of the unlicensed frame/interval 305 may be synchronized with at least one boundary of the periodic frame structure that includes the LTE/LTE-A radio frames N−1 to N+1. In some cases, the unlicensed frame/interval 305 may have boundaries that are aligned with the frame boundaries of the periodic frame structure. In other cases, the unlicensed frame/interval 305 may have boundaries that are synchronized with, but offset from, the frame boundaries of the periodic frame structure. For example, the boundaries of the unlicensed frame/interval 305 may be aligned with subframe boundaries of the periodic frame structure, or with subframe midpoint boundaries (e.g., the midpoints of particular subframes) of the periodic frame structure.

In some cases, the periodic frame structure may include LTE/LTE-A radio frames N−1 to N+1. Each LTE/LTE-A radio frame 310 may have a duration of ten milliseconds, for example, and the unlicensed frame/interval 305 may also have a duration of ten milliseconds. In these cases, the boundaries of the unlicensed frame/interval 305 may be synchronized with the boundaries (e.g., frame boundaries, subframe boundaries, or subframe midpoint boundaries) of one of the LTE/LTE-A radio frames (e.g., the LTE/LTE-A radio frame (N)).

By way of example, the duration of the unlicensed frames/intervals 315 and 325 are shown to be sub-multiples of (or approximate sub-multiples of) the duration of the periodic frame structure associated with the cellular downlink. In some embodiments, an "approximate sub-multiple of" means the duration of the unlicensed frame/interval 315, 325 is within a cyclic prefix (CP) duration of the duration of a sub-multiple of (e.g., half or one-tenth) the periodic frame structure. For example, the unlicensed frame/interval 315 may have a duration of five milliseconds and the unlicensed frame/interval 325 may have a duration of 1 or 2 milliseconds.

Figure 4:
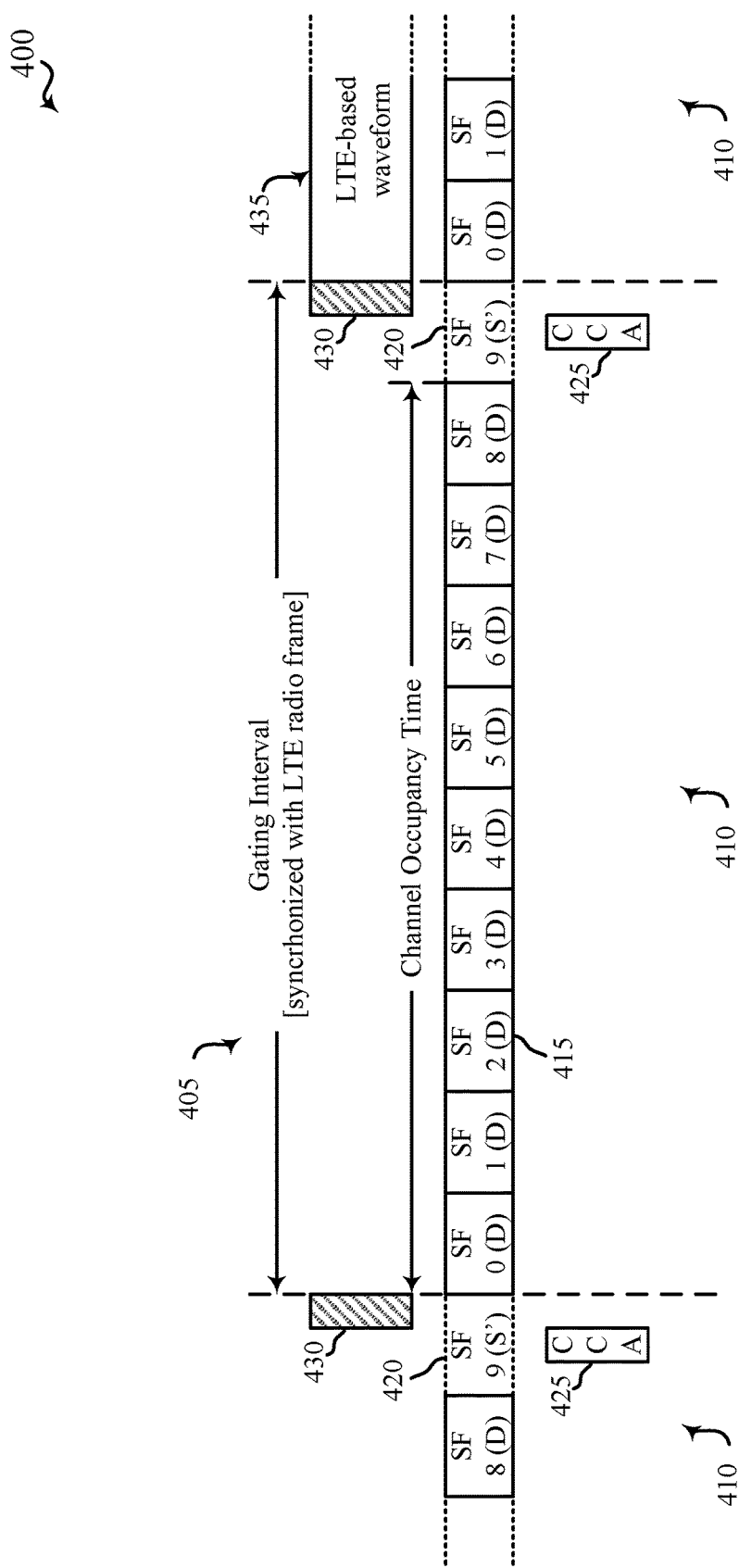
FIG. 4 shows a diagram that illustrates an example of a periodic gating structure waveform according to various embodiments.

FIG. 4 illustrates an example 400 of a periodic gating interval 405 for a cellular downlink in an unlicensed spectrum. The periodic gating interval 405 may be used by a base station that supports LTE/LTE-A in an unlicensed spectrum. Examples of such a base station may be the base stations 105 and 205 described with reference to FIGS. 1, 2A, and/or 2B. The periodic gating interval 405 may also be used with the wireless communications system 100, 200, and/or 250 of FIGS. 1, 2A, and and/or 2B.

By way of example, the duration of the periodic gating interval 405 is shown to be equal to (or approximately equal to) the duration of a periodic frame structure 410 associated with the cellular downlink. The boundaries of the periodic gating interval 405 may be synchronized with (e.g., aligned with) the boundaries of the periodic frame structure 410.

The periodic frame structure 410 may include an LTE/LTE-A radio frame having ten subframes (e.g., SF0, SF1, . . . , SF9). Subframes SF0 through SF8 may be downlink (D) subframes 415, and subframe SF9 may be a special (S') subframe 420. The D subframes 415 may collectively define a channel occupancy time of the LTE radio frame, and at least part of the S' subframe 420 may define a channel idle time. Under versions of the LTE/LTE-A standards, an LTE/LTE-A radio frame may have a maximum channel occupancy time (ON time) between one and 9.5 milliseconds, and a minimum channel idle time (OFF time) of five percent of the channel occupancy time (e.g., a minimum of 50 microseconds). To ensure compliance with the LTE/LTE-A standards, the periodic gating interval 405 may abide by these requirements of the LTE/LTE-A standard by providing a 0.5 millisecond guard period (i.e., OFF time) as part of the S' subframe 420.

Because the S' subframe 420 has a duration of one millisecond, it may include one or more CCA slots or windows 425 in which the transmitting devices contending for a particular channel of an unlicensed spectrum may perform their CCAs. When a transmitting device's CCA indicates the channel is available, but the device's CCA is completed before the end of the periodic gating interval 405, the device may transmit one or more signals to reserve the channel until the end of the periodic gating interval 405. The one or more signals may in some cases include Channel Usage Beacon Signals (CUBS) or Partial CUBS (PCUBS), also referred to as Channel Usage Pilot Signals (CUPS) 430, respectfully. CUBS (or CUPS) 430 may be used for both channel synchronization and channel reservation. That is, a device that performs a CCA for the channel after another device begins to transmit CUBS on the channel may detect the energy of the CUBS 430 and determine that the channel is currently unavailable.

Following a transmitting device's successful completion of the CCA for a channel and/or the transmission of CUBS 430 over a channel, the transmitting device may use the channel for up to a predetermined period of time (e.g., one LTE radio frame) to transmit a waveform (e.g., an LTE-based waveform 435).

Figure 5:
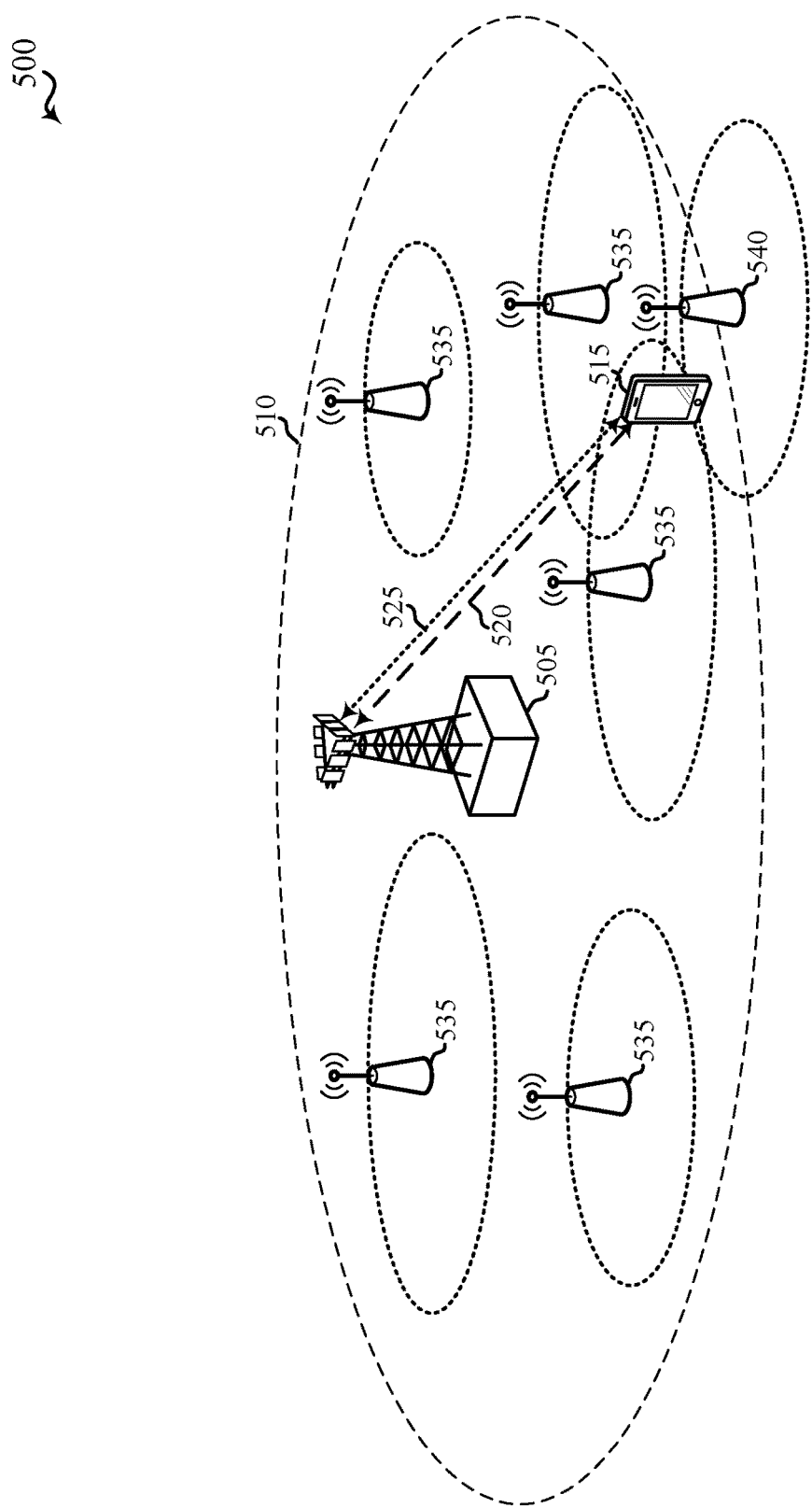
FIG. 5 illustrates a wireless communications system in which a number of wireless access points and a UE are within the coverage area of a base station.

FIG. 5 illustrates a wireless communications system 500 in which a number of wireless access points (e.g., WiFi nodes) 535 and a UE 515 are within the coverage area 510 of a base station 505. In some examples, the base station 505, UE 515, and/or wireless access points 535 may be respective examples of one or more aspects of the base stations 105 and/or 205, UEs 115 and/or 215, and/or wireless access points 105 described with reference to FIGS. 1, 2A, and/or 2B.

The base station 505 and UE 515 may communicate with one another over a licensed or unlicensed spectrum using either or both of a bidirectional link 520 in an licensed spectrum and a bidirectional link 525 in an unlicensed spectrum. Such communication may be an example of the carrier aggregation scenario described above with respect to FIG. 2A.

When attempting to reserve access to the bidirectional link 525 in the unlicensed spectrum, both the base station 505 and the UE 515 may perform CCAs to determine availability of the unlicensed spectrum. In some cases, both the base station 505 and the UE 515 may perform CCAs to account for the presence of wireless access points 540 and/or other potential transmitting devices that are outside the coverage area 510 of the base station 505, but within range of the UE 515. Such wireless access points 540 may be referred to as "hidden nodes," because their presence may be unknown to and hidden from the base station 505. Thus, in the absence of the UE 515 performing a CCA to discover possible transmissions of the wireless access point 540, the base station 505 might determine that the unlicensed spectrum is available in a particular transmission interval when, in fact, a hidden wireless access point 540 has already reserved the unlicensed spectrum in the vicinity of the UE 515).

Figure 6:
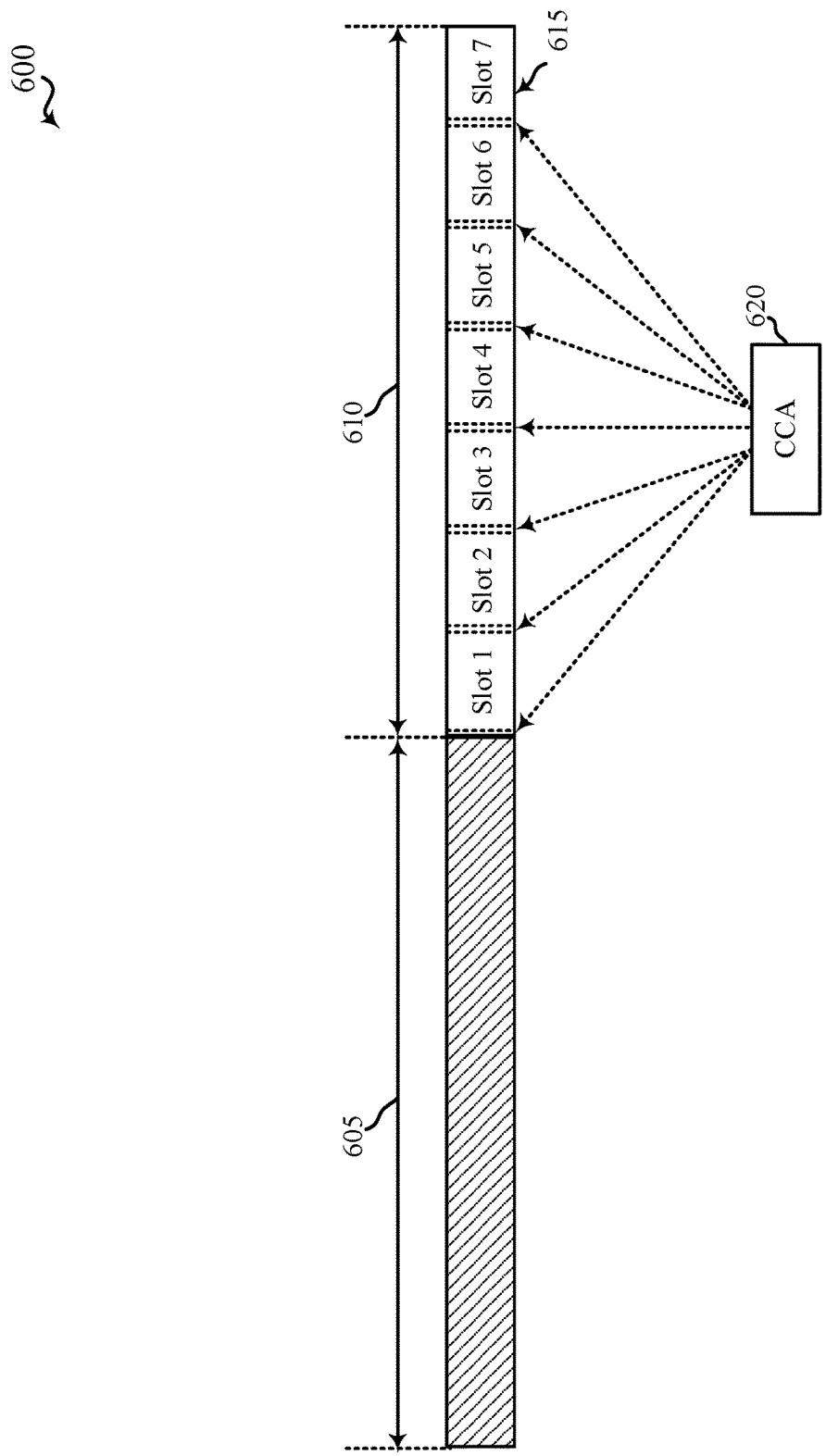
FIG. 6 shows a diagram that illustrates an example of placement options for clear channel assessment (CCA) slots in an S' subframe according to various embodiments.

FIG. 6 illustrates how a contention-based protocol such as LBT may be implemented within an S' subframe 600 of a gating interval, such as an S' subframe of the ten millisecond periodic gating interval 405 described with reference to FIG. 4. The contention-based protocol may be used with, for example, the wireless communications system 100, 200, 250, and/or 500, base stations 105, 205, and/or 505, and/or UEs 115, 215, and/or 515 described with reference to FIGS. 1, 2A, 2B, and/or 5.

The S' subframe 600 may have a guard period (or silence period) 605 and a CCA period 610. By way of example, each of the guard period 605 and the CCA period 610 may have a duration of 0.5 milliseconds and include seven OFDM symbol positions 615 (labeled in FIG. 6 as Slot 1 through 7). In some cases, a base station may select one or more of the OFDM symbol positions 615 to perform a CCA 620 for a subsequent transmission interval of an unlicensed spectrum, to determine whether the transmission interval of the unlicensed spectrum is available for a transmission during the transmission interval. In some cases, different ones of the OFDM symbol positions 615 may be pseudo-randomly identified or selected by a base station in different occurrences of the S' subframe 600 (i.e., in different S' subframes used to perform a CCA 620 for different transmission intervals of the unlicensed spectrum). The pseudo-random identification or selection of OFDM symbol positions may be controlled using a hopping sequence.

The LBT protocol may take the form of an LBT Frame Based Equipment (LBT-FBE) protocol or an LBT Load Based Equipment (LBT-LBE) protocol. An LBT-FBE protocol may have a fixed/periodic timing and may not be directly influenced by traffic demand (e.g., its timing can be changed through reconfiguration). In contrast, an LBT-LBE protocol may not have a fixed timing (i.e., be asynchronous) and may be largely influenced by traffic demand.

The base stations of a wireless communications system may be operated by the same or different operators. In some embodiments, the base stations operated by different operators may select different ones of the OFDM symbol positions 615 in a particular S' subframe 600, thereby avoiding CCA collisions between different operators. If the pseudo-random selection mechanisms of different operators are coordinated, OFDM symbol positions 615 may be pseudo-randomly selected by a plurality of different operators such that the base stations of the different operators each have an equal opportunity to perform a CCA 620 in the earliest OFDM symbol position (i.e., Slot 1) for certain transmission intervals. Thus, over time, the base stations of the different operators may each have an opportunity to perform a CCA 620 first and gain access to a transmission interval of the unlicensed spectrum regardless of the needs of other base stations of other operators. After a successful CCA 620, a base station may transmit CUBS to prevent other operators from using one or more channels of the transmission interval of the unlicensed spectrum.

In some cases, it may be desirable to prioritize the access that different operators have to a shared spectrum (e.g., a shared licensed spectrum and/or a shared unlicensed spectrum). A need for prioritization may arise for various reasons. For example, different operators may pay different rates for accessing a shared spectrum, depending on the quality of service each operator desires. Or, for example, one operator may rent a percentage of their shared spectrum access rights to another operator, and may desire a mechanism to enforce the use percentage.

FIGS. 7A, 7B, 7C, and 7D illustrate various techniques for prioritizing access to a shared spectrum. Each of these figures illustrates a sequence of transmission intervals and, assuming use of a gating interval including the S' subframe 600 described with reference to FIG. 6, shows which OFDM symbol position or CCA slot is used by a first operator (Operator #1) and a second operator (Operator #2) in each of the transmission intervals.

Figure 7A:
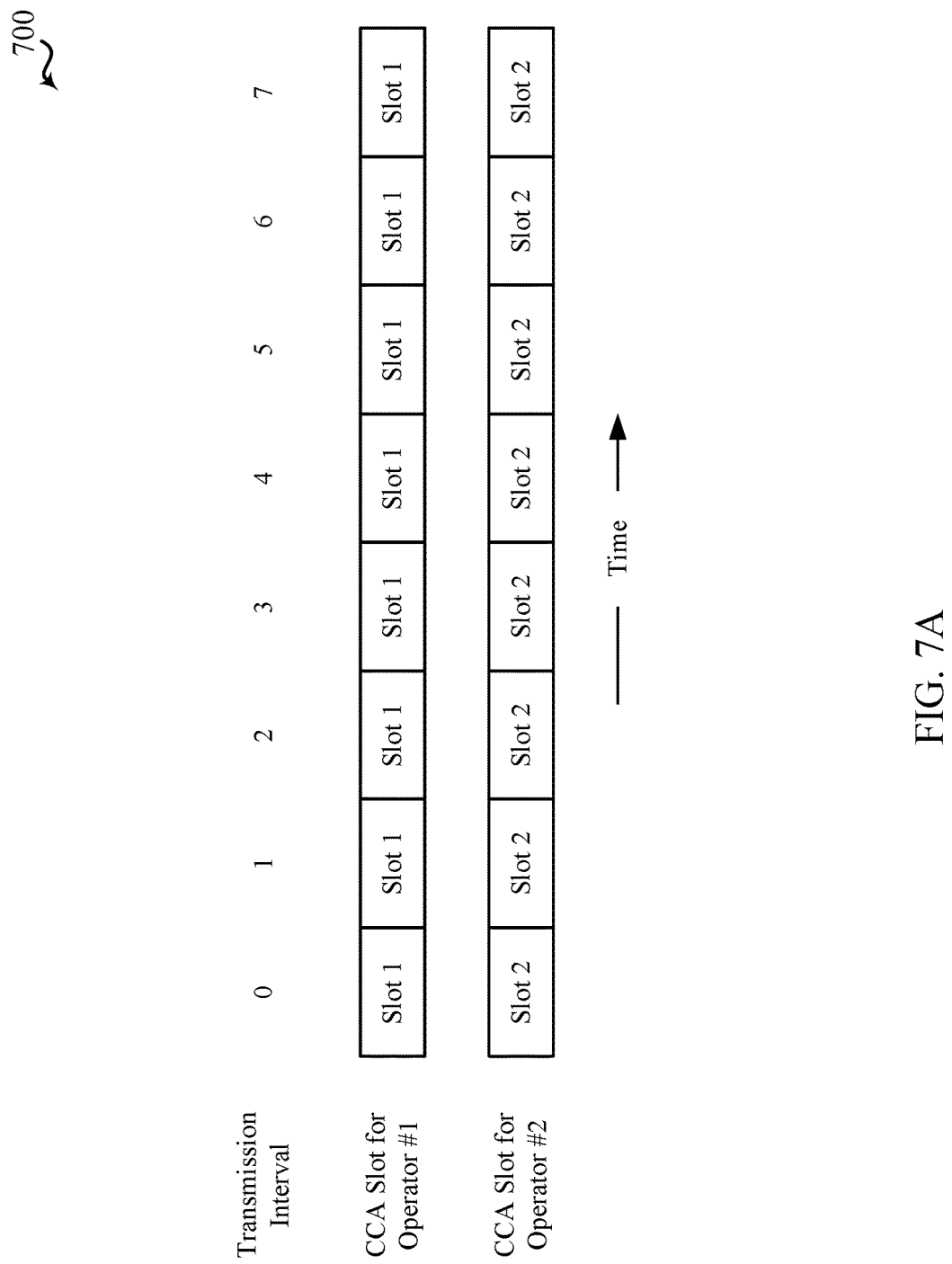
FIGS. 7A, 7B, 7C, and 7D illustrate various techniques for prioritizing access to a shared spectrum according to various embodiments.

Referring now to FIG. 7A, there is shown an example of a fixed prioritization technique 700, in which the first operator uses Slot 1 to perform a CCA in each transmission interval and the second operator uses Slot 2 to perform a CCA in each transmission interval. Using such a technique, the first operator is able to access the shared spectrum in any transmission interval that it desires to access the shared spectrum (assuming no interference from hidden nodes).

Figure 7B:
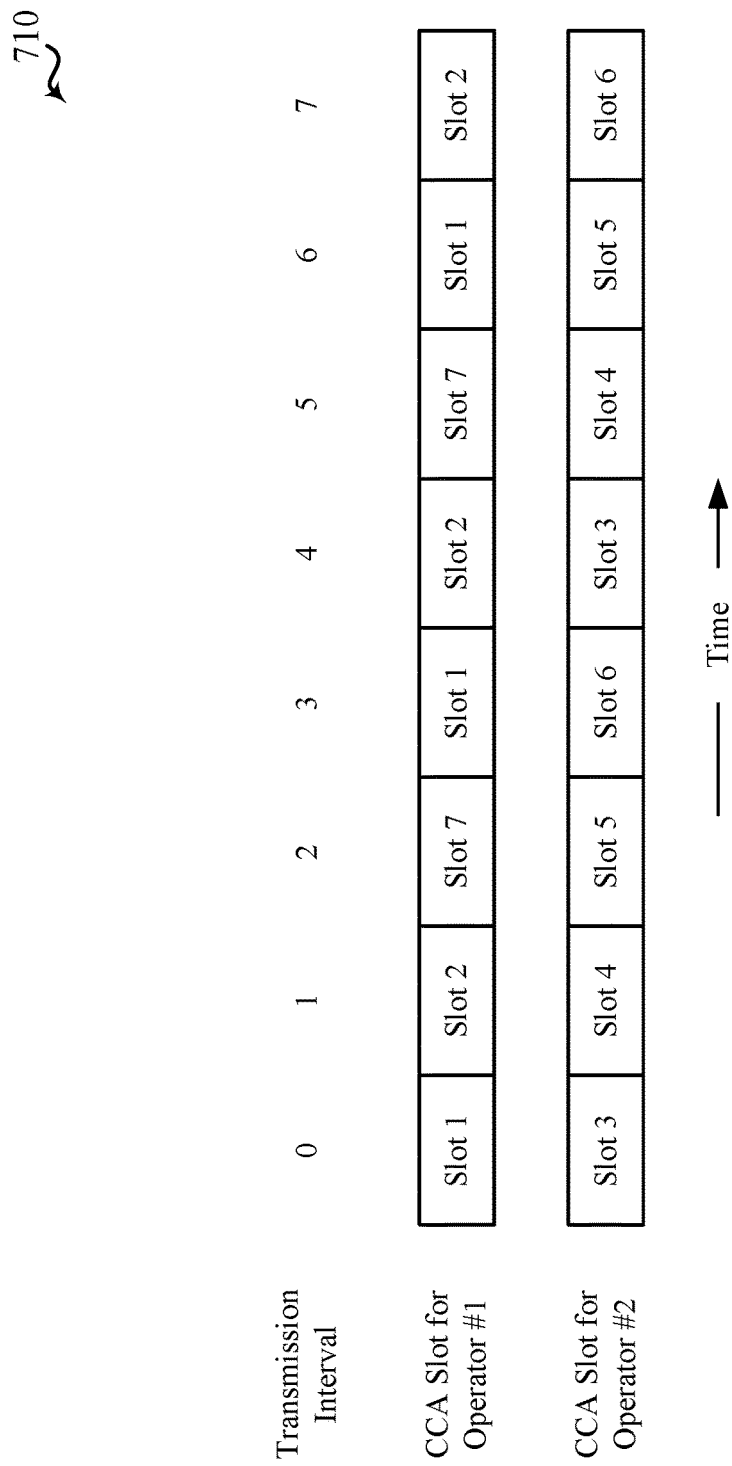

Referring to FIG. 7B, there is shown an example of a restricted hopping prioritization technique 710. In this technique, instead of allowing each of the operators to identify one or more CCA opportunities over all available locations (e.g., 7 CCA slots), a set of CCA opportunities identified by each of the first and second operators may be restricted on a per operator basis. For example, among 7 CCA slots in FIG. 7B, the first operator (Operator #1) may have a CCA hopping within Slot 1, Slot 2, and Slot 7, and the second operator (Operator #2) may identify the CCA locations within Slot 3, Slot 4, Slot 5, and Slot 6. Assuming a sequential rotation through the slots allocated each operator (as shown), the first operator may have a two in three ($\frac{2}{3}$) chance of gaining access to a transmission interval of the shared spectrum over the second operator.

Figure 7C:
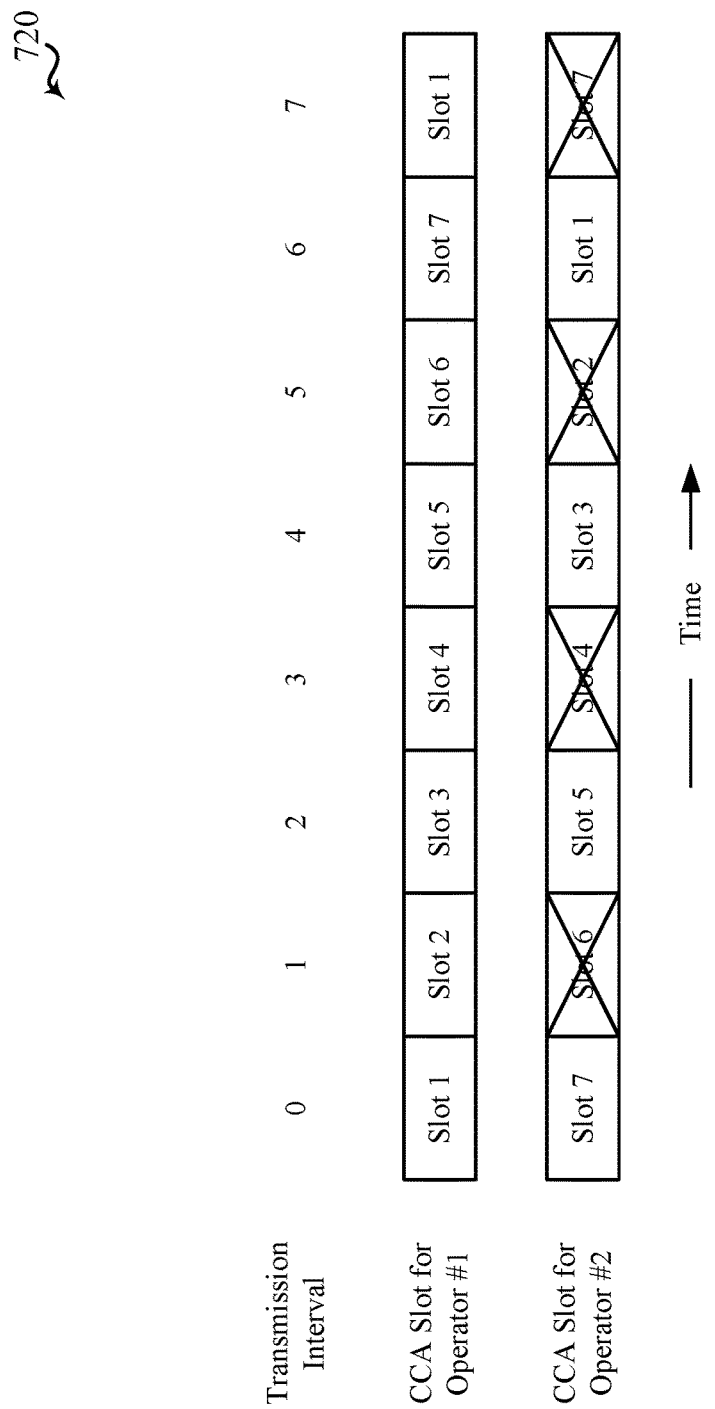

Turning now to FIG. 7C, there is shown an example of a restricted transmission prioritization technique 720, in which the first operator performs CCA for each of the transmission intervals, but the second operator is restricted from performing CCA and/or transmitting in every other transmission intervals (e.g., in odd numbered transmission intervals). In some embodiments (as shown), the second operator may perform CCA for each of the transmission intervals, but with a hopping sequence that is opposite that used by the first operator. In odd number transmission intervals, the CCA performed by the second operator may be declared invalid, thereby restricting the second operator from transmitting in the odd numbered transmission intervals. In the illustrated example, this provides the first operator a three in four chance of gaining access to a transmission interval of the shared spectrum.

Figure 7D:
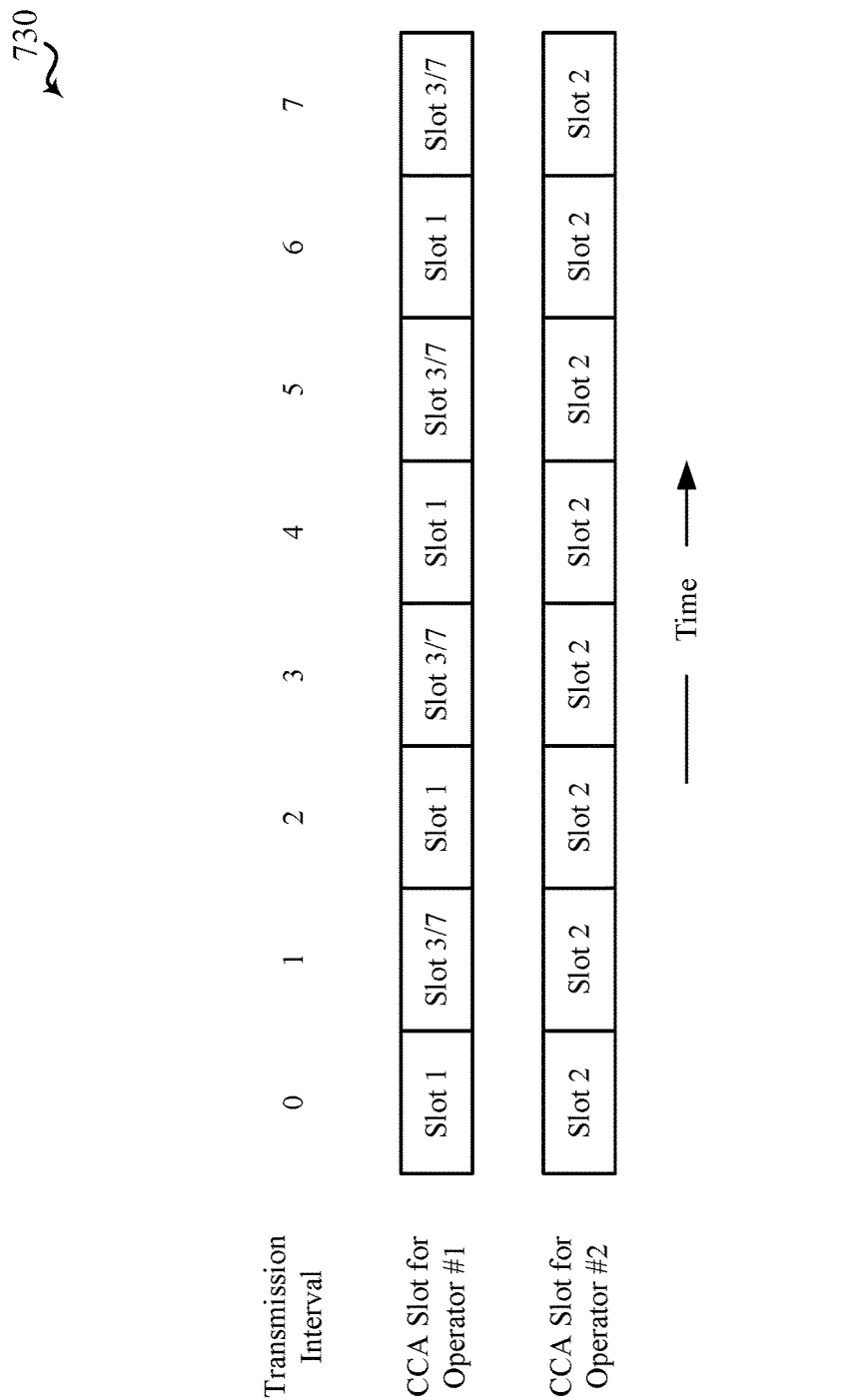

In FIG. 7D, there is shown an example of a multiple CCA location prioritization technique 730, in which each of operators may be allocated two or more CCA locations in at least some transmission intervals. For example, the first operator is allocated two CCA slots for odd numbered transmission intervals and one CCA slot for even numbered transmission intervals, as shown in FIG. 7D. In contrast, the second operator is allocated only one CCA slot in each transmission interval. In alternate embodiments, the first and/or second operator may be allocated two or more CCA slots in any number of transmission intervals, with static or varying assignments of slot numbers. In the example shown, the first operator has an approximate three in two chance of gaining access to a transmission interval of the shared spectrum.

Each of the prioritization techniques described with reference to FIGS. 7A-7D may be extended to prioritize more than two operators. In the case of more than two operators, the priority of the first operator with respect to at least one other operator may be specific to a particular spectrum assigned to a carrier. That is, the first operator may be the only operator having a priority with respect to the at least one other operator for the particular spectrum. In other embodiments, the priority of the first operator with respect to the at least one other operator may be shared by other operators. That is, the first operator may have the same priority as another operator (e.g., a second operator) with respect to the at least one other operator. The latter may be achieved using orthogonal transmissions and/or other techniques for sharing a same spectrum. First and second operators may also share the same priority with respect to the at least one other operator by, for example, alternating the priority given the first and second operators in alternating transmission intervals, such that, over time, each of the first and second operators is provided the same priority with respect to the same spectrum. In cases where one or more operators transmit on multiple carriers, the prioritization may be performed separately or jointly across the two or more carriers.

In order to provide fair occupancy among operators, the CCA opportunity for each operator may change over different transmission intervals, and over a long run, the hopping of CCA opportunities may be such that each operator has an equal share of occupancy rate.

Figure 8A:
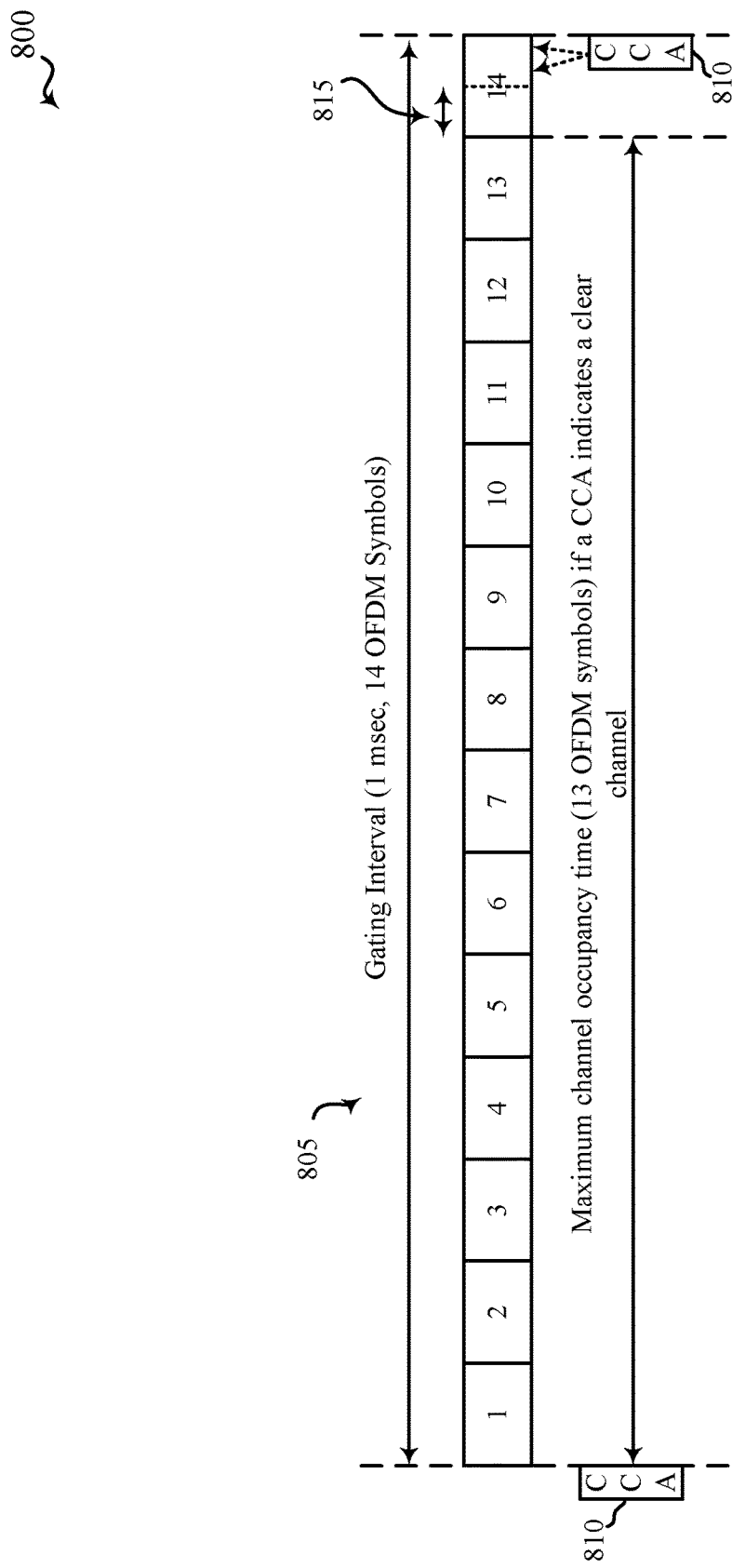
FIG. 8A shows a diagram that illustrates an example of a periodic gating structure waveform with 14 Orthogonal Frequency-Division Multiplexing (OFDM) symbols according to various embodiments.

FIG. 8A provides an example 800 of a one millisecond (e.g., one LTE/LTE-A subframe) gating interval 805. A one millisecond gating interval 805 may be used by the base stations 105, 205, and/or 505 described with reference to FIGS. 1, 2A, 2B, and/or 5. The gating interval 805 may be used with the wireless communications system 100, 200, 250, and/or 500 of FIGS. 1, 2A, 2B, and/or 5.

Versions of the LTE specification require a channel occupancy time (ON time) one millisecond. Under a channel idle time five percent of the channel occupancy time, the LTE specification may dictate a minimum gating interval duration of 1.05 milliseconds. However, if the LTE specification could be relaxed to require a minimum channel occupancy time of perhaps 0.95 milliseconds, then a one millisecond gating interval would be possible.

As shown in FIG. 8A, a gating interval 805 of one millisecond may include 14 OFDM symbols (or symbol positions). When a successful CCA is performed during a CCA slot 810 preceding the gating interval 805, a downlink transmission may occur during the first 13 OFDM symbols of the gating interval 805. Such a downlink transmission may have a duration (or channel occupancy time) of 929 microseconds. In accord with versions of the LTE standard, a channel occupancy time of 929 microseconds would require a channel idle time 815 of 48 microseconds, which is less than the 71.4 microsecond duration of one OFDM symbol. As a result, the channel idle time 815 of 48 microseconds, as well as one or more CCA slots 810, may be provided during the $14^{th}$ OFDM symbol position. In some cases, two CCA slots 810 having a total duration of 20 microseconds may be provided during the $14^{th}$ OFDM symbol position, thereby enabling some amount of CCA randomization. Of note, each CCA slot 810 in the example 800 has a duration of less than one OFDM symbol.

Figure 8B:
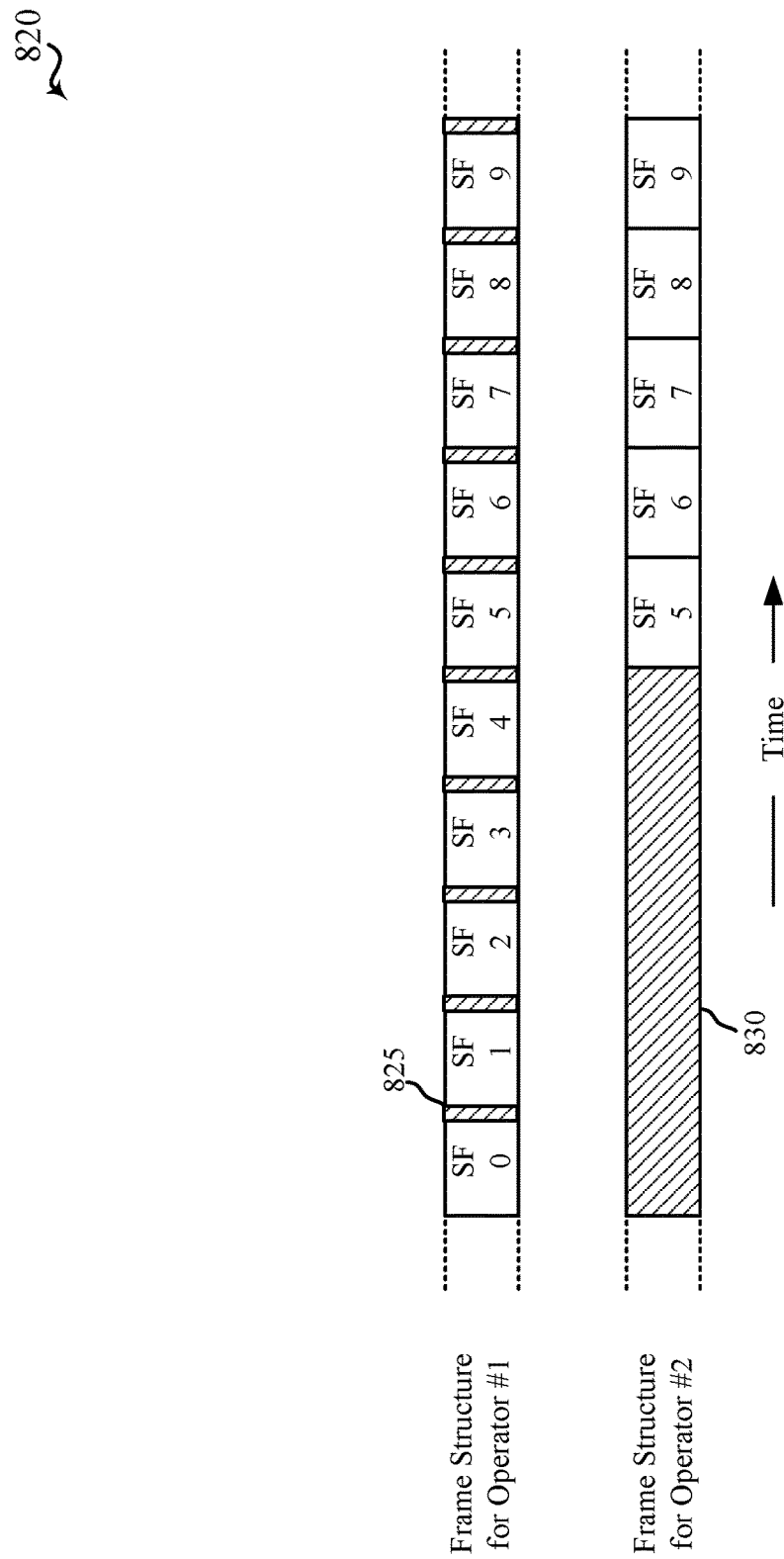
FIG. 8B is an example comparison of a first frame structure for a first operator and a second frame structure for a second operator according to various embodiments.

Turning now to FIG. 8B, there is shown an example comparison 820 of a first frame structure for a first operator (Operator #1) and a second frame structure for a second operator (Operator #2). Each frame structure includes ten subframes (i.e., subframes SF0 through SF9). Each subframe of the frame structure of the first operator may be configured as described with reference to FIG. 8A and may include an approximate five percent silence period 825, thereby enabling a CCA slot to be identified, and a CCA is performed, in each subframe of the frame structure of the first operator. Alternatively, the frame structure of the first operator may follow a ten-subframe based structure, where a CCA is performed in one of the ten subframes instead of in every single subframe, while the remaining subframes may be fully utilized (except for possible switching from downlink to uplink transmissions or vice versa). However the frame structure of the second operator has an approximate fifty percent silence period 830, which silence period restricts the second operator from performing a CCA and/or transmitting in each of subframes SF0 through SF4. Such a difference in silence periods provides the first operator with opportunities to access at least five transmission intervals of a shared spectrum without competing with the second operator for access to the five transmission intervals. The priority of the first operator over the second operator may be further extended by, for example, increasing the length of the silence period for the frame structure of the second operator and/or applying one of the prioritization techniques described with reference to FIGS. 7A, 7B, 7C, and/or 7D to subframes SF5 through SF9.

Figure 9A:
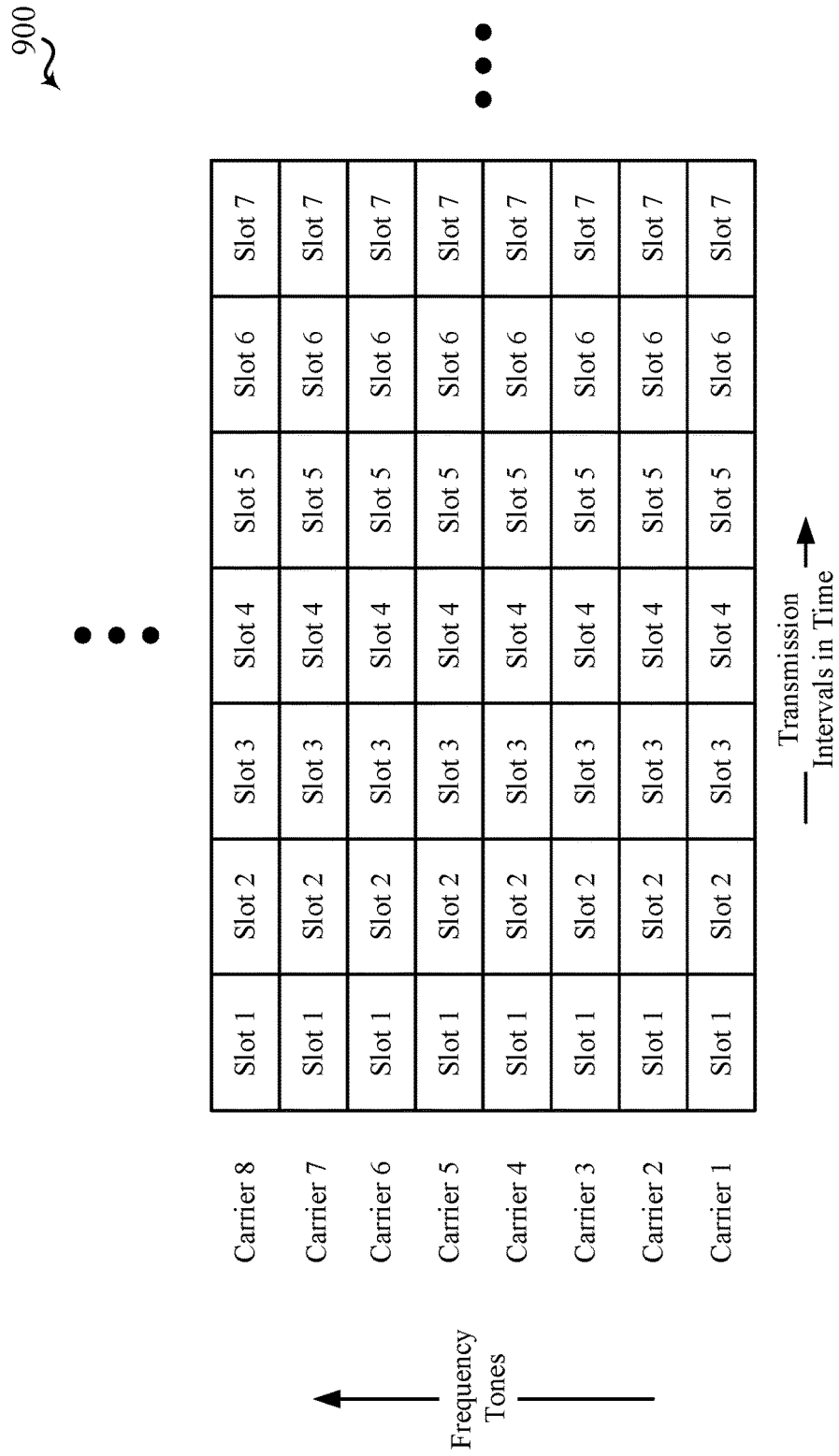
FIG. 9A illustrates the performance of CCAs for different carriers according to various embodiments.

In some cases, a device (e.g., a base station) of a first operator may be capable of transmitting over two or more carriers (e.g., two or more frequency tones). In these cases, a CCA may be performed for the different carriers using an example 900 of a single prioritization technique for all carriers, as shown in FIG. 9A. Alternately, different prioritization techniques may be applied to some or all of the carriers. Different prioritization techniques may in some cases be selected from among the various techniques described with reference to FIGS. 7A, 7B, 7C, 7D, and/or 8B, or variants thereof. The different prioritization techniques may provide a first operator with priority over at least one other operator with respect to a first set of one or more carriers, while providing the at least one other operator priority over the first operator with respect to a second set of one or more carriers.

Figure 9B:
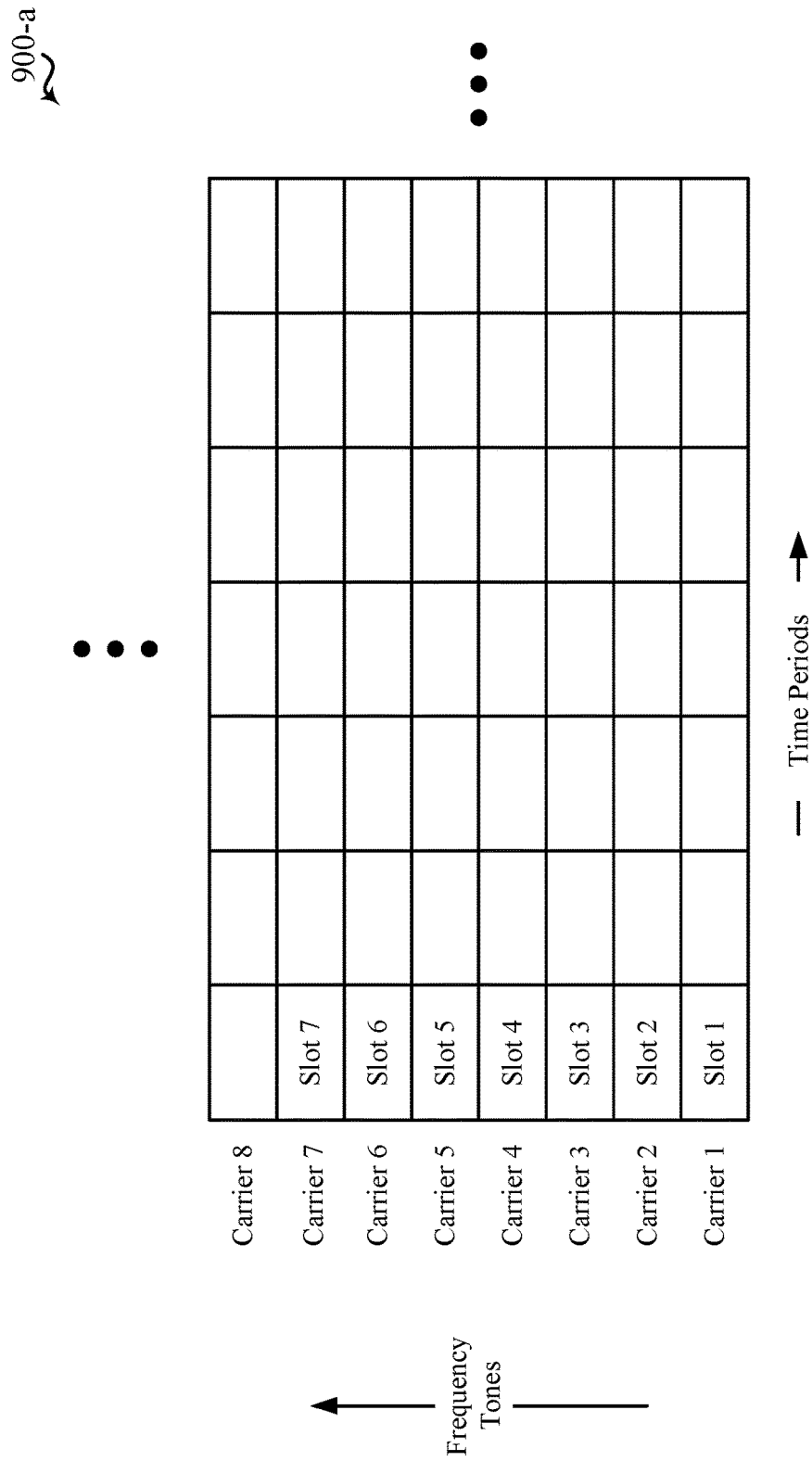
FIG. 9B illustrates two or more CCA slots occupying two or more frequency tones associated with different priorities, according to various embodiments.

In some embodiments, different opportunities for an operator to perform a CCA for a shared spectrum may be identified from among two or more CCA slots occupying two or more time periods, as shown for example in FIGS. 6, 7A, 7B, 7C, and/or 7D. In other embodiments, and as shown in FIG. 9B, different opportunities for an operator to perform a CCA for the shared spectrum may be identified from among two or more CCA slots occupying two or more frequency tones associated with different priorities. In further embodiments, different opportunities for an operator to perform a CCA for the shared spectrum may be identified from among two or more CCA slots occupying a combination of both different time periods and different frequency tones.

In some embodiments, the described techniques are applicable to a eNB, a user equipment or both. In a frame structure consisting of both downlink and uplink subframes, a same or different technique may be applied for a downlink CCA and an uplink CCA. A same or different prioritization criterion may be applied for a downlink CCA and an uplink CCA. That is, a same or different prioritization may be applied in downlink and uplink operations across operators. The prioritization among operators may further depend on the downlink/uplink frame structure used by each operator.

Figure 10A:
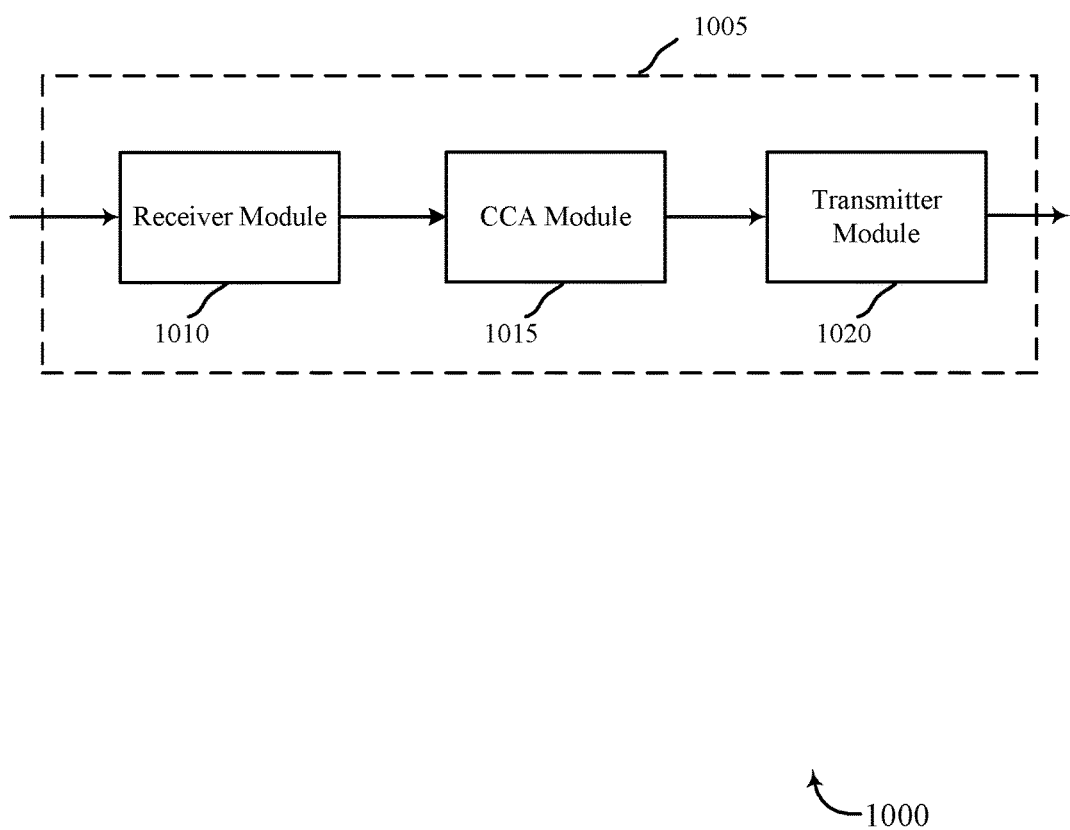
FIGS. 10A & 10B are block diagrams of examples of devices (e.g., base stations) according to various embodiments.

Referring now to FIG. 10A, a block diagram 1000 illustrates a device 1005 for use in wireless communications in accordance with various embodiments. In some embodiments, the device 1005 may be an example of one or more aspects of the base stations 105, 205, and/or 505 described with reference to FIGS. 1, 2A, 2B, and/or 5. The device 1005 may also be a processor. The device 1005 may include a receiver module 1010, a CCA module 1015, and/or a transmitter module 1020. Each of these components may be in communication with each other.

The components of the device 1005 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 1010 may be or include a radio frequency (RF) receiver, such as an RF receiver operable to receive transmissions in a licensed spectrum and/or an unlicensed spectrum. The receiver module 1010 may be used to receive various types of data and/or control signals (i.e., transmissions) over one or more communication links of a wireless communications system including the licensed and/or unlicensed spectrums, such as one or more communication links of the wireless communications system 100, 200, 250, and/or 500 described with reference to FIGS. 1, 2A, 2B, and/or 5.

In some embodiments, the transmitter module 1020 may be or include an RF transmitter, such as an RF transmitter operable to transmit in the licensed spectrum and/or the unlicensed spectrum. The transmitter module 1020 may be used to transmit various types of data and/or control signals (i.e., transmissions) over one or more communication links of a wireless communications system, such as one or more communication links of the wireless communications system 100, 200, 250, and/or 500 described with reference to FIGS. 1, 2A, 2B, and/or 5.

In some embodiments, the CCA module 1015 may be used to perform a CCA for a shared spectrum. The CCA may in some cases be performed using the gating interval described with reference to FIGS. 4 and/or 8A. The CCA may be performed within a CCA slot for a particular transmission interval, with the identity of the CCA slot being based on a priority of an operator (e.g., a network operator or service provider) that operates the base station or device 1005. The priority of the operator may in some cases be a priority of the operator with respect to at least one other operator. In some embodiments, the identity of the CCA slot for a particular transmission interval may be determined using one of the techniques described with reference to FIGS. 7A, 7B, 7C, 7D, and/or 8B.

Figure 10B:
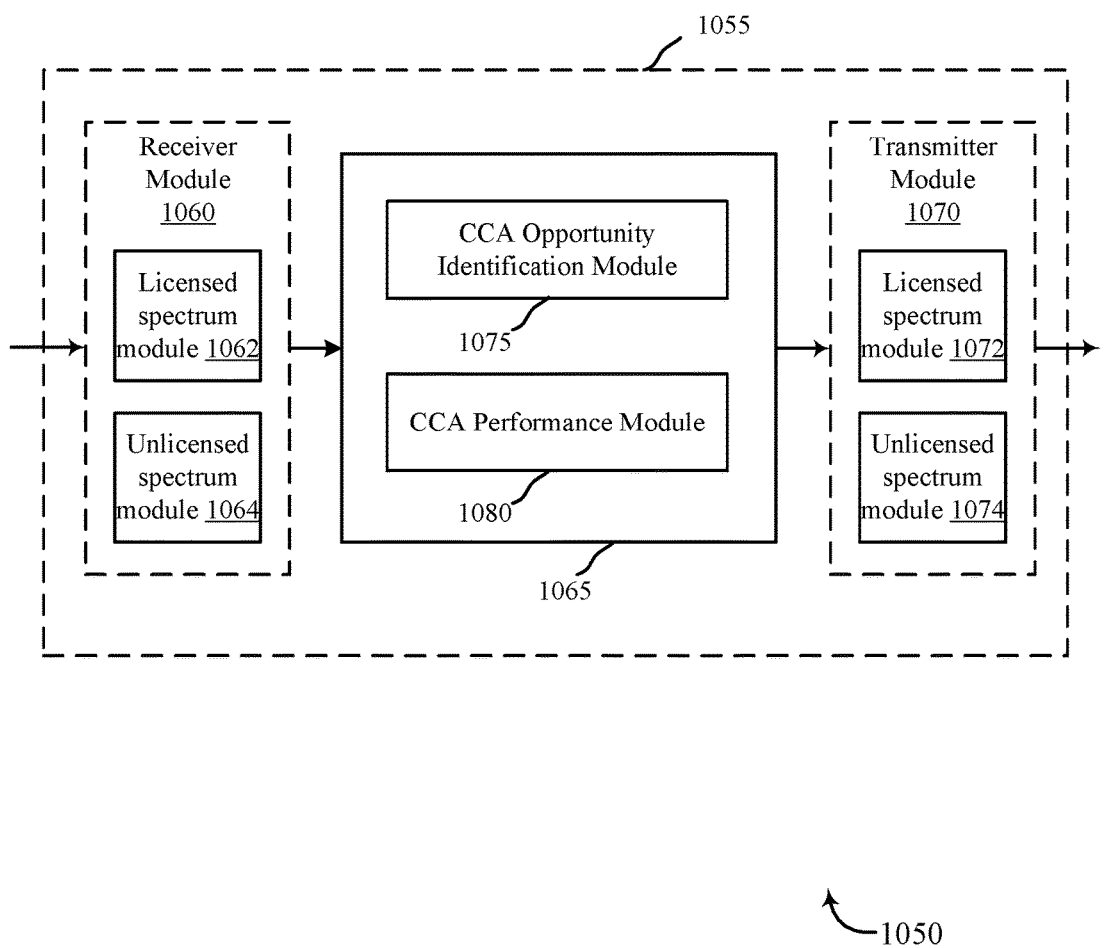

Referring now to FIG. 10B, a block diagram 1050 illustrates a device 1055 for use in wireless communications in accordance with various embodiments. In some embodiments, the device 1055 may be an example of one or more aspects of the base stations or devices 105, 205, 505, and/or 1005 described with reference to FIGS. 1, 2A, 2B, 5, and/or 10A. The device 1055 may also be a processor. The device 1055 may include a receiver module 1060, a CCA module 1065, and/or a transmitter module 1070. Each of these components may be in communication with each other.

The components of the device 1055 may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 1060 may be or include an RF receiver, such as an RF receiver operable to receive transmissions in a licensed spectrum and/or an unlicensed spectrum. The RF receiver may include separate receivers for the licensed spectrum and the unlicensed spectrum. The separate receivers may in some cases take the form of a licensed spectrum module 1062 and an unlicensed spectrum module 1064. The receiver module 1060, including the licensed spectrum module 1062 and/or the unlicensed spectrum module 1064, may be used to receive various types of data and/or control signals (i.e., transmissions) over one or more communication links of a wireless communications system including the licensed and unlicensed spectrums, such as one or more communication links of the wireless communications system 100, 200, 250, and/or 500 described with reference to FIGS. 1, 2A, 2B, and/or 5.

In some embodiments, the transmitter module 1070 may be or include an RF transmitter, such as an RF transmitter operable to transmit in the licensed spectrum and/or the unlicensed spectrum. The RF transmitter may include separate transmitters for the licensed spectrum and the unlicensed spectrum. The separate transmitters may in some cases take the form of a licensed spectrum module 1072 and an unlicensed spectrum module 1074. The transmitter module 1070, including the licensed spectrum module 1072 and/or the unlicensed spectrum module 1074, may be used to transmit various types of data and/or control signals (i.e., transmissions) over one or more communication links of a wireless communications system, such as one or more communication links of the wireless communications system 100, 200, 250, and/or 500 described with reference to FIGS. 1, 2A, 2B, and/or 5.

In some embodiments, the CCA module 1065 may be an example of one or more aspects of the CCA module 1015 described with reference to FIG. 10A and may include a CCA opportunity identification module 1075 and/or a CCA performance module 1080.

In some embodiments, the CCA opportunity identification module 1075 may be used to identify an opportunity for an operator of the device 1055 to perform a CCA for a shared spectrum. The shared spectrum may include a licensed and/or unlicensed spectrum. The identified opportunity may be based on a priority of the operator of the device 1055 with respect to at least one other operator associated with the shared spectrum.

In some embodiments, the CCA performance module 1080 may be used to perform a CCA for the shared spectrum during the identified opportunity to determine whether the shared spectrum is available for a transmission during a transmission interval. In some cases, the transmission interval may include a frame or a subframe, and the operator of the device 1055 and the at least one other operator may be synchronized with respect to a frame timing or a subframe timing. In some cases, the operator of the device 1055 and the at least one other operator may utilize a same frame structure or subframe structure for the shared spectrum. In other cases, the operator of the device 1055 and the at least one other operator may utilize two or more different frame structures or subframe structures for the shared spectrum.

Figure 11:
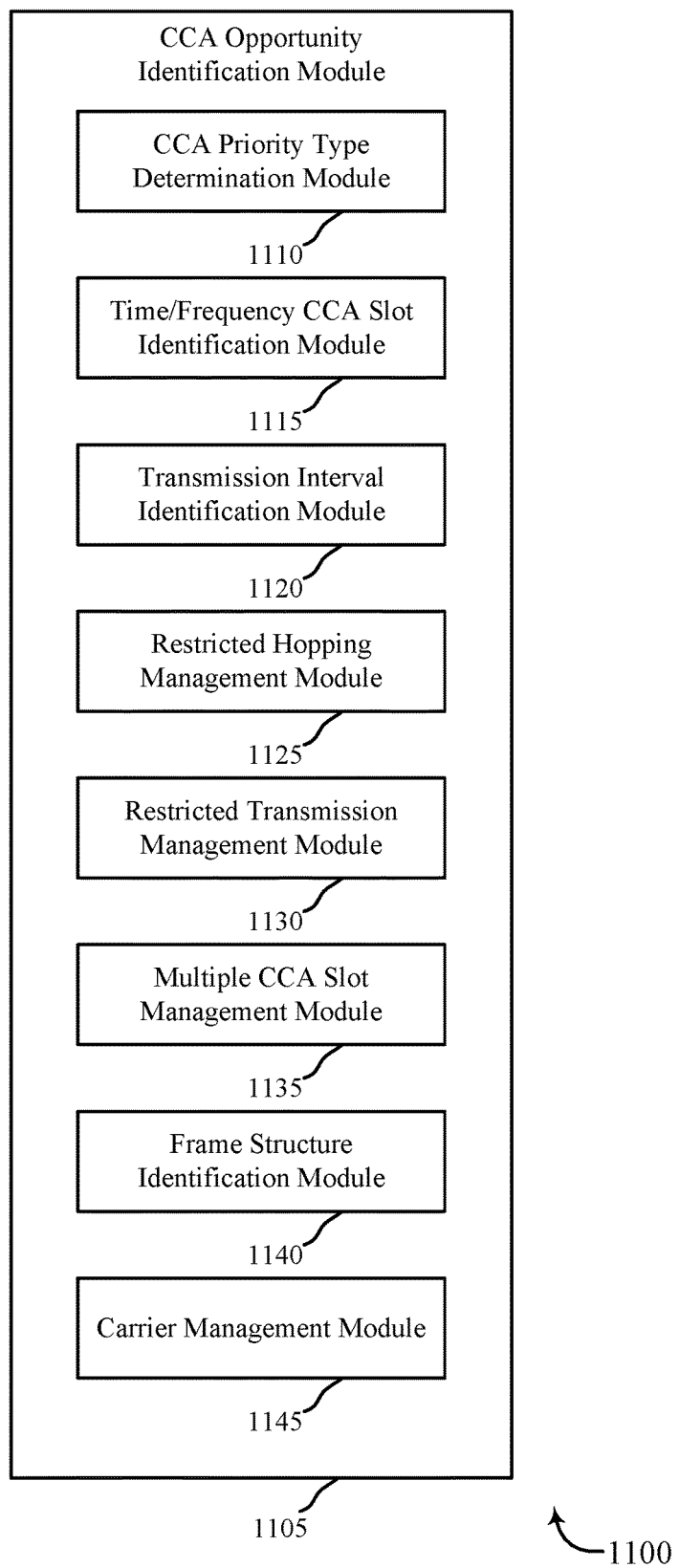
FIG. 11 is a block diagram of an example of a CCA opportunity identification module according to various embodiments.

Referring now to FIG. 11, a block diagram 1100 illustrates one embodiment of a CCA opportunity identification module 1105, in accordance with various embodiments. The CCA opportunity identification module 1105 may be an example of one or more aspects of the CCA opportunity identification module 1075 described with reference to FIG. 10B. The CCA opportunity identification module 1105 may include a CCA priority type determination module 1110, a time/frequency CCA slot identification module 1115, a transmission interval identification module 1120, a restricted hopping management module 1125, a restricted transmission management module 1130, a multiple CCA slot management module 1135, a frame structure identification module 1140, and/or a carrier management module 1145.

The components of the CCA opportunity identification module 1105 may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the CCA priority type determination module 1110 may be used to determine which of a number of CCA priority types defines a priority of a first operator (e.g., an operator of a device in which the CCA opportunity identification module 1105 is provided) with respect to at least one other operator. The number of priority types may include, for example, any or all of the priority types described with reference to FIGS. 7A, 7B, 7C, 7D, and/or 8B.

In some embodiments, the time/frequency CCA slot identification module 1115 may be used to identify a set or subset of CCA slots (i.e., opportunities) in which the first operator may perform a CCA for the shared spectrum. In some embodiments, the time/frequency CCA slot identification module 1115 may identify the set or subset of CCA slots from among two or more CCA slots occupying two or more time periods. In other embodiments, the time/frequency CCA slot identification module 1115 may identify the set or subset of CCA slots from among two or more CCA slots occupying two or more frequency tones associated with different priorities. In further embodiments, the time/frequency CCA slot identification module 1115 may identify the set or subset of CCA slots from among two or more CCA slots occupying a combination of both different time periods and different frequency tones.

In some embodiments, the transmission interval identification module 1120 may be used to identify a transmission interval for which a CCA is to be performed. The transmission interval may be a transmission interval of a shared spectrum. The shared spectrum may include a licensed and/or unlicensed spectrum. In some cases, the transmission interval may be identified by a frame number, or as a transmission interval associated with an even or an odd frame number.

In some embodiments, the restricted hopping management module 1125 may be used to identify a CCA opportunity when the priority of a first operator with respect to at least one other operator includes a restricted hopping type of CCA priority. In such a cases, the CCA opportunity may be identified from a subset of CCA slots in a subframe, based on a priority of the first operator with respect to the at least one other operator associated.

When the priority of the first operator is higher than a priority of the at least one other operator, the subset of CCA slots identified by the restricted hopping management module 1125 may ensure that the first operator has a CCA priority in more transmission intervals than the at least one other operator. By way of example, FIG. 7B illustrates an example in which a first operator has a CCA priority over a second operator in two out of every three transmission intervals.

When the priority of the first operator is lower than the priority of the at least one other operator, the subset of CCA slots identified by the restricted hopping management module 1125 may provide the first operator with a CCA priority in fewer transmission intervals than the at least one other operator.

In some embodiments, and when the priority of a first operator with respect to at least one other operator includes a restricted transmission type of CCA priority, the restricted transmission management module 1130 may be used to determine whether the priority of the first operator with respect to at least one other operator restricts the first operator from performing a CCA in an identified CCA slot. For example, the restricted transmission management module 1130 may determine, based on the priority of the first operator with respect to the at least one other operator, whether a CCA slot identified for the first operator to perform a CCA for an identified transmission interval is invalid for performing the CCA by the first operator.

In a restricted transmission type of CCA priority, not every identified CCA slot will be restricted from use by the first operator to perform a CCA. However, it may be relatively more likely that an identified CCA slot will be restricted from use by the first operator when the first operator has a lower priority with respect to the at least one other operator, and it may be relatively less likely that an identified CCA slot will be restricted from use by the first operator when the first operator has a higher priority with respect to the at least one other operator. By way of example, FIG. 7C illustrates an example in which a first operator has no restrictions on performing a CCA, while a second operator is restricted from performing a CCA in every other transmission interval (e.g., every other frame).

When a hopping sequence is used to identify a CCA slot in accord with a restricted transmission type of CCA priority, the hopping sequence may include all or a subset of the CCA slots in a subframe. In some cases, the same hopping sequence may be used for operators having different priorities over other operators, because the priority of one operator over another operator in a shared spectrum may be controlled by restricting one or more operators from performing a CCA for a particular transmission interval of the shared spectrum.

In some embodiments, the multiple CCA slot management module 1135 may be used to identify a number of CCA opportunities for a first operator to perform a CCA for an identified transmission interval of a shared spectrum. The number of CCA opportunities identified for the first operator may vary depending on the identity of the transmission interval. For example, the multiple CCA slot management module 1135 may allot a first operator one CCA slot during even numbered transmission intervals and two CCA slots during odd numbered transmission intervals. When the priority of the first operator is higher than a priority of at least one other operator, the number of CCA opportunities associated with the priority of the first operator, over time, may ensure that the first operator is allotted more CCA slots than the at least one other operator. For example, FIG. 7D illustrates an example in which a first operator is allotted three CCA slots for every two CCA slots allotted to a second operator. When the priority of the first operator is lower than the priority of the at least one other operator, the number of CCA opportunities associated with the priority of the first operator, over time, may provide the first operator with fewer CCA slots than the at least one other operator.

In some cases, two or more of the identified CCA opportunities may be adjacent in time. In other cases, each of the identified CCA opportunities may be separated from another one or ones of the identified CCA opportunities by one or more non-identified CCA opportunities.

In some embodiments, the frame structure identification module 1140 may be used to identify a frame structure of an operator and determine whether the frame structure restricts the operator from performing a CCA and/or transmitting over a shared spectrum for an identified transmission interval of the shared spectrum. In some cases, an identified frame structure may define a silence period that restricts the operator from performing a CCA and/or transmitting over a shared spectrum for an identified transmission interval of the shared spectrum.

In some embodiments, the carrier management module 1145 may be used to manage the prioritization techniques, if any, used for multiple carriers over which an operator transmits in a shared spectrum. In some cases, the carrier management module 1145 may perform functions as described with reference to FIG. 9A.

Figure 12:
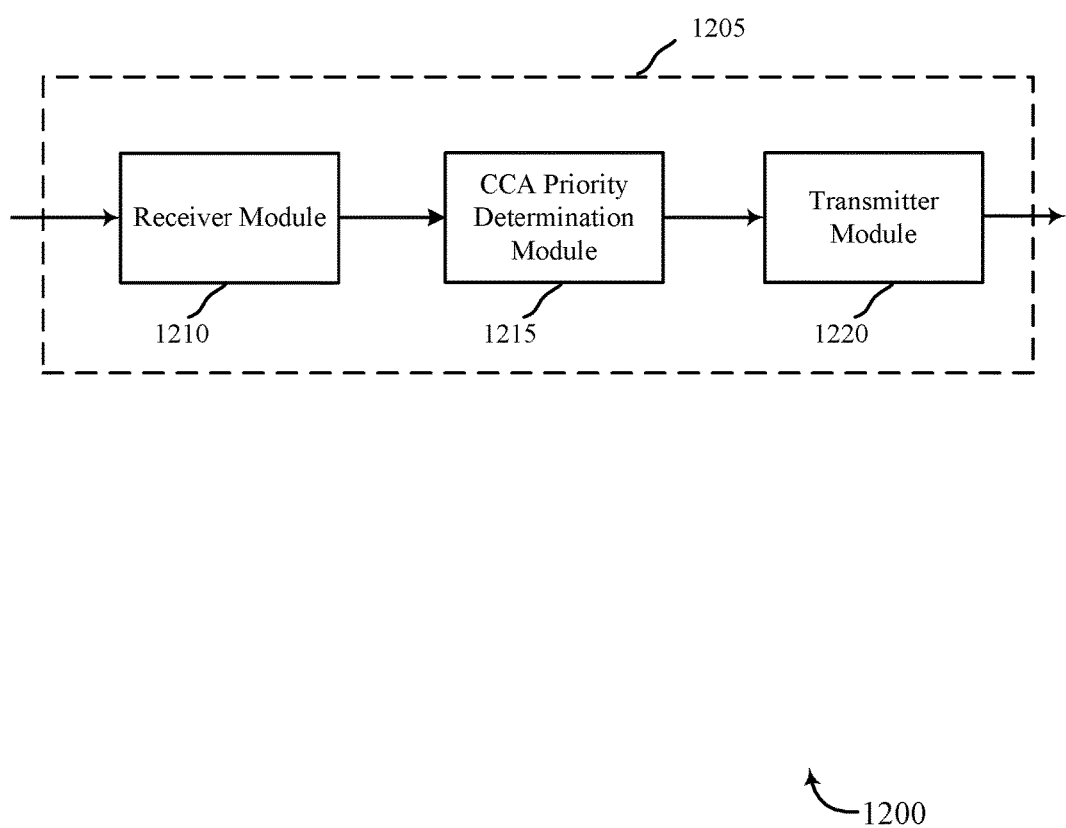
FIG. 12 is a block diagram of an example of a device (e.g., a core network and/or base station) according to various embodiments.

Referring now to FIG. 12, a block diagram 1200 illustrates a device 1205 for use in wireless communications in accordance with various embodiments. In some embodiments, the device 1205 may be an example of one or more aspects of the base stations 105, 205, and/or 505 described with reference to FIGS. 1, 2A, 2B and/or 5, and/or one or more aspects of the core network 130 described with reference to FIG. 1. The device 1205 may also be a processor. The device 1205 may include a receiver module 1210, a CCA priority determination module 1215, and/or a transmitter module 1220. Each of these components may be in communication with each other.

The components of the device 1205 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 1210 may be or include a radio frequency (RF) receiver, such as an RF receiver operable to receive transmissions in a licensed spectrum and/or an unlicensed spectrum. In other embodiments, the receiver module 1210 may be or include a wired receiver. The receiver module 1210 may be used to receive various types of data and/or control signals (i.e., transmissions) over one or more communication links of a wireless or wired communications system, such as one or more communication links of the wireless communications system 100, 200, 250, and/or 500 described with reference to FIGS. 1, 2A, 2B, and/or 5.

In some embodiments, the transmitter module 1220 may be or include an RF transmitter, such as an RF transmitter operable to transmit in the licensed spectrum and/or the unlicensed spectrum. In other embodiments, the transmitter module 1220 may be or include a wired transmitter. The transmitter module 1220 may be used to transmit various types of data and/or control signals (i.e., transmissions) over one or more communication links of a wireless communications system, such as one or more communication links of the wireless communications system 100, 200, 250, and/or 500 described with reference to FIGS. 1, 2A, 2B, and/or 5.

In some embodiments, the CCA priority determination module 1215 may be used to prioritize a group of operators needing to perform a CCA for a shared spectrum. The CCA priority determination module 1215 may in some cases implement one or more of the prioritization techniques described with reference to FIGS. 7A, 7B, 7C, 7D, and/or 8B.

Figure 13:
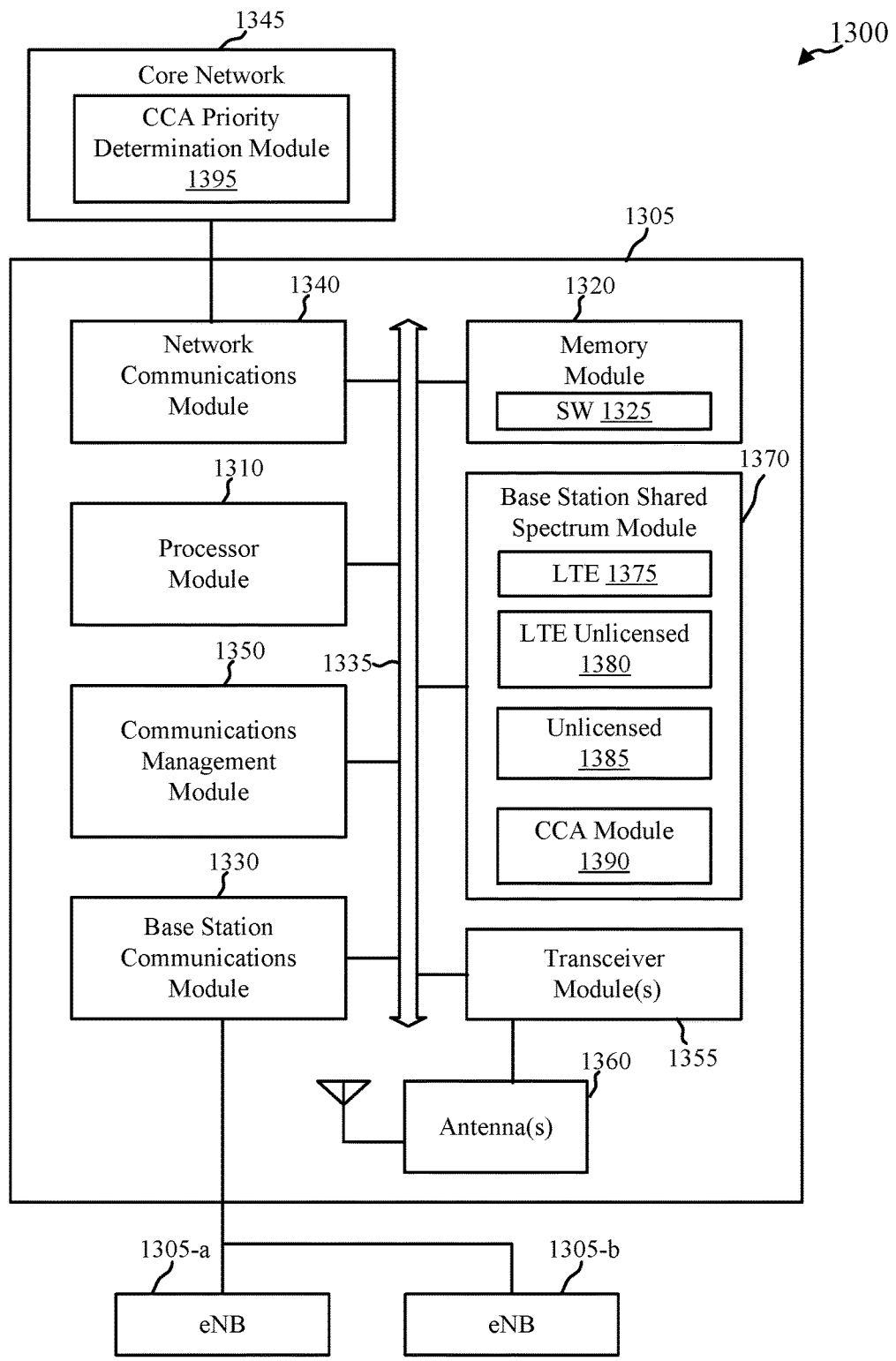
FIG. 13 is a block diagram of a base station according to various embodiments.

Turning to FIG. 13, a block diagram 1300 is shown that illustrates a base station 1305 configured for wireless communications over a shared spectrum. In some embodiments, the base station 1305 may be an example of one or more aspects of the base stations or devices 105, 205, 255, 505, 1005, and/or 1055 described with reference to FIGS. 1, 2A, 2B, 5,10A, and/or 10B. The base station 1305 may be configured to implement at least some of the features and functions described with reference to FIGS. 1, 2A, 2B, 3, 4, 5, 6, 7A-7D, 8A, 8B, 9A, 9B, 10A, 10B, and/or 11. The base station 1305 may include a processor module 1310, a memory module 1320, at least one transceiver module (represented by transceiver module(s) 1355), at least one antenna (represented by antenna(s) 1360), and/or a base station shared spectrum module 1370. The base station 1305 may also include one or both of a base station communications module 1330 and a network communications module 1340. Each of these components may be in communication with each other, directly or indirectly, over one or more buses 1335.

The memory module 1320 may include random access memory (RAM) and/or read-only memory (ROM). The memory module 1320 may store computer-readable, computer-executable software (SW) code 1325 containing instructions that are configured to, when executed, cause the processor module 1310 to perform various functions described herein for conducting (or performing CCA for) wireless communications in a shared spectrum. Alternatively, the software code 1325 may not be directly executable by the processor module 1310 but be configured to cause the base station 1305, e.g., when compiled and executed, to perform various of the functions described herein.

The processor module 1310 may include an intelligent hardware device, e.g., a central processing unit (CPU), a microcontroller, an ASIC, etc. The processor module 1310 may process information received through the transceiver module(s) 1355, the base station communications module 1330, and/or the network communications module 1340. The processor module 1310 may also process information to be sent to the transceiver module(s) 1355 for transmission through the antenna(s) 1360, to the base station communications module 1330 for transmission to one or more other base stations or eNBs 1305-a and 1305-b, and/or to the network communications module 1340 for transmission to a core network 1345, which may be an example of aspects of the core network 130 described with reference to FIG. 1. The processor module 1310 may handle, alone or in connection with the base station shared spectrum module 1370, various aspects of conducting (or performing a CCA for) wireless communications in a shared spectrum.

The transceiver module(s) 1355 may include a modem configured to modulate packets and provide the modulated packets to the antenna(s) 1360 for transmission, and to demodulate packets received from the antenna(s) 1360. The transceiver module(s) 1355 may in some cases be implemented as one or more transmitter modules and one or more separate receiver modules. The transceiver module(s) 1355 may support communications in a shared spectrum, such as a shared licensed spectrum and/or a shared unlicensed spectrum. The transceiver module(s) 1355 may be configured to communicate bi-directionally, via the antenna(s) 1360, with one or more of the UEs or devices 115, 215, and/or 515 described with reference to FIGS. 1, 2A, 2B, and/or 5, for example. The base station 1305 may typically include multiple antennas 1360 (e.g., an antenna array). The base station 1305 may communicate with the core network 1345 through the network communications module 1340. The base station 1305 may communicate with other base stations or eNBs, such as the eNBs 1305-a and 1305-b, using the base station communications module 1330.

According to the architecture of FIG. 13, the base station 1305 may further include a communications management module 1350. The communications management module 1350 may manage communications with other base stations, eNBs, and/or devices. The communications management module 1350 may be in communication with some or all of the other components of the base station 1305 via the bus or buses 1335. Alternatively, functionality of the communications management module 1350 may be implemented as a component of the transceiver module(s) 1355, as a computer program product, and/or as one or more controller elements of the processor module 1310.

The base station shared spectrum module 1370 may be configured to perform and/or control some or all of the features and/or functions described with reference to FIGS. 1, 2A, 2B, 3, 4, 5, 6, 7A-7D, 8A, 8B, 9A, 9B, 10A, 10B, and/or 11 related to conducting (or performing a CCA for) wireless communications in a shared spectrum. For example, the base station shared spectrum module 1370 may be configured to support wireless communications in a licensed spectrum and/or a supplemental downlink mode, a carrier aggregation mode, and/or a standalone mode in an unlicensed spectrum. The base station shared spectrum module 1370 may include an LTE module 1375 configured to handle LTE communications, an LTE unlicensed module 1380 configured to handle LTE/LTE-A communications in an unlicensed spectrum, and/or an unlicensed module 1385 configured to handle communications other than LTE/LTE-A communications in an unlicensed spectrum. The base station shared spectrum module 1370 may also include a CCA module 1390 configured to perform, for example, any of the base station functions described with reference to FIGS. 3, 4, 5, 6, 7A-7D, 8A, 8B, 9A, 9B, 10A, 10B, and/or 11 for performing a CCA for a shared spectrum. The CCA module 1390 may be an example of similar modules (e.g., module 1015 and/or module 1065) described with reference to FIGS. 10A and/or 10B. The base station shared spectrum module 1370, or portions of it, may include a processor, and/or some or all of the functionality of the base station shared spectrum module 1370 may be performed by the processor module 1310 and/or in connection with the processor module 1310.

The core network 1345 may in some cases include a CCA priority determination module 1395. The CCA priority determination module 1395 may be used to establish CCA priorities for different operators associated with (e.g., configured to communicated over) a shared spectrum of a wireless communications network. The CCA priority determination module 1395 may communicate its established priorities to one or more base stations or eNBs 1305, 1305-a, and/or 1305-b. In some embodiments, the CCA priority determination module 1395 may be an example of aspects of the CCA priority determination module 1215 described with reference to FIG. 12.

Figure 14:
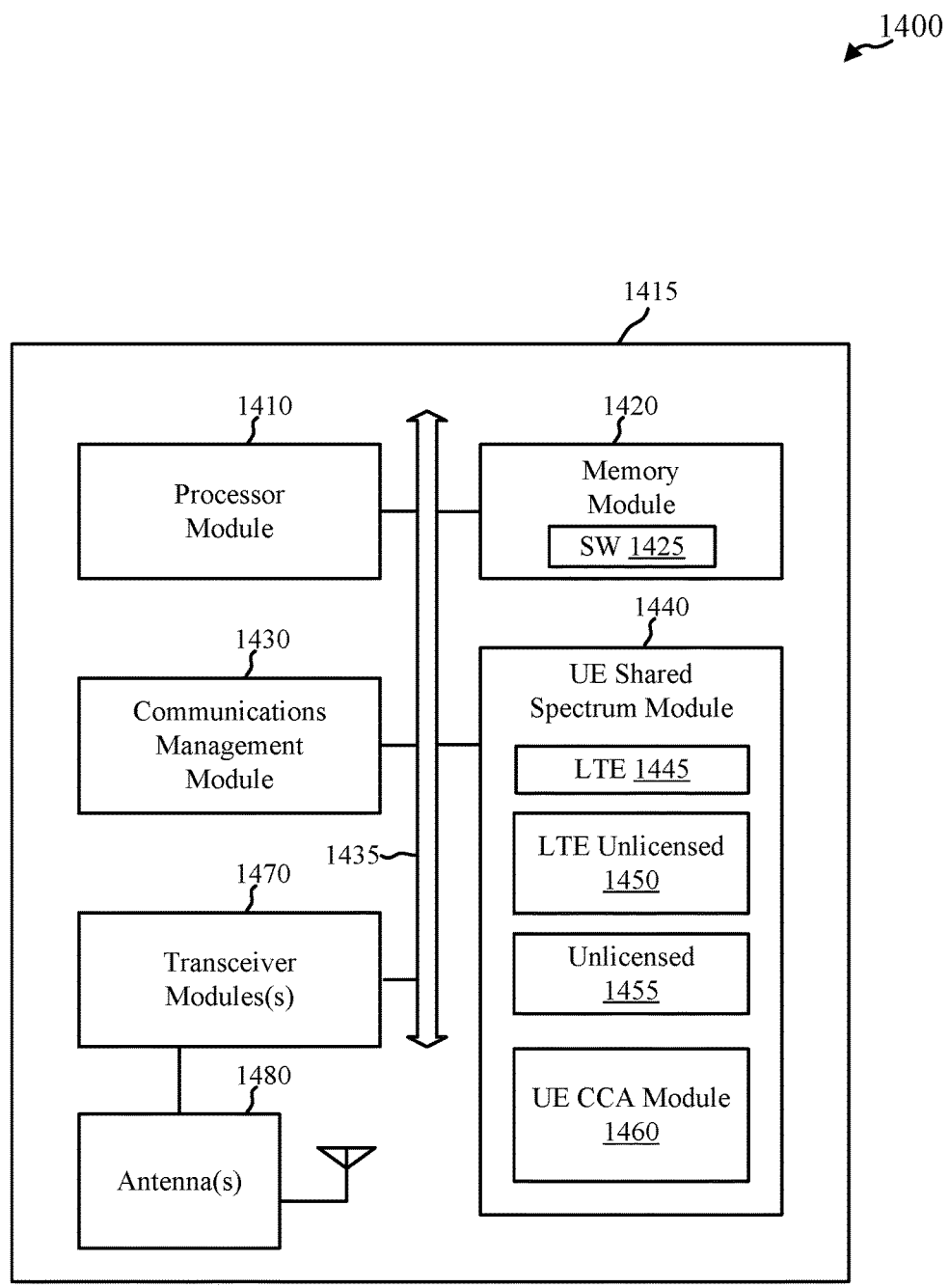
FIG. 14 is a block diagram of a UE according to various embodiments.

Turning to FIG. 14, a block diagram 1400 is shown that illustrates a UE 1415 configured for wireless communications over a shared spectrum. The UE 1415 may have various other configurations and may be included or be part of a personal computer (e.g., a laptop computer, netbook computer, tablet computer, etc.), a cellular telephone, a PDA, a digital video recorder (DVR), an internet appliance, a gaming console, an e-reader, etc. The UE 1415 may in some cases have an internal power supply (not shown), such as a small battery, to facilitate mobile operation. In some embodiments, the UE 1415 may be an example of one or more of the UEs 115, 215, and/or 515 described with reference to FIGS. 1, 2A, 2B, and/or 5, and/or one of the devices 1005 and/or 1055 described with reference to FIGS. 10A and/or 10B. The UE 1415 may be configured to communicate with one or more of the base stations or devices 105, 205, 255, 505, 1005, 1055, 1205, and/or 1305 described with reference to FIGS. 1, 2A, 2B, 5, 10A, 10B, 12 and/or 13.

The UE 1415 may include a processor module 1410, a memory module 1420, at least one transceiver module (represented by transceiver module(s) 1470), at least one antenna (represented by antenna(s) 1480), and/or a UE shared spectrum module 1440. Each of these components may be in communication with each other, directly or indirectly, over one or more buses 1435.

The memory module 1420 may include RAM and/or ROM. The memory module 1420 may store computer-readable, computer-executable software (SW) code 1425 containing instructions that are configured to, when executed, cause the processor module 1410 to perform various functions described herein for conducting (or performing a CCA for) wireless communications in a shared spectrum. In some cases, the executed instructions may cause the processor module 1410 to perform a CCA similarly to how one of the devices 1005 and/or 1055 described with reference to FIGS. 10A and/or 10B performs a CCA. Alternatively, the software code 1425 may not be directly executable by the processor module 1410 but be configured to cause the UE 1415 (e.g., when compiled and executed) to perform various of the UE functions described herein.

The processor module 1410 may include an intelligent hardware device, e.g., a CPU, a microcontroller, an ASIC, etc. The processor module 1410 may process information received through the transceiver module(s) 1470 and/or information to be sent to the transceiver module(s) 1470 for transmission through the antenna(s) 1480. The processor module 1410 may handle, alone or in connection with the UE shared spectrum module 1440, various aspects of conducting (or performing a CCA for) wireless communications in a shared spectrum. In some cases, the processor module 1410 may perform a CCA similarly to how one of the devices 1005 and/or 1055 described with reference to FIGS. 10A and/or 10B performs a CCA.

The transceiver module(s) 1470 may be configured to communicate bi-directionally with base stations. The transceiver module(s) 1470 may be implemented as one or more transmitter modules and one or more separate receiver modules. The transceiver module(s) 1470 may support communications in a shared spectrum, such as a shared licensed spectrum and/or a shared unlicensed spectrum. The transceiver module(s) 1470 may include a modem configured to modulate packets and provide the modulated packets to the antenna(s) 1480 for transmission, and to demodulate packets received from the antenna(s) 1480. While the UE 1415 may include a single antenna, there may be embodiments in which the UE 1415 may include multiple antennas 1480.

According to the architecture of FIG. 14, the UE 1415 may further include a communications management module 1430. The communications management module 1430 may manage communications with various base stations or eNBs. The communications management module 1430 may be a component of the UE 1415 in communication with some or all of the other components of the UE 1415 over the one or more buses 1435. Alternatively, functionality of the communications management module 1430 may be implemented as a component of the transceiver module(s) 1470, as a computer program product, and/or as one or more controller elements of the processor module 1410.

The UE shared spectrum module 1440 may be configured to perform and/or control some or all of the features and/or functions described with reference to FIGS. 1, 2A, 2B, 3, 4, 5, 6, 7A-7D, 8A, 8B, 9A, 9B, 10A, 10B, and/or 11 related to conducting (or performing a CCA for) wireless communications in a shared spectrum. For example, the UE shared spectrum module 1440 may be configured to support wireless communications in a licensed spectrum (e.g., an LTE spectrum) and/or a supplemental downlink mode, a carrier aggregation mode, and/or a standalone mode in an unlicensed spectrum. The UE shared spectrum module 1440 may include an LTE module 1445 configured to handle LTE communications, an LTE unlicensed module 1450 configured to handle LTE communications in an unlicensed spectrum, and/or an unlicensed module 1455 configured to handle communications other than LTE communications in an unlicensed spectrum. The UE shared spectrum module 1440 may also include a UE CCA module 1460 configured to perform, for example, a CCA similarly to how one of the devices 1005 and/or 1055 described with reference to FIGS. 10A and/or 10B performs a CCA. The UE CCA module 1460 may be configured similarly to the modules (e.g., module 1015 and/or module 1065) described with reference to FIGS. 10A and/or 10B. The UE shared spectrum module 1440, or portions of it, may include a processor, and/or some or all of the functionality of the UE shared spectrum module 1440 may be performed by the processor module 1410 and/or in connection with the processor module 1410.

Figure 15:
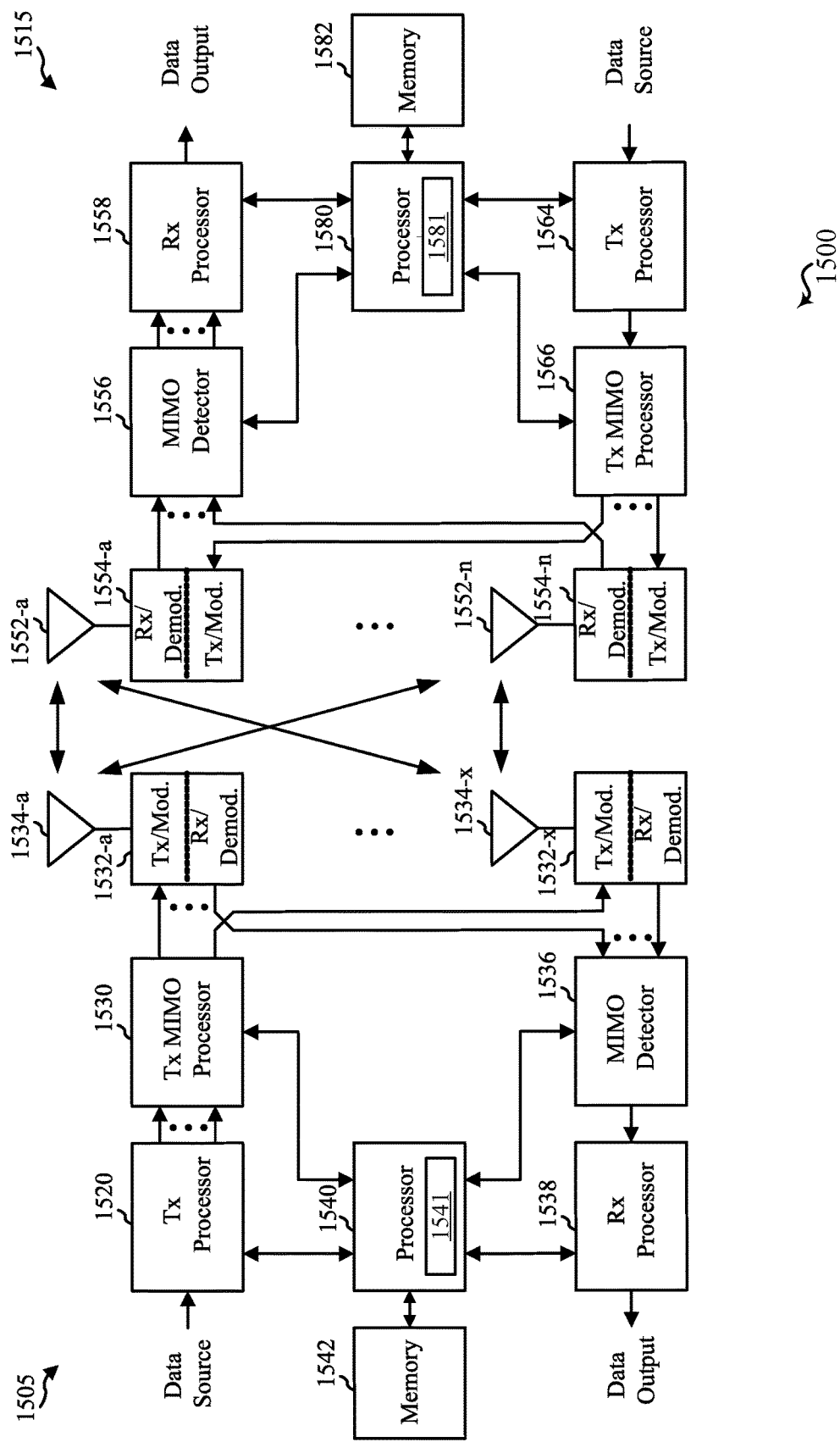
FIG. 15 shows a block diagram that illustrates an example of a multiple-input multiple-output (MIMO) communications system according to various embodiments.

Turning next to FIG. 15, a block diagram of a multiple-input multiple-output (MIMO) communications system 1500 is shown including a base station 1505 and a UE 1515. The base station 1505 and the UE 1515 may support LTE-based communications using a licensed and/or unlicensed spectrum. The base station 1505 may be an example of one or more aspects of the base stations or devices 105, 205, 255, 505, 1005, 1055, 1205, and/or 1305 described with reference to FIGS. 1, 2A, 2B, 5, 10A, 10B, 12, and/or 13, while the UE 1515 may be an example of one or more aspects of the UEs 115, 215, 515, and/or 1415 described with reference to FIGS. 1, 2A, 2B, 5, and/or 14, and/or one of the devices 1005 and/or 1055 described with reference to FIGS. 10A and/or 10B. The system 1500 may illustrate aspects of the wireless communications system 100, 200, and/or 250 described with reference to FIGS. 1, 2A, and/or 2B.

The base station 1505 may be equipped with antennas 1534-*a* through 1534-*x*, and the UE 1515 may be equipped with antennas 1552-*a* through 1552-*n*. In the system 1500, the base station 1505 may be able to send data over multiple communication links at the same time. Each communication link may be called a "layer" and the "rank" of the communication link may indicate the number of layers used for communication. For example, in a 2×2 MIMO system where base station 1505 transmits two "layers," the rank of the communication link between the base station 1505 and the UE 1515 may be two.

At the base station 1505, a transmit (Tx) processor 1520 communicatively coupled with a transmit memory 1542 may receive data from a data source. The transmit processor 1520 may process the data. The transmit processor 1520 may also generate reference symbols and/or a cell-specific reference signal. A transmit (Tx) MIMO processor 1530 may perform spatial processing (e.g., precoding) on data symbols, control symbols, and/or reference symbols, if applicable, and may provide output symbol streams to the transmit (Tx) modulators 1532-*a* through 1532-*x*. Each modulator 1532 may process a respective output symbol stream (e.g., for OFDM, etc.) to obtain an output sample stream. Each modulator 1532 may further process (e.g., convert to analog, amplify, filter, and upconvert) the output sample stream to obtain a downlink (DL) signal. In one example, DL signals from modulators 1532-*a* through 1532-*x* may be transmitted via the antennas 1534-*a* through 1534-*x*, respectively.

At the UE 1515, the antennas 1552-*a* through 1552-*n* may receive the DL signals from the base station 1505 and may provide the received signals to the receive (Rx) demodulators 1554-*a* through 1554-*n*, respectively. Each demodulator 1554 may condition (e.g., filter, amplify, downconvert, and digitize) a respective received signal to obtain input samples. Each demodulator 1554 may further process the input samples (e.g., for OFDM, etc.) to obtain received symbols. A MIMO detector 1556 may obtain received symbols from all the demodulators 1554-*a* through 1554-*n*, perform MIMO detection on the received symbols if applicable, and provide detected symbols. A receive (Rx) processor 1558 may process (e.g., demodulate, deinterleave, and decode) the detected symbols, providing decoded data for the UE 1515 to a data output, and provide decoded control information to a processor 1580, or memory 1582.

On the uplink (UL), at the UE 1515, a transmit (Tx) processor 1564 may receive and process data from a data source. The transmit processor 1564 may also generate reference symbols for a reference signal. The symbols from the transmit processor 1564 may be precoded by a transmit (Tx) MIMO processor 1566 if applicable, further processed by the transmit (Tx) modulators 1554-*a* through 1554-*n* (e.g., for SC-FDMA, etc.), and be transmitted to the base station 1505 in accordance with the transmission parameters received from the base station 1505. At the base station 1505, the UL signals from the UE 1515 may be received by the antennas 1534, processed by the receiver (Rx) demodulators 1532, detected by a MIMO detector 1536 if applicable, and further processed by a receive (Rx) processor 1538. The receive processor 1538 may provide decoded data to a data output and to the processor 1540.

The processors 1540 and 1580 may include respective modules or functions 1541, 1581 for performing a CCA for a shared spectrum prior to communicating over the shared spectrum. In some embodiments, the modules or functions 1541, 1581 may be examples of one or more aspects of the CCA module 1015 and/or 1065 described with reference to FIGS. 10A and/or 10B, the CCA opportunity identification module 1075 and 1105 described with reference to FIGS. 10B and/or 11, and/or the CCA performance module 1080 described with reference to FIG. 10B. The base station 1505 may use the module or function 1541 to perform a CCA in conjunction with the performance of a CCA by other base stations, while the UE 1515 may use the module or function 1581 to perform a CCA in conjunction with the performance of a CCA by other UEs. In some cases, the base station 1505 and UE 1515 may only communicate with one another over a shared spectrum after each of the base station 1505 and UE 1515 has performed a successful CCA. In some cases, the base station 1505 and UE 1515 may only communicate with one another over a shared spectrum after each of the base station 1505 and UE 1515 has performed a successful CCA for each communication channel to be used by the base station 1505 and UE 1515 during their communications.

The components of the base station 1505 may, individually or collectively, be implemented with one or more ASICs adapted to perform some or all of the applicable functions in hardware. Each of the noted modules may be a means for performing one or more functions related to operation of the system 1500. Similarly, the components of the UE 1515 may, individually or collectively, be implemented with one or more ASICs adapted to perform some or all of the applicable functions in hardware. Each of the noted components may be a means for performing one or more functions related to operation of the system 1500.

Figure 16:
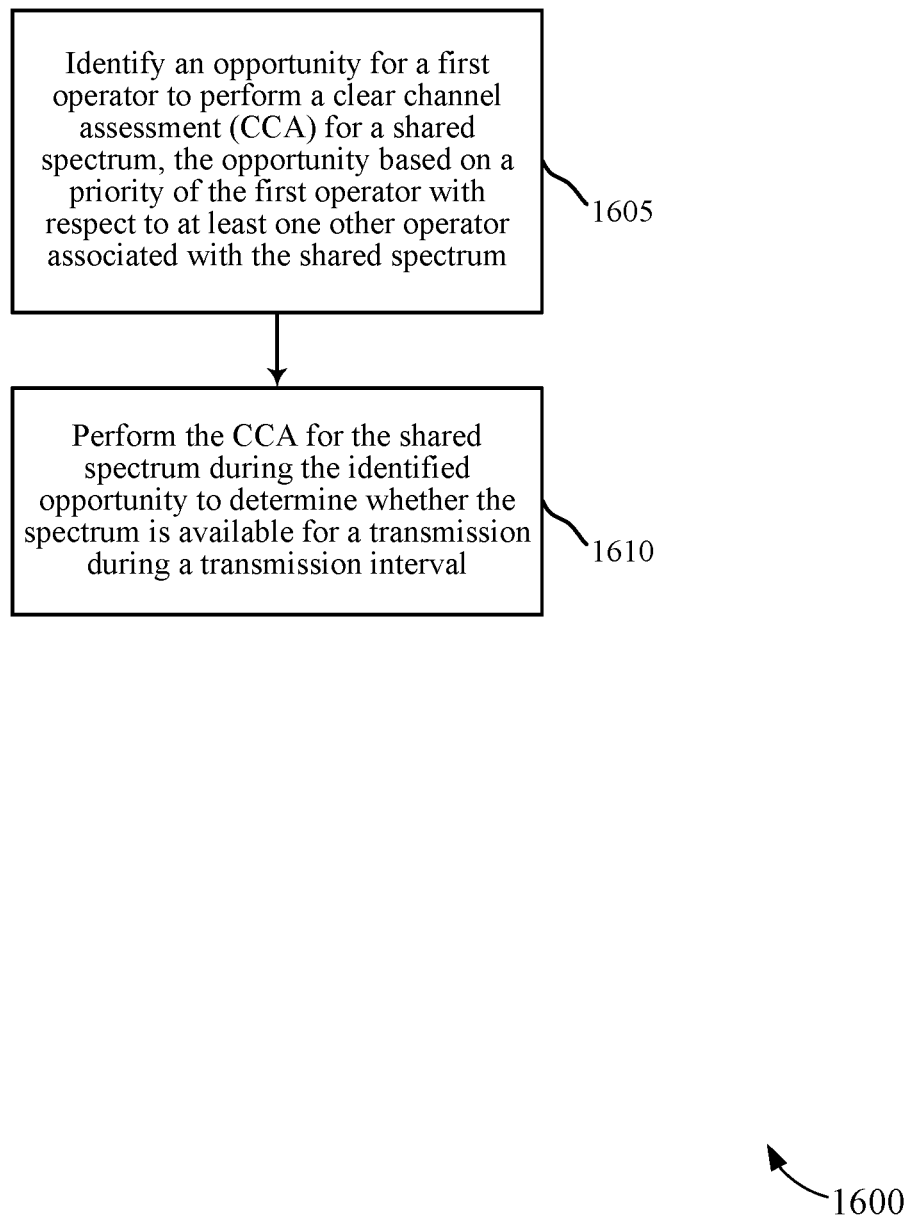
FIGS. 16-22 are flowcharts of examples of methods for wireless communications using a shared spectrum (e.g., at a base station or UE) according to various embodiments.

FIG. 16 is a flowchart illustrating an example of a method 1600 for wireless communications. For clarity, the method 1600 is described below with reference to one of the base stations or devices 105, 205, 505, 1005, 1055, 1205, 1305, and/or 1505 described with reference to FIGS. 1, 2A, 2B, 5, 10A, 10B, 12, 13, and/or 15. In one embodiment, a base station or device 105, 205, 505, 1005, 1055, 1205, 1305, and/or 1505 may execute one or more sets of codes to control the functional elements of the base station or device 105, 205, 505, 1005, 1055, 1205, 1305, and/or 1505 to perform the functions described below.

At block 1605, an opportunity may be identified for a first operator to perform a CCA for a shared spectrum. The shared spectrum may include a licensed and/or unlicensed spectrum. The opportunity may be identified based on a priority of the first operator with respect to at least one other operator associated with the shared spectrum. The operation(s) at block 1605 may in some cases be performed using the CCA module 1015, 1065, 1390, and/or 1541 described with reference to FIGS. 10A, 10B, 13, and/or 15, and/or the CCA opportunity identification module 1075 and/or 1105 described with reference to FIGS. 10B and/or 11.

In some embodiments, the opportunity for the first operator to perform a CCA for the shared spectrum may be identified from among two or more CCA slots occupying two or more time periods. In other embodiments, the opportunity for the first operator to perform a CCA for the shared spectrum may be identified from among two or more CCA slots occupying two or more frequency tones associated with different priorities. In further embodiments, the opportunity for the first operator to perform a CCA for the shared spectrum may be identified from among two or more CCA slots occupying a combination of both different time periods and different frequency tones.

In some embodiments, the priority of the first operator with respect to the at least one other operator may be specific to a particular spectrum assigned to a carrier. That is, the first operator may be the only operator having a priority with respect to the at least one other operator for the particular spectrum. In other embodiments, the priority of the first operator with respect to the at least one other operator may be shared by other operators. That is, the first operator may have the same priority as another operator (e.g., a second operator) with respect to the at least one other operator. The latter may be achieved using orthogonal transmissions and/or other techniques for sharing a same spectrum. First and second operators may also share the same priority with respect to the at least one other operator by, for example, alternating the priority given the first and second operators in alternating transmission intervals, such that, over time, each of the first and second operators is provided the same priority with respect to the same spectrum. In cases where one or more operators transmit on multiple carriers, the prioritization may be performed separately or jointly across the two or more carriers.

At block 1610, the CCA for the shared spectrum may be performed during the identified opportunity to determine whether the shared spectrum is available for a transmission during a transmission interval. The operation(s) at block 1610 may in some cases be performed using the CCA module 1015, 1065, 1390, and/or 1541 described with reference to FIGS. 10A, 10B, 13, and/or 15, and/or the CCA performance module 1080 described with reference to FIG. 10B.

In some embodiments, the transmission interval may include a frame or a subframe and the first and at least one other operator may be synchronized with respect to a frame timing or a subframe timing. In some cases, the first and at least one other operator may utilize a same frame structure or subframe structure for the shared spectrum. In other cases, the first and at least one other operator may utilize two or more different frame structures or subframe structures for the shared spectrum.

In some cases, the first operator may be capable of transmitting over two or more carriers (e.g., two or more frequency tones) and the opportunity for the first operator to perform a CCA for the shared spectrum at block 1605 may be an opportunity for the first operator to perform a CCA for a first carrier of the shared spectrum. In these cases, a second opportunity for the first operator to perform a CCA may be identified. The second opportunity may be an opportunity for the first operator to perform a CCA for a second carrier of the shared spectrum. The second opportunity may be based on 1) the priority of the first operator with respect to the at least one other operator, or 2) a second priority of the first operator with respect to the at least one other operator, wherein the second priority is different from the first priority. When the second CCA opportunity is based on a second priority of the first operator with respect to the at least one other operator, the first and second priorities may be determined using the same or different techniques (e.g., one or more of the various techniques described with reference to FIGS. 7A, 7B, 7C, 7D, and/or 8B). The CCA may be performed for the second carrier of the shared spectrum during the identified second opportunity to determine whether the shared spectrum is available for a transmission during the transmission interval.

Thus, the method 1600 may provide for wireless communications. It should be noted that the method 1600 is just one implementation and that the operations of the method 1600 may be rearranged or otherwise modified such that other implementations are possible.

Figure 17:
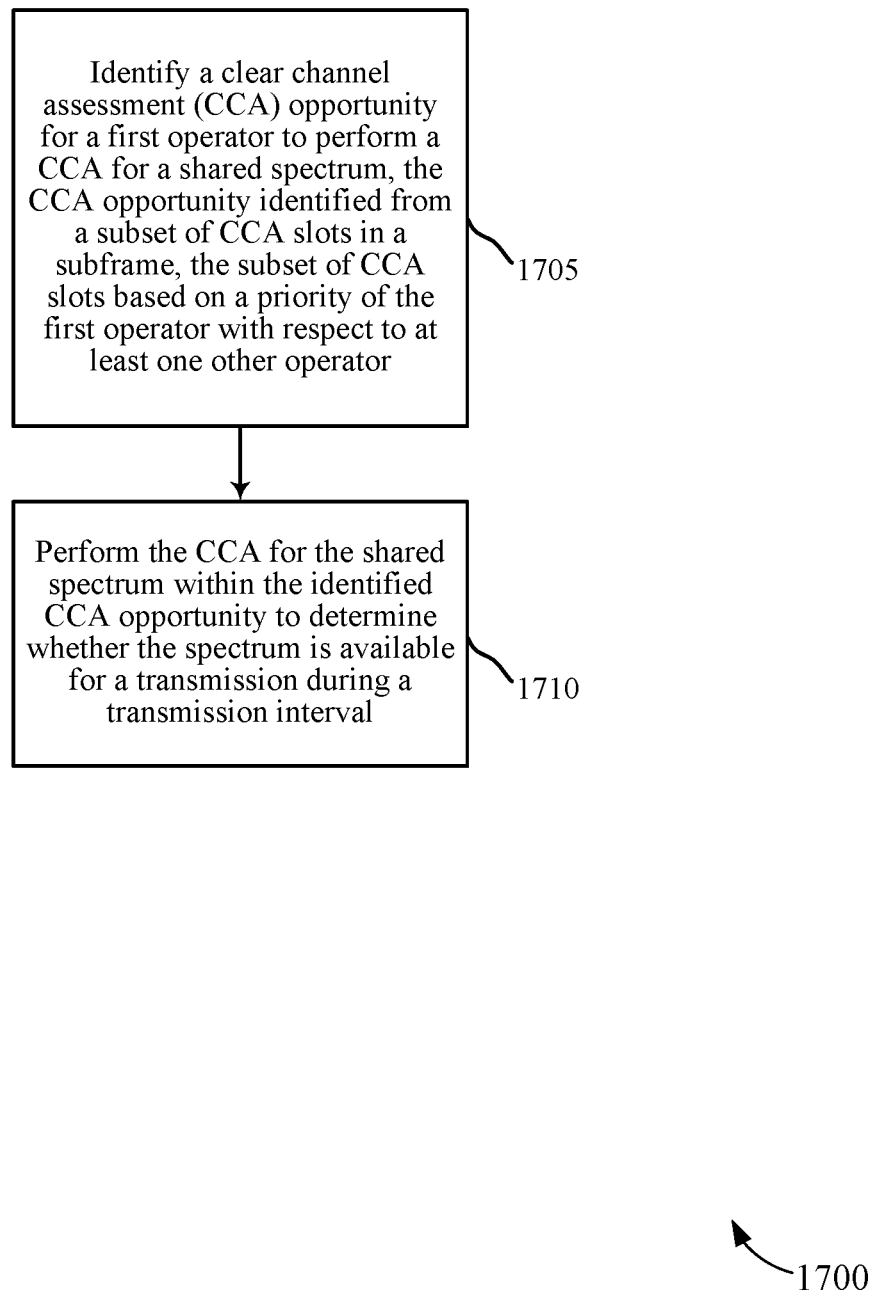

FIG. 17 is a flowchart illustrating another example of a method 1700 for wireless communications. For clarity, the method 1700 is described below with reference to one of the base stations or devices 105, 205, 505, 1005, 1055, 1205, 1305, and/or 1505 described with reference to FIGS. 1, 2A, 2B, 5, 10A, 10B, 12, 13, and/or 15. In one embodiment, a base station or device 105, 205, 505, 1005, 1055, 1205, 1305, and/or 1505 may execute one or more sets of codes to control the functional elements of the base station or device 105, 205, 505, 1005, 1055, 1205, 1305, and/or 1505 to perform the functions described below.

At block 1705, a CCA opportunity may be identified for a first operator to perform a CCA for a shared spectrum. The shared spectrum may include a licensed and/or unlicensed spectrum. The CCA opportunity may be identified from a subset of CCA slots in a subframe. The subset of CCA slots may be based on a priority of the first operator with respect to at least one other operator associated with the shared spectrum. The operation(s) at block 1705 may in some cases be performed using the CCA module 1015, 1065, 1390, and/or 1541 described with reference to FIGS. 10A, 10B, 13, and/or 15, the CCA opportunity identification module 1075 and/or 1105 described with reference to FIGS. 10B and/or 11, and/or the time/frequency CCA slot identification module 1115 described with reference to FIG. 11.

When the priority of the first operator is higher than a priority of the at least one other operator, the CCA opportunity for the first operator may be earlier in the subframe than a CCA opportunity for the at least one other operator (e.g., as described with reference to FIG. 7A). When the priority of the first operator is lower than the priority of the at least one other operator, the CCA opportunity for the first operator may be later in the subframe than the CCA opportunity for the at least one other operator.

In some embodiments, the subset of CCA slots may include two or more CCA slots occupying two or more time periods. In other embodiments, the subset of CCA slots may include two or more frequency tones associated with different priorities. In further embodiments, the CCA slots may occupy a combination of both different time periods and different frequency tones.

In some embodiments, the priority of the first operator with respect to the at least one other operator may be specific to a particular spectrum assigned to a carrier. That is, the first operator may be the only operator having a priority with respect to the at least one other operator for the particular spectrum. In other embodiments, the priority of the first operator with respect to the at least one other operator may be shared by other operators. That is, the first operator may have the same priority as another operator (e.g., a second operator) with respect to the at least one other operator. The latter may be achieved using orthogonal transmissions and/or other techniques for sharing a same spectrum. First and second operators may also share the same priority with respect to the at least one other operator by, for example, alternating the priority given the first and second operators in alternating transmission intervals, such that, over time, each of the first and second operators is provided the same priority with respect to the same spectrum. In cases where one or more operators transmit on multiple carriers, the prioritization may be performed separately or jointly across the two or more carriers.

At block 1710, the CCA for the shared spectrum may be performed within the identified CCA opportunity to determine whether the shared spectrum is available for a transmission during a transmission interval. The operation(s) at block 1710 may in some cases be performed using the CCA module 1015, 1065, 1390, and/or 1541 described with reference to FIGS. 10A, 10B, 13, and/or 15, and/or the CCA performance module 1080 described with reference to FIG. 10B.

In some embodiments, the transmission interval may include a frame or a subframe and the first and at least one other operator may be synchronized with respect to a frame timing or a subframe timing. In some cases, the first and at least one other operator may utilize a same frame structure or subframe structure for the shared spectrum. In other cases, the first and at least one other operator may utilize two or more different frame structures or subframe structures for the shared spectrum.

In some cases, the first operator may be capable of transmitting over two or more carriers (e.g., two or more frequency tones) and the CCA opportunity identified for the first operator to perform the CCA for the shared spectrum, at block 1705, may be a CCA slot for the first operator to perform a CCA for a first carrier of the shared spectrum. In these cases, a second CCA opportunity for the first operator to perform a CCA may be identified. The second CCA opportunity may be a CCA slot for the first operator to perform a CCA for a second carrier of the shared spectrum. The second CCA opportunity may be based on 1) the priority of the first operator with respect to the at least one other operator, or 2) a second priority of the first operator with respect to the at least one other operator, wherein the second priority is different from the first priority. When the second CCA opportunity is based on a second priority of the first operator with respect to the at least one other operator, the first and second priorities may be determined using the same or different techniques (e.g., one or more of the various techniques described with reference to FIGS. 7A, 7B, 7C, 7D, and/or 8B). The CCA may be performed for the second carrier of the shared spectrum in the identified second CCA opportunity to determine whether the shared spectrum is available for a transmission during the transmission interval.

Thus, the method 1700 may provide for wireless communications. It should be noted that the method 1700 is just one implementation and that the operations of the method 1700 may be rearranged or otherwise modified such that other implementations are possible.

Figure 18:
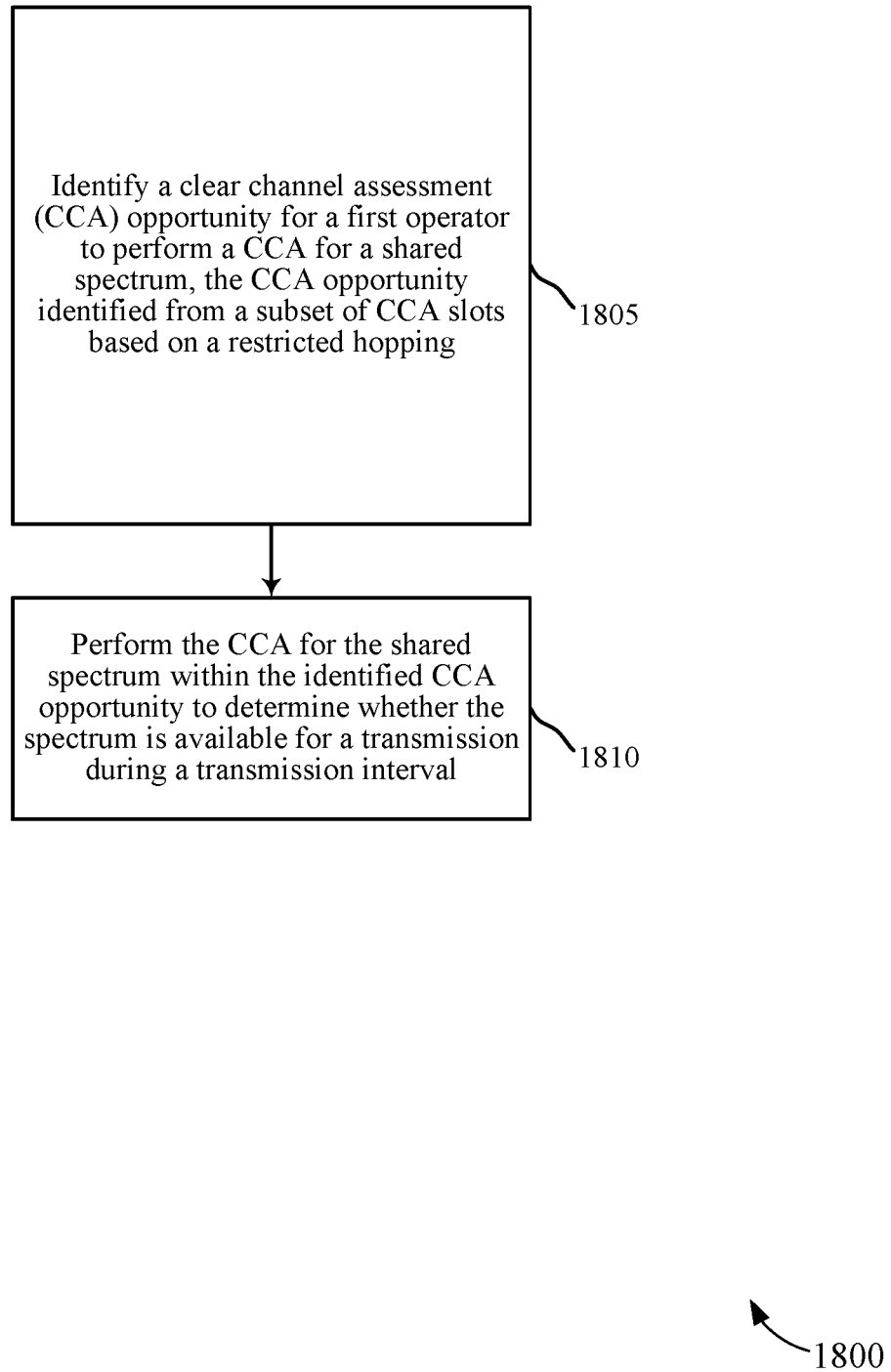

FIG. 18 is a flowchart illustrating another example of a method 1800 for wireless communications. For clarity, the method 1800 is described below with reference to one of the base stations or devices 105, 205, 505, 1005, 1055, 1205, 1305, and/or 1505 described with reference to FIGS. 1, 2A, 2B, 5, 10A, 10B, 12, 13, and/or 15. In one embodiment, a base station or device 105, 205, 505, 1005, 1055, 1205, 1305, and/or 1505 may execute one or more sets of codes to control the functional elements of the base station or device 105, 205, 505, 1005, 1055, 1205, 1305, and/or 1505 to perform the functions described below.

At block 1805, a CCA opportunity may be identified for a first operator to perform a CCA for a shared spectrum. The shared spectrum may include a licensed and/or unlicensed spectrum. The CCA opportunity may be identified from a subset of CCA slots in a subframe. The subset of CCA slots may be based on a priority of the first operator with respect to at least one other operator associated with the shared spectrum. The CCA opportunity may also be identified based on a restricted hopping technique described herein with respect to FIG. 7B. The operation(s) at block 1805 may in some cases be performed using the CCA module 1015, 1065, 1390, and/or 1541 described with reference to FIGS. 10A, 10B, 13, and/or 15, the CCA opportunity identification module 1075 and/or 1105 described with reference to FIGS. 10B and/or 11, and/or the time/frequency CCA slot identification module 1115 and/or restricted hopping management module 1125 described with reference to FIG. 11.

When the priority of the first operator is higher than a priority of the at least one other operator, the subset of CCA slots associated with the priority of the first operator may ensure that the first operator has CCA priority in more transmission intervals than the at least one other operator. For example, FIG. 7B illustrates an example in which a first operator has CCA priority over a second operator in two out of every three transmission intervals.

When the priority of the first operator is lower than the priority of the at least one other operator, the subset of CCA slots associated with the priority of the first operator may provide the first operator with CCA priority in fewer transmission intervals than the at least one other operator.

In some embodiments, the subset of CCA slots may include two or more CCA slots occupying two or more time periods. In other embodiments, the subset of CCA slots may include two or more frequency tones associated with different priorities. In further embodiments, the CCA slots may occupy a combination of both different time periods and different frequency tones.

In some embodiments, the priority of the first operator with respect to the at least one other operator may be specific to a particular spectrum assigned to a carrier. That is, the first operator may be the only operator having a priority with respect to the at least one other operator for the particular spectrum. In other embodiments, the priority of the first operator with respect to the at least one other operator may be shared by other operators. That is, the first operator may have the same priority as another operator (e.g., a second operator) with respect to the at least one other operator. The latter may be achieved using orthogonal transmissions and/or other techniques for sharing a same spectrum. First and second operators may also share the same priority with respect to the at least one other operator by, for example, alternating the priority given the first and second operators in alternating transmission intervals, such that, over time, each of the first and second operators is provided the same priority with respect to the same spectrum. In cases where one or more operators transmit on multiple carriers, the prioritization may be performed separately or jointly across the two or more carriers.

At block 1810, the CCA for the shared spectrum may be performed within the identified CCA opportunity to determine whether the shared spectrum is available for a transmission during a transmission interval. The operation(s) at block 1810 may in some cases be performed using the CCA module 1015, 1065, 1390, and/or 1541 described with reference to FIGS. 10A, 10B, 13, and/or 15, and/or the CCA performance module 1080 described with reference to FIG. 10B.

In some embodiments, the transmission interval may include a frame or a subframe and the first and at least one other operator may be synchronized with respect to a frame timing or a subframe timing. In some cases, the first and at least one other operator may utilize a same frame structure or subframe structure for the shared spectrum. In other cases, the first and at least one other operator may utilize two or more different frame structures or subframe structures for the shared spectrum.

In some cases, the first operator may be capable of transmitting over two or more carriers (e.g., two or more frequency tones) and the CCA opportunity identified for the first operator to perform the CCA for the shared spectrum, at block 1805, may be a CCA slot for the first operator to perform a CCA for a first carrier of the shared spectrum. In these cases, a second CCA opportunity for the first operator to perform a CCA may be identified. The second CCA opportunity may be a CCA slot for the first operator to perform a CCA for a second carrier of the shared spectrum. The second CCA opportunity may be based on 1) the priority of the first operator with respect to the at least one other operator, or 2) a second priority of the first operator with respect to the at least one other operator, wherein the second priority is different from the first priority. When the second CCA opportunity is based on a second priority of the first operator with respect to the at least one other operator, the first and second priorities may be determined using the same or different techniques (e.g., one or more of the various techniques described with reference to FIGS. 7A, 7B, 7C, 7D, and/or 8B). The CCA may be performed for the second carrier of the shared spectrum in the identified second CCA opportunity to determine whether the shared spectrum is available for a transmission during the transmission interval.

Thus, the method 1800 may provide for wireless communications. It should be noted that the method 1800 is just one implementation and that the operations of the method 1800 may be rearranged or otherwise modified such that other implementations are possible.

Figure 19:
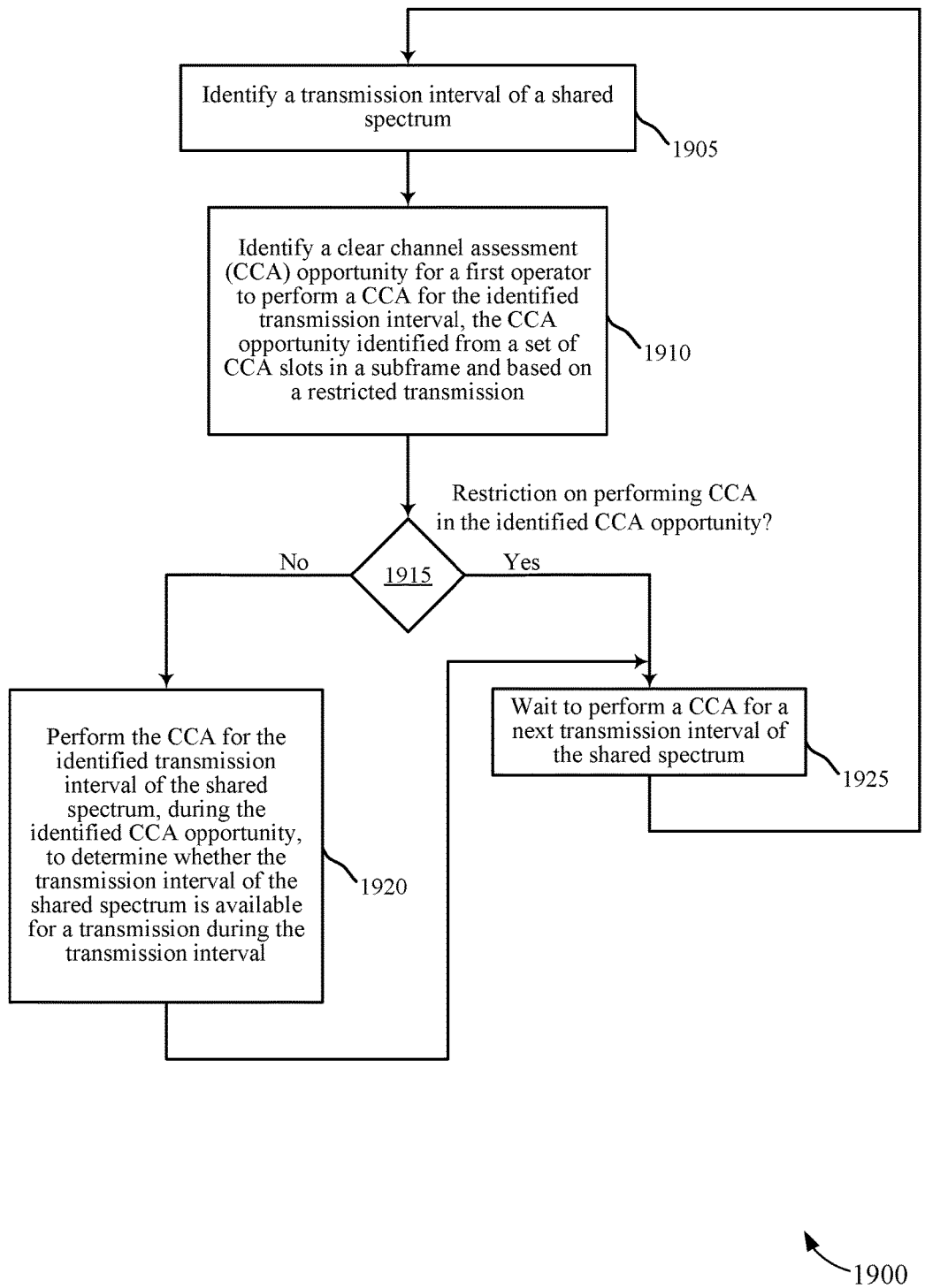

FIG. 19 is a flowchart illustrating another example of a method 1900 for wireless communications. For clarity, the method 1900 is described below with reference to one of the base stations or devices 105, 205, 505, 1005, 1055, 1205, 1305, and/or 1505 described with reference to FIGS. 1, 2A, 2B, 5, 10A, 10B, 12, 13, and/or 15. In one embodiment, a base station or device 105, 205, 505, 1005, 1055, 1205, 1305, and/or 1505 may execute one or more sets of codes to control the functional elements of the base station or device 105, 205, 505, 1005, 1055, 1205, 1305, and/or 1505 to perform the functions described below.

At block 1905, a transmission interval of a shared spectrum may be identified. The shared spectrum may include a licensed and/or unlicensed spectrum. In some cases, the transmission interval may be identified by a frame number, or as a transmission interval associated with an even or an odd frame number. The operation(s) at block 1905 may in some cases be performed using the CCA module 1015, 1065, 1390, and/or 1541 described with reference to FIGS. 10A, 10B, 13, and/or 15, the CCA opportunity identification module 1075 and/or 1105 described with reference to FIGS. 10B and/or 11, and/or the transmission interval identification module 1120 described with reference to FIG. 11.

At block 1910, a CCA opportunity may be identified for a first operator to perform a CCA for the identified transmission interval. The CCA opportunity may be identified from a set of CCA slots in a subframe. The CCA opportunity may also be identified based on a restricted transmission technique described herein with respect to FIG. 7C. The operation(s) at block 1910 may in some cases be performed using the CCA module 1015, 1065, 1390, and/or 1541 described with reference to FIGS. 10A, 10B, 13, and/or 15, the CCA opportunity identification module 1075 and/or 1105 described with reference to FIGS. 10B and/or 11, and/or the time/frequency CCA slot identification module 1115 and/or restricted hopping management module 1125 described with reference to FIG. 11.

In some embodiments, the set of CCA slots may include two or more CCA slots occupying two or more time periods. In other embodiments, the set of CCA slots may include two or more frequency tones associated with different priorities. In further embodiments, the CCA slots may occupy a combination of both different time periods and different frequency tones.

In some embodiments, the priority of the first operator with respect to the at least one other operator may be specific to a particular spectrum assigned to a carrier. That is, the first operator may be the only operator having a priority with respect to the at least one other operator for the particular spectrum. In other embodiments, the priority of the first operator with respect to the at least one other operator may be shared by other operators. That is, the first operator may have the same priority as another operator (e.g., a second operator) with respect to the at least one other operator. The latter may be achieved using orthogonal transmissions and/or other techniques for sharing a same spectrum. First and second operators may also share the same priority with respect to the at least one other operator by, for example, alternating the priority given the first and second operators in alternating transmission intervals, such that, over time, each of the first and second operators is provided the same priority with respect to the same spectrum. In cases where one or more operators transmit on multiple carriers, the prioritization may be performed separately or jointly across the two or more carriers.

At block 1915, it may be determined whether the priority of the first operator with respect to the at least one other operator restricts the first operator from performing a CCA in the identified CCA opportunity. For example, it may be determined, based on the priority of the first operator with respect to the at least one other operator, whether the CCA opportunity identified for the first operator to perform a CCA for the identified transmission interval is invalid for performing the CCA by the first operator. The operation(s) at block 1915 may in some cases be performed using the CCA module 1015, 1065, 1390, and/or 1541 described with reference to FIGS. 10A, 10B, 13, and/or 15, the CCA opportunity identification module 1075 and/or 1105 described with reference to FIGS. 10B and/or 11, and/or the restricted transmission management module 1130 described with reference to FIG. 11.

Not every identified CCA opportunity will be restricted from use by the first operator to perform a CCA. However, it may be relatively more likely that an identified CCA opportunity will be restricted from use by the first operator when the first operator has a lower priority with respect to the at least one other operator, and it may be relatively less likely that an identified CCA opportunity will be restricted from use by the first operator when the first operator has a higher priority with respect to the at least one other operator. For example, FIG. 7C illustrates an example in which a first operator has no restrictions on performing a CCA, while a second operator is restricted from performing a CCA in every other transmission interval (e.g., every other frame).

In some cases, the same restricted transmission technique may be used for operators having different priorities over other operators, because the priority of one operator over another operator in a shared spectrum may be controlled by restricting one or more operators from performing a CCA for a particular transmission interval of the shared spectrum.

At block 1920, and when an identified CCA opportunity is determined not to be restricted from use and/or invalid, the CCA for the identified transmission interval of the shared spectrum may be performed within the identified CCA opportunity, to determine whether the shared spectrum is available for a transmission during the identified transmission interval. The operation(s) at block 1920 may in some cases be performed using the CCA module 1015, 1065, 1390, and/or 1541 described with reference to FIGS. 10A, 10B, 13, and/or 15, and/or the CCA performance module 1080 described with reference to FIG. 10B.

Upon determining that the identified CCA opportunity is restricted from use and/or invalid at block 1915, or after performing the CCA for the identified transmission interval at block 1920, the method 1900 may proceed to block 1925. At block 1925, the method 1900 waits to perform a CCA for a next transmission interval of the shared spectrum, and then returns to block 1905.

In some embodiments, the transmission interval may include a frame or a subframe and the first and at least one other operator may be synchronized with respect to a frame timing or a subframe timing. In some cases, the first and at least one other operator may utilize a same frame structure or subframe structure for the shared spectrum. In other cases, the first and at least one other operator may utilize two or more different frame structures or subframe structures for the shared spectrum.

In some cases, the first operator may be capable of transmitting over two or more carriers (e.g., two or more frequency tones) and the CCA opportunity identified for the first operator to perform the CCA for the identified transmission interval of the shared spectrum, at block 1910, may be a CCA opportunity for the first operator to perform a CCA for a first carrier of the shared spectrum. In these cases, a second CCA opportunity for the first operator to perform a CCA may be identified. The second CCA opportunity may be a CCA slot for the first operator to perform a CCA for a second carrier of the shared spectrum. The second CCA opportunity may be based on 1) the priority of the first operator with respect to the at least one other operator, or 2) a second priority of the first operator with respect to the at least one other operator, wherein the second priority is different from the first priority. When the second CCA opportunity is based on a second priority of the first operator with respect to the at least one other operator, the first and second priorities may be determined using the same or different techniques (e.g., one or more of the various techniques described with reference to FIGS. 7A, 7B, 7C, 7D, and/or 8B). The CCA may be performed for the second carrier of the shared spectrum in the identified second CCA opportunity to determine whether the shared spectrum is available for a transmission during the identified transmission interval.

Thus, the method 1900 may provide for wireless communications. It should be noted that the method 1900 is just one implementation and that the operations of the method 1900 may be rearranged or otherwise modified such that other implementations are possible.

In some cases, the priority of a first operator with respect to at least one other operator may not restrict the first operator from performing a CCA for a transmission period of a shared spectrum during a subframe, but may instead place a restriction on the at least one other operator from performing a CCA during the subframe.

Figure 20:
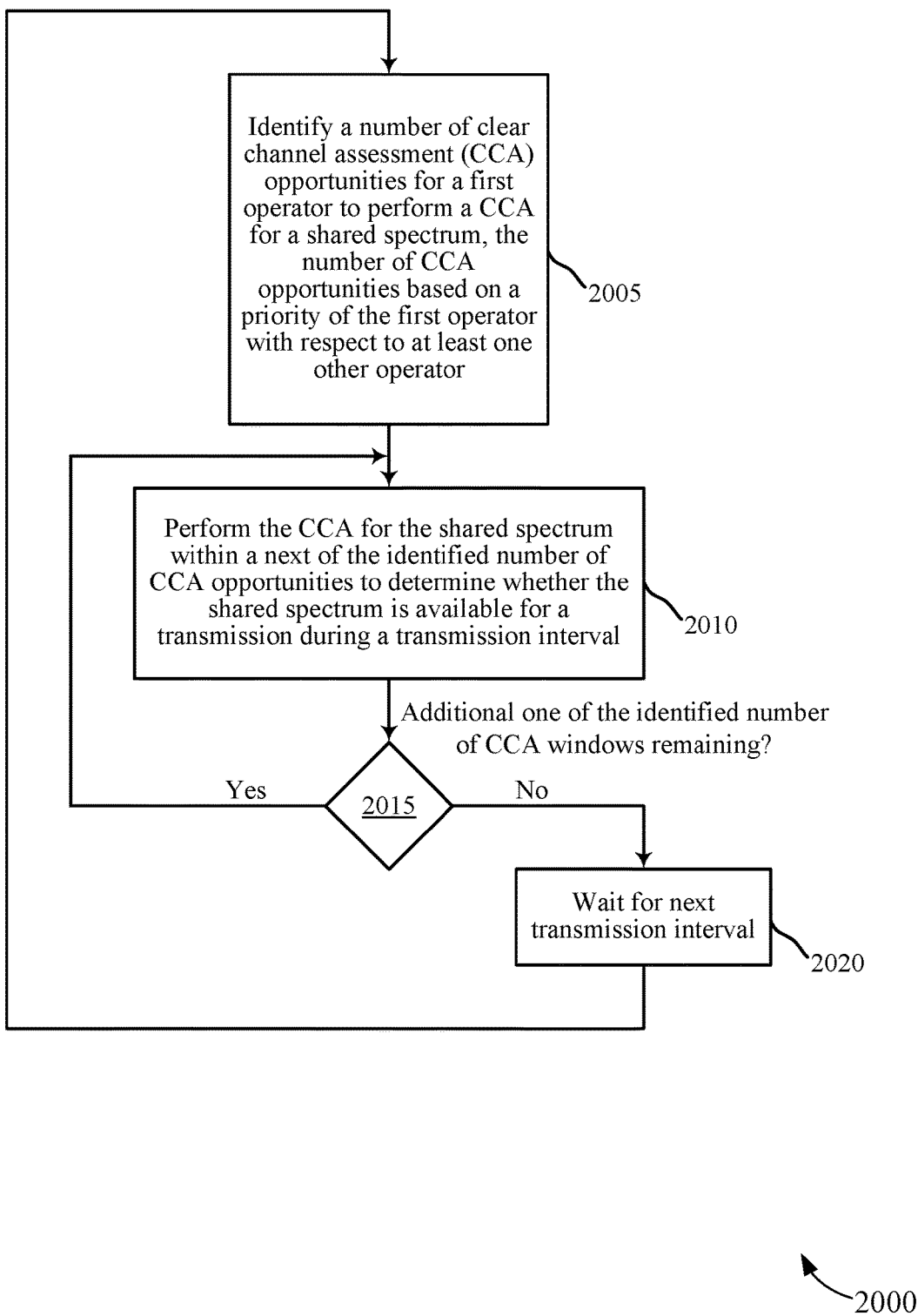

FIG. 20 is a flowchart illustrating another example of a method 2000 for wireless communications. For clarity, the method 2000 is described below with reference to one of the base stations or devices 105, 205, 505, 1005, 1055, 1205, 1305, and/or 1505 described with reference to FIGS. 1, 2A, 2B, 5, 10A, 10B, 12, 13, and/or 15. In one embodiment, a base station or device 105, 205, 505, 1005, 1055, 1205, 1305, and/or 1505 may execute one or more sets of codes to control the functional elements of the base station or device 105, 205, 505, 1005, 1055, 1205, 1305, and/or 1505 to perform the functions described below.

At block 2005, a number of CCA opportunities may be identified for a first operator to perform a CCA for a shared spectrum. The number of CCA opportunities may be based on a priority of the first operator with respect to at least one other operator associated with the shared spectrum. The number of CCA opportunities may be identified from a set of CCA slots in a subframe. The shared spectrum may include a licensed and/or unlicensed spectrum. The operation(s) at block 2005 may in some cases be performed using the CCA module 1015, 1065, 1390, and/or 1541 described with reference to FIGS. 10A, 10B, 13, and/or 15, the CCA opportunity identification module 1075 and/or 1105 described with reference to FIGS. 10B and/or 11, and/or the time/frequency CCA slot identification module 1115 and/or the multiple CCA slot management module 1135 described with reference to FIG. 11.

In some cases, two or more of the identified CCA opportunities may be adjacent in time. In other cases, each of the identified CCA slots may be separated from another one or ones of the identified CCA opportunities by one or more non-identified CCA opportunities.

When the priority of the first operator is higher than a priority of the at least one other operator, the number of CCA opportunities associated with the priority of the first operator may ensure that the first operator is allotted more CCA slots than the at least one other operator (e.g., the number of CCA slots allotted to the first operator in a subframe may be greater than a number of CCA slots allotted to the at least one other operator in the subframe). When the priority of the first operator is lower than the priority of the at least one other operator, the number of CCA opportunities associated with the priority of the first operator may provide the first operator with fewer CCA slots than the at least one other operator.

In some embodiments, the number of CCA opportunities may include two or more CCA slots occupying two or more time periods. In some embodiments, the number of CCA opportunities may occupy a combination of both different time periods and different frequency tones.

In some embodiments, the priority of the first operator with respect to the at least one other operator may be specific to a particular spectrum assigned to a carrier. That is, the first operator may be the only operator having a priority with respect to the at least one other operator for the particular spectrum. In other embodiments, the priority of the first operator with respect to the at least one other operator may be shared by other operators. That is, the first operator may have the same priority as another operator (e.g., a second operator) with respect to the at least one other operator. The latter may be achieved using orthogonal transmissions and/or other techniques for sharing a same spectrum. First and second operators may also share the same priority with respect to the at least one other operator by, for example, alternating the priority given the first and second operators in alternating transmission intervals, such that, over time, each of the first and second operators is provided the same priority with respect to the same spectrum. In cases where one or more operators transmit on multiple carriers, the prioritization may be performed separately or jointly across the two or more carriers.

At block 2010, the CCA for the shared spectrum may be performed within a next of the identified CCA opportunities (and possibly the only identified CCA opportunity, if only one CCA opportunity is identified) to determine whether the shared spectrum is available for a transmission during a transmission interval. The operation(s) at block 2010 may in some cases be performed using the CCA module 1015, 1065, 1390, and/or 1541 described with reference to FIGS. 10A, 10B, 13, and/or 15, and/or the CCA performance module 1080 described with reference to FIG. 10B.

In some embodiments, the transmission interval may include a frame or a subframe and the first and at least one other operator may be synchronized with respect to a frame timing or a subframe timing. In some cases, the first and at least one other operator may utilize a same frame structure or subframe structure for the shared spectrum. In other cases, the first and at least one other operator may utilize two or more different frame structures or subframe structures for the shared spectrum.

At block 2015, it may be determined whether an additional one of the identified number of CCA opportunities remains. If so, processing may return to block 2010, where a CCA may be performed for the same transmission interval of the shared spectrum, but in a next of the identified number of CCA opportunities. However, when it is determined at block 2015 that none of the identified CCA opportunities remain (i.e., because a CCA has already been performed in each of the identified CCA opportunities), processing may proceed to block 2020. At block 2020, the method 2000 waits to perform a CCA for a next transmission interval of the shared spectrum, and then returns to block 2005.

In some cases, the first operator may be capable of transmitting over two or more carriers (e.g., two or more frequency tones) and the number of CCA opportunities identified for the first operator to perform the CCA for the shared spectrum, at block 2005, may be a number of CCA opportunities for the first operator to perform a CCA for a first carrier of the shared spectrum. In these cases, a second number of CCA opportunities for the first operator to perform a CCA may be identified. The second number of CCA opportunities may be a number of CCA opportunities for the first operator to perform a CCA for a second carrier of the shared spectrum. The second number of CCA opportunities may be based on 1) the priority of the first operator with respect to the at least one other operator, or 2) a second priority of the first operator with respect to the at least one other operator, wherein the second priority is different from the first priority. When the second number of CCA opportunities is based on a second priority of the first operator with respect to the at least one other operator, the first and second priorities may be determined using the same or different techniques (e.g., one or more of the various techniques described with reference to FIGS. 7A, 7B, 7C, 7D, and/or 8B). The CCA may be performed for the second carrier of the shared spectrum in each of the identified second number of CCA opportunities to determine whether the shared spectrum is available for a transmission during the transmission interval.

Thus, the method 2000 may provide for wireless communications. It should be noted that the method 2000 is just one implementation and that the operations of the method 2000 may be rearranged or otherwise modified such that other implementations are possible.

Figure 21:
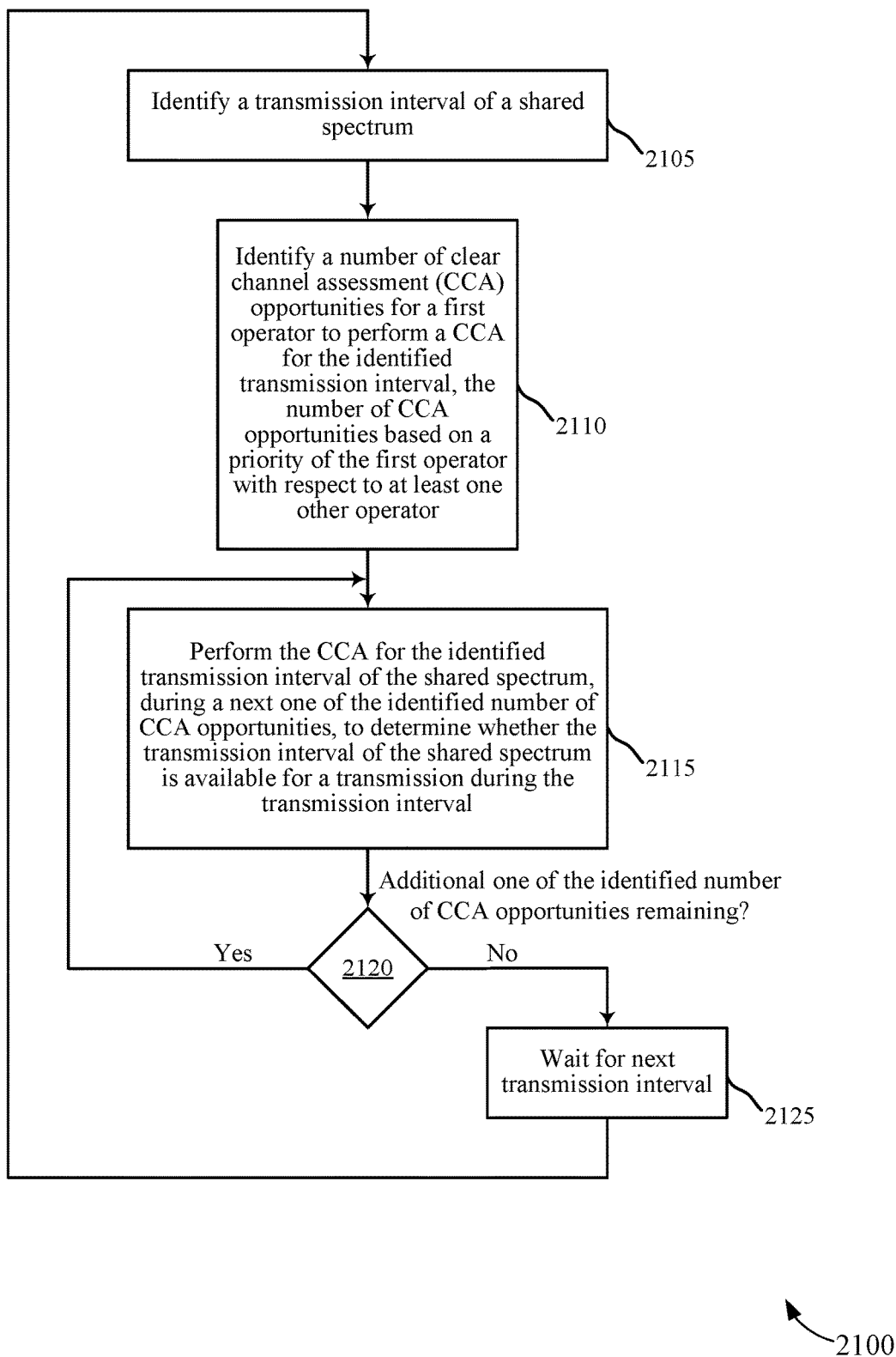

FIG. 21 is a flowchart illustrating another example of a method 2100 for wireless communications. For clarity, the method 2100 is described below with reference to one of the eNBs or devices 105, 205, 505, 1005, 1055, 1305, and/or 1505 described with reference to FIGS. 1, 2A, 2B, 5, 10A, 10B, 13, and/or 15. In one embodiment, a base station or device 105, 205, 505, 1005, 1055, 1205, 1305, and/or 1505 may execute one or more sets of codes to control the functional elements of the base station or device 105, 205, 505, 1005, 1055, 1205, 1305, and/or 1505 to perform the functions described below.

At block 2105, a transmission interval of a shared spectrum may be identified. The shared spectrum may include a licensed and/or unlicensed spectrum. In some cases, the transmission interval may be identified by a frame number, or as a transmission interval associated with an even or an odd frame number. The operation(s) at block 2105 may in some cases be performed using the CCA module 1015, 1065, 1390, and/or 1541 described with reference to FIGS. 10A, 10B, 13, and/or 15, the CCA opportunity identification module 1075 and/or 1105 described with reference to FIGS. 10B and/or 11, and/or the transmission interval identification module 1120 described with reference to FIG. 11.

At block 2110, a number of CCA opportunities may be identified for a first operator to perform a CCA for the identified transmission interval. The number of CCA opportunities may be based on a priority of the first operator with respect to at least one other operator associated with the shared spectrum. The number of CCA opportunities may be identified from a set of CCA slots in a subframe. The operation(s) at block 2110 may in some cases be performed using the CCA module 1015, 1065, 1390, and/or 1541 described with reference to FIGS. 10A, 10B, 13, and/or 15, the CCA opportunity identification module 1075 and/or 1105 described with reference to FIGS. 10B and/or 11, and/or the time/frequency CCA slot identification module 1115 and/or the multiple CCA slot management module 1135 described with reference to FIG. 11.

In some cases, two or more of the identified CCA opportunities may be adjacent in time. In other cases, each of the identified CCA opportunities may be separated from another one or ones of the identified CCA opportunities by one or more non-identified CCA opportunities.

In some cases, the number of identified CCA opportunities may vary depending on the identity of the transmission interval. For example, the first operator may be allotted one CCA slot during even numbered transmission intervals and two CCA slots during odd numbered transmission intervals. When the priority of the first operator is higher than a priority of the at least one other operator, the number of CCA opportunities associated with the priority of the first operator, over time, may ensure that the first operator is allotted more CCA slots than the at least one other operator. For example, FIG. 7D illustrates an example in which a first operator is allotted three CCA slots for every two CCA slots allotted to a second operator. When the priority of the first operator is lower than the priority of the at least one other operator, the number of CCA opportunities associated with the priority of the first operator, over time, may provide the first operator with fewer CCA slots than the at least one other operator.

In some embodiments, the number of CCA opportunities may include two or more CCA slots occupying two or more time periods. In some embodiments, the number of CCA opportunities may occupy a combination of both different time periods and different frequency tones.

In some embodiments, the priority of the first operator with respect to the at least one other operator may be specific to a particular spectrum assigned to a carrier. That is, the first operator may be the only operator having a priority with respect to the at least one other operator for the particular spectrum. In other embodiments, the priority of the first operator with respect to the at least one other operator may be shared by other operators. That is, the first operator may have the same priority as another operator (e.g., a second operator) with respect to the at least one other operator. The latter may be achieved using orthogonal transmissions and/or other techniques for sharing a same spectrum. First and second operators may also share the same priority with respect to the at least one other operator by, for example, alternating the priority given the first and second operators in alternating transmission intervals, such that, over time, each of the first and second operators is provided the same priority with respect to the same spectrum. In cases where one or more operators transmit on multiple carriers, the prioritization may be performed separately or jointly across the two or more carriers.

At block 2115, the CCA for the identified transmission interval of the shared spectrum may be performed within a next of the identified CCA opportunities (and possibly the only identified CCA opportunity, if only one CCA opportunity is identified) to determine whether the transmission interval of the shared spectrum is available for a transmission during a transmission interval. The operation(s) at block 2115 may in some cases be performed using the CCA module 1015, 1065, 1390, and/or 1541 described with reference to FIGS. 10A, 10B, 13, and/or 15, and/or the CCA performance module 1080 described with reference to FIG. 10B.

In some embodiments, the transmission interval may include a frame or a subframe and the first and at least one other operator may be synchronized with respect to a frame timing or a subframe timing. In some cases, the first and at least one other operator may utilize a same frame structure or subframe structure for the shared spectrum. In other cases, the first and at least one other operator may utilize two or more different frame structures or subframe structures for the shared spectrum.

At block 2120, it may be determined whether an additional one of the identified number of CCA opportunities remains. If so, processing may return to block 2115, where a CCA may be performed for the same transmission interval of the shared spectrum, but in a next of the identified number of CCA opportunities. However, when it is determined at block 2120 that none of the identified CCA opportunities remain (i.e., because a CCA has already been performed in each of the identified CCA opportunities), processing may proceed to block 2125. At block 2125, the method 2100 waits to perform a CCA for a next transmission interval of the shared spectrum, and then returns to block 2105.

In some cases, the first operator may be capable of transmitting over two or more carriers (e.g., two or more frequency tones) and the number of CCA opportunities identified for the first operator to perform a CCA for the shared spectrum, at block 2005, may be a number of CCA opportunities for the first operator to perform a CCA for a first carrier of the shared spectrum. In these cases, a second number of CCA opportunities for the first operator to perform a CCA may be identified. The second number of CCA opportunities may be a number of CCA opportunities for the first operator to perform a CCA for a second carrier of the shared spectrum. The second number of CCA opportunities may be based on 1) the priority of the first operator with respect to the at least one other operator, or 2) a second priority of the first operator with respect to the at least one other operator, wherein the second priority is different from the first priority. When the second number of CCA opportunities is based on a second priority of the first operator with respect to the at least one other operator, the first and second priorities may be determined using the same or different techniques (e.g., one or more of the various techniques described with reference to FIGS. 7A, 7B, 7C, 7D, and/or 8B). The CCA may be performed for the second carrier of the shared spectrum in each of the identified second number of CCA opportunities to determine whether the shared spectrum is available for a transmission during the transmission interval.

Thus, the method 2100 may provide for wireless communications. It should be noted that the method 2100 is just one implementation and that the operations of the method 2100 may be rearranged or otherwise modified such that other implementations are possible.

Figure 22:
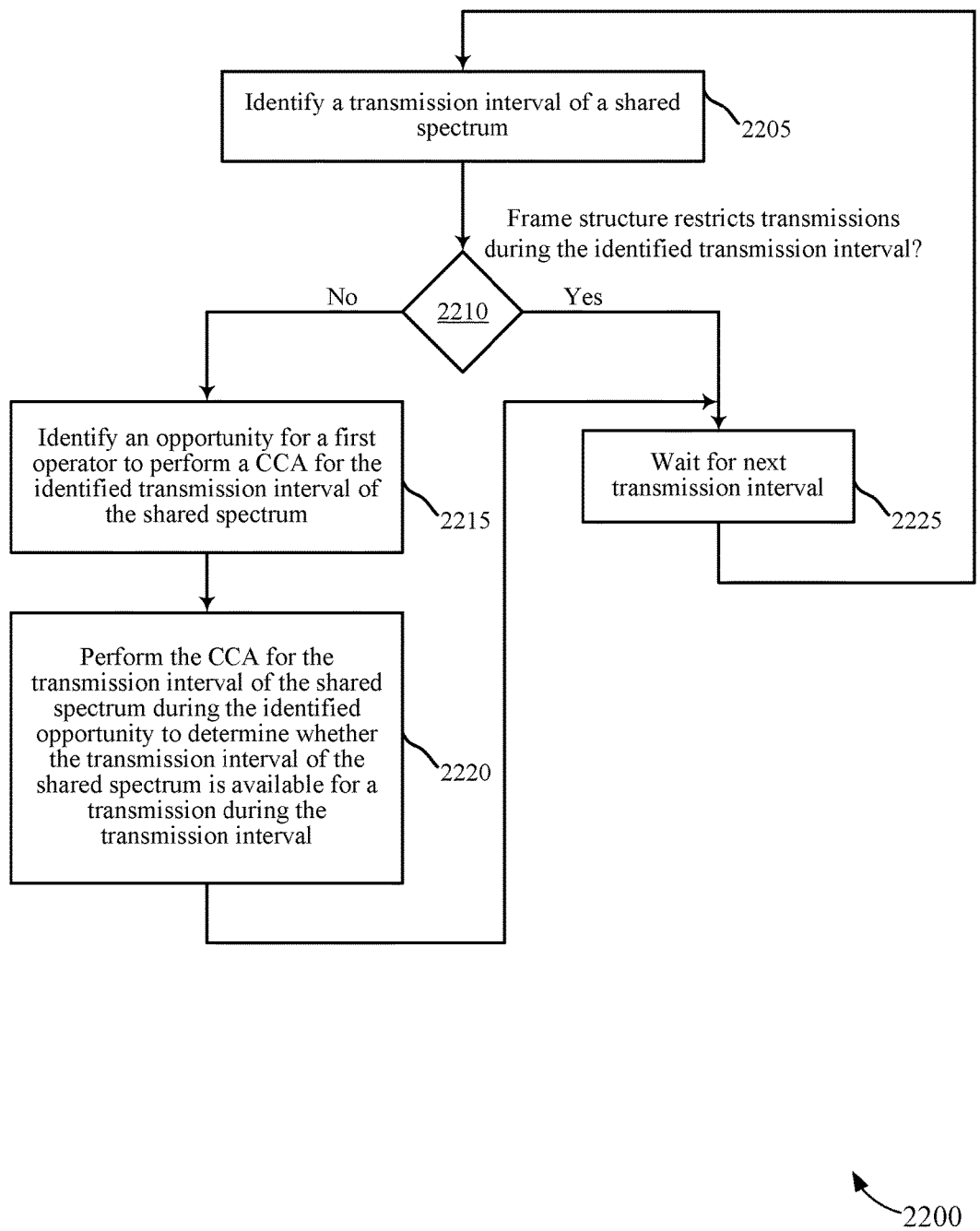

FIG. 22 is a flowchart illustrating another example of a method 2200 for wireless communications. For clarity, the method 2200 is described below with reference to one of the base stations or devices 105, 205, 505, 1005, 1055, 1205, 1305, and/or 1505 described with reference to FIGS. 1, 2A, 2B, 5, 10A, 10B, 12, 13, and/or 15. In one embodiment, a base station or device 105, 205, 505, 1005, 1055, 1305, and/or 1505 may execute one or more sets of codes to control the functional elements of the base station or device 105, 205, 505, 1005, 1055, 1205, 1305, and/or 1505 to perform the functions described below.

At block 2205, a transmission interval of a shared spectrum may be identified. The shared spectrum may include a licensed and/or unlicensed spectrum. In some cases, the transmission interval may be identified by a frame number, or as a transmission interval associated with an even or an odd frame number. The operation(s) at block 2205 may in some cases be performed using the CCA module 1015, 1065, 1390, and/or 1541 described with reference to FIGS. 10A, 10B, 13, and/or 15, the CCA opportunity identification module 1075 and/or 1105 described with reference to FIGS. 10B and/or 11, and/or the transmission interval identification module 1120 described with reference to FIG. 11.

At block 2210, it may be determined, based on the priority of the first operator with respect to the at least one other operator, whether the first operator is restricted from transmitting over the shared spectrum for at least one transmission interval. For example, it may be determined whether a frame structure of a first operator restricts the first operator from transmitting over the shared spectrum for the identified transmission interval, or it may be determined whether the frame structure of the first operator has a silence period that restricts the first operator from transmitting over the shared spectrum for the identified transmission interval. The operation(s) at block 2210 may in some cases be performed using the CCA module 1015, 1065, 1390, and/or 1541 described with reference to FIGS. 10A, 10B, 13, and/or 15, the CCA opportunity identification module 1075 and/or 1105 described with reference to FIGS. 10B and/or 11, and/or the frame structure identification module 1140 and/or the restricted transmission management module 1130 described with reference to FIG. 11.

In some embodiments, the first operator may be restricted from transmitting over the shared spectrum for at least one transmission interval, but is not restricted from transmitting over the shared spectrum during every identified transmission interval. For example, and as shown in FIG. 8B, a first operator may be restricted from transmitting over the shared spectrum during particular subframes (i.e., examples of transmission intervals) because the frame structure of the first operator has a silence period which dictates the first operator cannot transmit over the shared spectrum during the particular subframes.

When the priority of the first operator is lower than a priority of the at least one other operator, the frame structure of the first operator may include a silence period that is longer than a silence period for the at least one other operator. When the priority of the first operator is higher than a priority of the at least one other operator, the frame structure of the first operator may include a silence period that is shorter than a silence period for the at least one other operator.

At block 2215, and when the first operator is determined not to be restricted from transmitting during the identified transmission interval, an opportunity may be identified for the first operator to perform a CCA for the shared spectrum. The opportunity may be identified based on a priority of the first operator with respect to at least one other operator associated with the shared spectrum. The operation(s) at block 2215 may in some cases be performed using the CCA module 1015, 1065, 1390, and/or 1541 described with reference to FIGS. 10A, 10B, 13, and/or 15, and/or the CCA opportunity identification module 1075 and/or 1105 described with reference to FIGS. 10B and/or 11.

In some embodiments, the opportunity for the first operator to perform a CCA for the shared spectrum may be identified from among two or more CCA slots occupying two or more time periods. In other embodiments, the opportunity for the first operator to perform a CCA for the shared spectrum may be identified from among two or more CCA slots occupying two or more frequency tones associated with different priorities. In further embodiments, the opportunity for the first operator to perform a CCA for the shared spectrum may be identified from among two or more CCA slots occupying a combination of both different time periods and different frequency tones.

In some embodiments, the priority of the first operator with respect to the at least one other operator may be specific to a particular spectrum assigned to a carrier. That is, the first operator may be the only operator having a priority with respect to the at least one other operator for the particular spectrum. In other embodiments, the priority of the first operator with respect to the at least one other operator may be shared by other operators. That is, the first operator may have the same priority as another operator (e.g., a second operator) with respect to the at least one other operator. The latter may be achieved using orthogonal transmissions and/or other techniques for sharing a same spectrum. First and second operators may also share the same priority with respect to the at least one other operator by, for example, alternating the priority given the first and second operators in alternating transmission intervals, such that, over time, each of the first and second operators is provided the same priority with respect to the same spectrum. In cases where one or more operators transmit on multiple carriers, the prioritization may be performed separately or jointly across the two or more carriers.

At block 2220, the CCA for the shared spectrum may be performed during the identified opportunity to determine whether the transmission interval of the shared spectrum is available for a transmission. The operation(s) at block 2220 may in some cases be performed using the CCA module 1015, 1065, 1390, and/or 1541 described with reference to FIGS. 10A, 10B, 13, and/or 15, and/or the CCA performance module 1080 described with reference to FIG. 10B.

Upon determining at block 2210 that the first operator is restricted from transmitting during the identified transmission interval, or after performing the CCA for the identified transmission interval at block 2220, the method 2200 may proceed to block 2225. At block 2225, the method 2200 waits to perform a CCA for a next transmission interval of the shared spectrum, and then returns to block 2205.

In some embodiments, the transmission interval may include a frame or a subframe and the first and at least one other operator may be synchronized with respect to a frame timing or a subframe timing. In some cases, the first and at least one other operator may utilize a same frame structure or subframe structure for the shared spectrum. In other cases, the first and at least one other operator may utilize two or more different frame structures or subframe structures for the shared spectrum.

In some cases, the first operator may be capable of transmitting over two or more carriers (e.g., two or more frequency tones) and the opportunity identified for the first operator to perform a CCA for the transmission interval of the shared spectrum at block 2215 may be an opportunity for the first operator to perform a CCA for a first carrier of the shared spectrum. In these cases, a second opportunity for the first operator to perform a CCA may be identified. The second opportunity may be an opportunity for the first operator to perform a CCA for a second carrier of the shared spectrum. The second opportunity may be based on 1) the priority of the first operator with respect to the at least one other operator, or 2) a second priority of the first operator with respect to the at least one other operator, wherein the second priority is different from the first priority. When the second CCA opportunity is based on a second priority of the first operator with respect to the at least one other operator, the first and second priorities may be determined using the same or different techniques (e.g., one or more of the various techniques described with reference to FIGS. 7A, 7B, 7C, 7D, and/or 8B). The CCA may be performed for the second carrier of the shared spectrum during the identified second opportunity to determine whether the shared spectrum is available for a transmission during the transmission interval.

Thus, the method 2200 may provide for wireless communications. It should be noted that the method 2200 is just one implementation and that the operations of the method 2200 may be rearranged or otherwise modified such that other implementations are possible.

In some cases, aspects of the methods 1600, 1700, 1800, 1900, 2000, 2100, and/or 2200 described with reference to FIGS. 16, 17, 18, 19, 20, 21, and/or 22 may be combined. For example, different the priority of a first operator with respect to at least one other operator may be determined based on a combination of two or more of the techniques described in FIGS. 16, 17, 18, 19, 20, 21, and/or 22.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications at a user equipment, comprising:
   identifying, by the user equipment, an opportunity for a first operator to perform a clear channel assessment (CCA) for a shared spectrum, the identified opportunity based on a priority of the first operator with respect to at least one other operator associated with the shared spectrum; and
   performing, by the user equipment, the CCA for the shared spectrum during the identified opportunity to determine whether the shared spectrum is available for a transmission during a transmission interval.

2. The method of claim 1, wherein the transmission interval comprises a frame or a subframe, wherein the first operator and the at least one other operator are synchronized with respect to a frame timing or a subframe timing, and wherein the first operator and the at least one other operator utilize a same frame structure or subframe structure for the shared spectrum.

3. The method of claim 1, wherein the transmission interval comprises a frame or a subframe, wherein the first operator and the at least one other operator are synchronized with respect to a frame timing or a subframe timing, and wherein the first operator and the at least one other operator utilize two or more different frame structures or subframe structures for the shared spectrum.

4. The method of claim 1, wherein identifying the opportunity for the first operator to perform the CCA for the shared spectrum comprises:
   identifying a CCA slot for the first operator from a subset of CCA slots in a subframe, the subset of CCA slots based on the priority of the first operator with respect to the at least one other operator.

5. The method of claim 4, wherein the CCA slot for the first operator is earlier in the subframe than a CCA slot for the at least one other operator when the priority of the first operator is higher than a priority of the at least one other operator.

6. The method of claim 4, wherein the priority of the first operator with respect to the at least one other operator comprises a restriction on the at least one other operator from performing a CCA during the subframe.

7. The method of claim 4, further comprising:
   determining, by the user equipment and based on the priority of the first operator with respect to the at least one other operator, that the CCA slot identified for the first operator to perform the CCA for the transmission interval of the shared spectrum is invalid for performing the CCA by the first operator.

8. The method of claim 1, wherein identifying the opportunity for the first operator to perform the CCA for the shared spectrum comprises:
   identifying a number of CCA slots for the first operator from among a subset of CCA slots in a subframe, the number of CCA slots based on the priority of the first operator with respect to the at least one other operator.

9. The method of claim 8, wherein the number of CCA slots allotted to the first operator in the subframe is greater than a number of CCA slots allotted to the at least one other operator in the subframe if the priority of the first operator is higher than a priority of the at least one other operator.

10. The method of claim 1, further comprising:
    determining, by the user equipment and based on the priority of the first operator with respect to the at least one other operator, that the first operator is restricted from transmitting over the shared spectrum for at least one transmission interval.

11. The method of claim 1, further comprising:
    determining, by the user equipment, that a frame structure of the first operator restricts the first operator from transmitting over the shared spectrum for at least one transmission interval.

12. The method of claim 11, wherein the frame structure of the first operator comprises a silence period that is longer than a silence period for the at least one other operator when the priority of the first operator is lower than a priority of the at least one other operator.

13. The method of claim 1, wherein the identified opportunity for the first operator to perform the CCA for the shared spectrum is identified from among two or more CCA slots occupying two or more time periods.

14. The method of claim 1, wherein the identified opportunity for the first operator to perform the CCA for the shared spectrum is identified from among two or more CCA slots occupying two or more frequency tones.

15. The method of claim 1, wherein the priority of the first operator with respect to the at least one other operator is specific to a particular spectrum assigned to a carrier.

16. The method of claim 1, wherein the shared spectrum comprises an unlicensed spectrum.

17. The method of claim 1, wherein the identified opportunity for the first operator to perform the CCA for the shared spectrum is an opportunity for the first operator to perform the CCA for a first carrier of the shared spectrum, the method further comprising:
 identifying, by the user equipment, a second opportunity for the first operator to perform a CCA for a second carrier of the shared spectrum, the second opportunity based on the priority of the first operator with respect to the at least one other operator; and
 performing the CCA for the second carrier of the shared spectrum, by the user equipment, during the identified second opportunity to determine whether the second carrier of the shared spectrum is available for a transmission during the transmission interval.

18. The method of claim 1, wherein the identified opportunity for the first operator to perform the CCA for the shared spectrum is an opportunity for the first operator to perform the CCA for a first carrier of the shared spectrum, and wherein the priority of the first operator with respect to the at least one other operator associated with the shared spectrum comprises a first priority, the method further comprising:
 identifying, by the user equipment, a second opportunity for the first operator to perform a CCA for a second carrier of the shared spectrum, the second opportunity based on a second priority of the first operator with respect to the at least one other operator associated with the shared spectrum, wherein the second priority is different from the first priority; and
 performing the CCA for the second carrier of the shared spectrum, by the user equipment, during the identified second opportunity to determine whether the second carrier of the shared spectrum is available for a transmission during the transmission interval.

19. The method of claim 1, wherein the CCA is performed on at least one of a downlink or an uplink.

20. The method of claim 1, wherein the priority of the first operator with respect to the at least one other operator is specific to one of a downlink or an uplink or applies to both the downlink and the uplink.

21. A user equipment for wireless communications, comprising:
 means for identifying, by the user equipment, an opportunity for a first operator to perform a clear channel assessment (CCA) for a shared spectrum, the identified opportunity based on a priority of the first operator with respect to at least one other operator associated with the shared spectrum; and
 means for performing, by the user equipment, the CCA for the shared spectrum during the identified opportunity to determine whether the shared spectrum is available for a transmission during a transmission interval.

22. A user equipment for wireless communications, comprising:
 a processor; and
 memory in electronic communication with the processor;
 instructions stored in the memory, wherein the instructions are executable by the processor to cause the user equipment to:
 identify, by the user equipment, an opportunity for a first operator to perform a clear channel assessment (CCA) for a shared spectrum, the identified opportunity based on a priority of the first operator with respect to at least one other operator associated with the shared spectrum, and
 perform, by the user equipment, the CCA for the shared spectrum during the identified opportunity to determine whether the shared spectrum is available for a transmission during a transmission interval.

23. The user equipment of claim 22, wherein the transmission interval comprises a frame or a subframe, wherein the first operator and the at least one other operator are synchronized with respect to a frame timing or a subframe timing, and wherein the first operator and the at least one other operator utilize a same frame structure or subframe structure for the shared spectrum.

24. The user equipment of claim 22, wherein the transmission interval comprises a frame or a subframe, wherein the first operator and the at least one other operator are synchronized with respect to a frame timing or a subframe timing, and wherein the first operator and the at least one other operator utilize two or more different frame structures or subframe structures for the shared spectrum.

25. The user equipment of claim 22, wherein the instructions are further executable by the processor to:
 identify a CCA slot for the first operator from a subset of CCA slots in a subframe, the subset of CCA slots based on the priority of the first operator with respect to the at least one other operator.

26. The user equipment of claim 25, wherein the CCA slot for the first operator is earlier in the subframe than a CCA slot for the at least one other operator when the priority of the first operator is higher than a priority of the at least one other operator.

27. The user equipment of claim 25, wherein the instructions are further executable by the processor to:
 determine, based on the priority of the first operator with respect to the at least one other operator, that the CCA slot identified for the first operator to perform the CCA for the transmission interval of the shared spectrum is invalid for performing the CCA by the first operator.

28. The user equipment of claim 22, wherein the instructions executable by the processor to identify the opportunity for the first operator to perform the CCA for the shared spectrum comprise instructions executable by the processor to:
 identify a number of CCA slots for the first operator from among a subset of CCA slots in a subframe, the number of CCA slots based on the priority of the first operator with respect to the at least one other operator.

29. A non-transitory computer-readable medium storing code for wireless communication at a user equipment, the code comprising instructions that, when executed by a processor, cause a user equipment to:
 identify, by the user equipment, an opportunity for a first operator to perform a clear channel assessment (CCA) for a shared spectrum, the identified opportunity based on a priority of the first operator with respect to at least one other operator associated with the shared spectrum; and
 perform, by the user equipment, the CCA for the shared spectrum during the identified opportunity to determine whether the shared spectrum is available for a transmission during a transmission interval.

30. The non-transitory computer-readable medium of claim 29, wherein the instructions are further executable by the processor to cause the user equipment to:
  identify, by the user equipment, a CCA slot for the first operator from a subset of CCA slots in a subframe, the subset of CCA slots based on the priority of the first operator with respect to the at least one other operator.

\* \* \* \* \*